United States Patent

McKendry et al.

[11] Patent Number: 6,058,178
[45] Date of Patent: May 2, 2000

[54] METHOD FOR ROUTING INCOMING CALLS TO A USER'S PREMISES ON A POTS TELEPHONE LINE

[75] Inventors: Martin S. McKendry, Boulder Creek; Karen L. Styres, Monte Sereno; Edward M. Soloko, San Jose; Miller T. Abel, Santa Cruz; Scott A. Van Gundy, San Jose, all of Calif.

[73] Assignee: SoloPoint, Inc., Los Gatos, Calif.

[21] Appl. No.: 08/603,526

[22] Filed: Feb. 20, 1996

[51] Int. Cl.[7] ............................................. H04M 3/42
[52] U.S. Cl. ........................ 379/212; 379/67.1; 379/210
[58] Field of Search .................................. 379/210, 211, 379/212, 201, 67.1, 88.16, 202, 88.01, 88.06, 88.19, 88.2, 88.21, 142, 90.01, 372, 373

[56] References Cited

U.S. PATENT DOCUMENTS

| | | | |
|---|---|---|---|
| 4,277,649 | 7/1981 | Sheinbein | 179/18 B |
| 4,782,518 | 11/1988 | Mattley et al. | 379/201 |
| 5,022,069 | 6/1991 | Chen | 379/67 |
| 5,206,901 | 4/1993 | Harlow et al. | 379/211 |
| 5,243,642 | 9/1993 | Wise, Jr. et al. | . |
| 5,327,493 | 7/1994 | Richmond et al. | 379/372 |
| 5,375,161 | 12/1994 | Fuller et al. | 379/57 |
| 5,384,831 | 1/1995 | Creswell et al. | 379/67 |
| 5,408,528 | 4/1995 | Carlson et al. | 379/211 |
| 5,454,032 | 9/1995 | Pinard et al. | 379/167 |
| 5,467,390 | 11/1995 | Brankley et al. | 379/229 |
| 5,471,519 | 11/1995 | Howe et al. | 379/67 |
| 5,473,671 | 12/1995 | Partridge, III | 379/59 |
| 5,487,111 | 1/1996 | Slusky | 379/211 |
| 5,502,762 | 3/1996 | Andrew et al. | 379/202 |
| 5,724,411 | 3/1998 | Eisdorfer et al. | 379/211 X |
| 5,754,630 | 5/1998 | Srinivasan | 379/212 X |
| 5,802,160 | 9/1998 | Kugell et al. | 379/211 |
| 5,815,563 | 9/1998 | Ardon | 379/210 |

*Primary Examiner*—Scott Weaver
*Attorney, Agent, or Firm*—Skjerven, Morrill, MacPherson, Franklin & Friel LLP; Edward C. Kwok

[57] ABSTRACT

When a caller calls a POTS telephone number for a user's premises, the incoming call is selectively routed to any combination of local extensions on the owner's premises, and to remote extensions such as a telephone instrument on another premises, a pager, a cellular telephone, a central office voice mail box, and a cellular telephone voice mail box. Control over the incoming call is maintained throughout the duration of the call to allow further routing of the incoming call. Consequently, the incoming call can be routed to multiple locations on the user's premises, or to a telephone answering service at any time after taking the incoming call. Moreover, the incoming call can be routed directly based on the type of call, e.g., voice, facsimile, or modem.

33 Claims, 30 Drawing Sheets

METHOD FOR ROUTING INCOMING CALLS TO A USER'S PREMISES ON A POTS TELEPHONE LINE

BACKGROUND OF THE INVENTION

1. Field of the Invention

This invention relates generally to systems for providing telephone services and in particular to a method for routing incoming calls to an individual user's premises.

2. Description of Related Art

Telephone service has changed dramatically over the last few years. The change was driven by the progress of analog and digital electronic systems, the steep decline in the price of electronic equipment, and the desire to provide more services to customers faced with a massive increase in the digital information available to them. Thus, the telephone network established by long distance carriers, such as American Telephone and Telegraph, Sprint, and MCI, and the Regional Bell Operating Companies (RBOCs), provides more services than the mere exchange of voice information between a caller and a called party.

The original model for a telephone network of establishing a voice conversation between a physically static caller using a fixed instrument, for example, a telephone situated on a desk, and another person, similarly sitting at another desk next to a telephone, is now obsolete. The exclusive association of a telephone call, i.e., a call processed and routed through the telephone network, with voice only data, is gone. Gone also is the association of a single person with a single telephone number.

More recently changes in telephone service have accelerated with a literal explosion in the number of telephone instruments that one person can use to transfer information through the telephone network. Table 1 is a list of some of the common telephone instruments that use the telephone network.

TABLE 1

Common Telephone Instruments

| | |
|---|---|
| Plain old Telephone (POT) | Facsimile Machine |
| Cellular Telephone | Desktop and Portable Computer Modem |
| Telephone Answering Device | Caller ID Telephone |
| Pager | Personal Digital Assistant |

The types of telephone instruments listed in Table 1 are referred to herein collectively as "telephone instruments". In general, a telephone instrument is any device that is accessed through the telephone network and has a telephone number associated with the instrument through which a "telephone call" can be established to transfer information to the instrument.

It is very easy to initiate a "telephone call" with any one of these telephone instruments. However, the trend toward a distributed workplace has made receiving telephone calls more difficult and time consuming for everyone. Typically, a mobile worker, or a worker who is based out of a home office or a small office, has one or more telephone instruments that ring in the office. However, when the worker is away from the office, e.g., traveling or at a client's site, the worker still needs the ability to receive a wide variety of telephone calls.

The current model of making a telephone call is based on a physical mapping with the caller knowing the telephone number of a telephone instrument (telephone, facsimile machine, modem, etc. . . . ) at the site of the party being called. This model requires that a caller knows the telephone number for each different type of telephone instrument at each different site where the called party may be located. For a worker that is at multiple sites, this requires that each party, who may want to contact the worker, knows a plethora of telephone numbers. For a party that must reach multiple workers at multiple different sites, the number of required telephone numbers grows even larger.

In view of the complexities of establishing communications, and the desire to support more exchange of information, many different services that each utilize a single different telephone number are being offered. Typical services available through a central office of a telephone company, a service provider, or available with some of the more sophisticated telephone instruments are listed in Table 2. Herein, a central office is the point electrically from which telephone services are provided. A service provider is a company that offers cellular telephone service, or paging service, for example.

TABLE 2

Telephone Services

| | | |
|---|---|---|
| Caller ID | Call Waiting | Three-way Calling |
| Distinctive Ring | Call Forwarding | Voice Mail |
| Menu Option Calling | Busy Call Forwarding | EMail |
| Voice Mail Boxes | No Answer Call Forwarding | 500 and 700 Services |
| Conference Calling | | |

Each of the services listed in Table 2 provides a single telephone number that can be called to either communicate with or leave information for a called party. However, these services only further complicate communications. With all these communication services, people now have many communication addresses, telephone numbers, and instruments that need constant checking. The once-simple idea of communicating has become even more complex.

Typically, each of the available services, such as central office, paging, and cellular, has a different telephone number. For each service, the user must give out a new telephone number for that service since calls can only be routed to a single number. Call forwarding was designed to alleviate this problem and allow a user to route a call to one telephone number to another telephone number of the user's choice.

In the current form, call forwarding can only be activated at the site assigned to the original telephone number, although certain companies are working to remove this limitation. The limitations of call forwarding include:

i) no selectivity as to which calls are forwarded;

ii) an inability to allow parallel ringing of an instrument at the location for the original telephone number and an instrument at the location for the forwarded telephone number; and iii) the difficulty of retaining messaging services on forwarded calls.

Forwarding calls on a user's telephone line to a cellular telephone introduces new problems since the cellular telephone may not be turned on. If the user has both cellular and central office voice mail, this increases the number of locations that must be routinely checked for messages. In addition, it is particularly difficult for the central office to detect when a cellular telephone is turned off and route the call to the central office voice mail system, because a cellular telephone that is turned off provides the same indication as an answered cellular call, i.e., ringing followed by a voice.

The ability to monitor calls, e.g. listening without the caller's knowledge as a call goes to voice mail, and choose which calls to answer or let go to voice mail, is another feature expected by workers in the home office. This ability is very valuable to the home office workers who may find themselves not always in a position to answer an incoming business call.

The ability to monitor incoming calls is lost when using call forwarding or central office voice mail, i.e, when the call is transferred to remote location. In addition, to monitor a call in the home office, the worker must be within hearing distance of the telephone answering device (TAD).

While it is important to route the many types of calls to the worker, it is also as important to allow the worker the ability to monitor calls that are routed to any location that is either not on the user's premises, or not within hearing distance of the user. To the best of the inventors' knowledge, the ability to remotely monitor calls is currently not available with any existing phone system or feature.

In the typical home office, callers have no options, or limited options. Typically, the incoming call is routed to a specific telephone instrument connected to the telephone line for the called telephone number, e.g., a modem, facsimile machine, or telephone. For voice communications, typically the telephone rings first and, if the call is not answered in a predetermined number of rings, the caller is sent to voice mail. As used herein, predetermined means that when a call is incoming the number of rings required before an action or operation occurs has been previously defined and so for a particular call is fixed. For this telephone set up, callers are never given the option to just leave a message without first trying to place a telephone call to the desired party.

Similarly, when calling a home office, a caller is not given an option to page the called party. This is a choice that must currently be made before making a phone call. The ability to call a single telephone number and make a decision after calling to page, talk, or send a voice mail message to the called party is not an option that is available to callers.

Currently, the small office worker has the option to only direct calls (e.g. ring a phone) to a single physical telephone instrument at a single location. When workers have locations at home, in a remote office, and in their car, this is very limiting. To increase the flexibility of routing telephone calls directed to the user's telephone number, central offices have developed a variety of new services. Central office services, such as Accessline, allow a user to establish a set of numbers to which calls can be routed. This type of service suffers, however, in that each incoming call can be routed only to a single destination at one time. Thus, this type of service ultimately suffers the same limitations as does call forwarding to a cellular telephone. They are also (reputed) to be difficult to change. Several RBOCs have offered 700 and 500 area-code telephone numbers that are designed to track a user for life. The key problem is that yet another new telephone number must be given out, and a user's callers must become aware of the new service.

In addition to routing calls from a premises, the user is also faced with routing calls on the premises. Most small business owners do not like to incur the extra expense associated with a Private Branch Exchange (PBX) to handle multiple telephone lines. Thus, a market has developed for fax line managers and similar routers (e.g., distinctive ring routers) that only direct calls to telephone instruments on the customer's premises. In general, this type of router does not allow a call to be re-routed once a connection is established to a particular telephone instrument.

Unfortunately, none of the above services or devices satisfies all of a typical user's requirements. The requirements vary depending on what the user is doing and on what telephone instruments and services the user has chosen. A user may choose to take calls in a car, with unanswered calls going to voice mail or an answering machine. The user also may like to choose to have calls ring at a home office and at a client's office. The user may use a client's voice mail while the user is on-site, and use his or her own when at home. The list of potential requirements is endless. Unfortunately, as described above, a system is not currently available that can provide such services unless the user is willing to install an expensive PBX or similar system and even then the problems with monitoring, routing, and taking calls off site is not solved.

The situation is exacerbated by the excessive complexity in connecting a caller to a party in view of the different types of calls transmitted through the telephone network, the large number of telephone instruments that a typical user accesses, and the large number of telephone numbers that a user must provide to be called at many different locations. To reduce the complexity, the number of telephone numbers known to the caller must be reduced; calls must be dynamically routed depending on the type of call and the circumstances of the connection process; and some new services, such as monitoring a call at any location, must be added to aid in the programmable routing of the calls. Unfortunately, to the best knowledge of the inventors, none of these functions is available today at the personal level from the existing telephone service providers.

SUMMARY OF THE INVENTION

According to the principles of this invention, a personal call manager on a user's premises solves the prior art limitations on routing telephone calls on a plain old telephone system (POTS) telephone line. The personal call manager eliminates the necessity of knowing a number of telephone numbers to reach a party, and the necessity of knowing the location of a party to reach that party.

With the personal call manager, when a caller calls a primary telephone number for the owner of the personal call manager, the personal call manager selectively routes the incoming call to any combination of local extensions on the owner's premises, sometimes referred to as the user's premises, and to remote extensions such as a telephone instrument on another premises, a pager, a cellular telephone, a central office voice mail box, and a cellular telephone voice mail box. Although each of the remote extensions may have a unique telephone number, the caller is required to know neither these telephone numbers, nor the location of the owner. Consequently, the personal call manager of this invention eliminates the prior art complexity associated with trying to reach a party at any one of a number of remote locations.

In addition to eliminating the complexity of reaching a party at multiple different locations, the personal call manager provides the user with a new level of capability in routing calls. The personal call manager retains control over an incoming call throughout the duration of the call. Consequently, the user can route the same incoming call to multiple locations, or transfer the call to a telephone answering service at any time after taking the incoming call.

Specifically, in one embodiment when an incoming call on the POTS telephone line is detected, the incoming call is routed to at least one telephone instrument having a POTS telephone number different from a telephone number for the POTS telephone line to the individual's premises. Control of the incoming call is maintained upon routing the incoming call to the at least one telephone instrument to allow further routing of the incoming call. The at least one telephone instrument can be a facsimile machine on the individual's premises; a facsimile machine remote from the individual's premises; a POTS telephone at a location remote from the individual's premises; or perhaps a cellular telephone. For example, the incoming call is routed to the another telephone instrument having a POTS telephone number different from the telephone number for the POTS telephone line connected to the at least one telephone instrument so that the another telephone instrument and the at least one telephone instrument ring in parallel, in one embodiment.

Alternatively, the routing of the incoming call to another telephone instrument different from the at least one telephone instrument is performed after the routing of the incoming call to at least one telephone instrument having a POTS telephone number different from a telephone number for the POTS telephone line. Thus, the at least one telephone instrument is rung prior to the routing the incoming call to another telephone instrument.

In one embodiment, the at least one telephone instrument is rung a predetermined number of times prior to the routing the incoming call to the another telephone instrument. Also, if desired, a menu of call routing options is played to the incoming caller after the at least one telephone instrument is rung a predetermined number of times and the incoming caller is allowed to select the another telephone extension.

In another embodiment, an incoming call on the POTS telephone line is routed directly, based on the type of call, e.g., voice, facsimile, or modem, either to a local extension or to a remote extension. Specifically, according to the principles of this invention, the personal call manager determines a type of the incoming call on the POTS line to the individual's premises. The personal call manager then routes the incoming call to one of an extension on the individual's premises and an extension remote to the individual's premises based upon the type of the incoming call. Thus, unlike prior art call forwarding that indiscriminately forwarded each incoming call, the method of this invention selectively forwards calls based on the call type.

As explained above, prior art call forwarding was not selective and could not be controlled by the caller. In contrast, also as indicated above, the personal call manager of this invention can be configured to provide a caller with options for routing the call, both to local extensions on the owner's premises and to remote extensions. Unlike prior art systems that automatically call forwarded every incoming call, or transferred a call to voice mail or a telephone answering device, the personal call manager gives the caller control over the routing of the call, in this embodiment. Also, since the personal call manager retains control over the call, the caller can utilize one or more of the call routing options provided.

The personal call manager of this invention works with any commodity POTS telephone instrument without modification of the instrument. The majority of the features of this invention require only a connection to a POTS telephone trunk line with three-way calling. Herein, a POTS telephone trunk line refers to the primary POTS telephone line for a user's premises. Consequently, an owner with a telephone number used primarily for voice calls, and a facsimile telephone number can simply install the personal call manager of this invention and have three-way calling activated at the central office, if it is not already available at the owner's premises. The personal call manager appears to the central office as just another commodity POTS telephone instrument.

If the one of the extension ports of the personal call manager is connected to a modem, another to a facsimile machine, another to a telephone answering device, and yet another to a POTS telephone, the caller does not need to know a telephone number for each of the different telephone instruments. Rather, the personal call manager detects whether, for example, the call is a facsimile or modem transmission. Upon detection of a facsimile transmission, the personal call manager can connect the call to either a local facsimile machine or a remote facsimile machine. Consequently, unlike prior art call forwarding that indiscriminately forwarded all calls, the personal call manager of this invention can selectively route an incoming call based upon the particular type of the incoming call.

According to the principles of this invention, the personal call manager detects an incoming call on the POTS telephone trunk line and rings a local extension on the individual's premises in response to the incoming call. The personal call manager maintains control of the incoming call upon the local extension going off-hook so that the personal call manager can route the incoming call to another extension upon detection of a predetermined code entered on the local extension. The another extension can be either an extension on the individual's premises, or an extension remote to the individual's premises, e.g, a remote telephone or a cellular telephone. Alternatively, if the local extension is not answered, the personal call manager can route the incoming call to other extensions, either local or remote. Thus, the personal call manager eliminates the necessity of knowing a number of telephone numbers to reach a party, and the necessity of knowing the location of a party to reach the party.

In addition, when personal call manager detects an incoming call on the POTS telephone trunk line and rings a local extension on the individual's premises in response to the incoming call, the personal call manager can also ring a remote extension upon detection of the incoming call. In this embodiment, both the remote and local extensions ring in parallel. Alternatively, the personal call manager can ring only a local extension, or ring only a remote extension.

After the user of the personal call manager takes an incoming call, either at a local extension, or at a remote extension, the user can transfer the call either to a local answering device, or to a remote telephone answering service such as central office voice mail or cellular telephone voice mail. For example, if in response to an incoming call, the personal call manager called the user's cellular telephone and the user took the call, the personal call manager still controls the call. Thus, if the caller wants to leave detailed information, the user can route the call to the telephone answering service to have the detailed information recorded for future use.

In another embodiment, the personal call manager detects an incoming call on the POTS telephone trunk line, and rings a local extension on the individual's premises before taking the POTS telephone trunk line off-hook. After the local extension is rung a first predetermined number of rings MAX1, the personal call manager takes the POTS telephone trunk line off-hook. For example, the trunk line is taken off-hook before the number of rings required to transfer the call to central office voice mail.

After the trunk line is taken off-hook, the personal call manager continues ringing the local extension. If the local extension is not answered within a second predetermined number of rings MAX2, the personal call manager transfers the call to voice mail, presents the caller with a menu of call handling options, or routes the incoming call to other local or remote extensions. Irrespective of the options implemented, the personal call manager maintains control of the incoming call. Also, the second predetermined number of rings MAX2 can be selected as less than, equal to, or greater than the first predetermined number of rings MAX1, and each selection provides a different type of call routing capability.

If the personal call manager routes the call to central office voice mail using three-way calling, the personal call manager places the incoming call on hold, dials the telephone number of the POTS telephone trunk line carrying the incoming call, and completes the three-way call connection. Since the incoming call is on the POTS telephone trunk line, the trunk line is busy and so the central office transfers directly to voice mail without any additional delay. However, since the personal call manager has retained control of the call, the personal call manager can still connect the incoming call to another extension even after the transfer to central office voice mail.

If the personal call manager plays a menu of call handling options to the incoming call, the personal call manager routes the incoming call to another extension where the another extension is specified by a selection of a call handling option from the menu. The another extension can be a cellular telephone, a local extension, a remote telephone, a local or remote facsimile machine, or a telephone answering service, for example. The menu can be played only after ringing a local extension, after ringing a remote extension, or after ringing a local extension and a remote extension in parallel.

Thus, while the personal call manager of this invention appears to the central office as a POTS telephone instrument, the personal call manager provides functionality to the caller and the owner similar to that which was previously found only at a central office. In addition, the personal call manager provides call routing capabilities that were previously not available using only POTS telephone lines, POTS telephone instruments, and central offices.

BRIEF DESCRIPTION OF THE DRAWINGS

In the drawings, all elements with the same reference numeral are the same element. Also, in a reference number, the first number for FIGS. 1 to 9 and the first two numbers for FIGS. 10 through 26 indicate the first figure in which the element with that reference numeral appeared.

DETAILED DESCRIPTION

Figure 1:
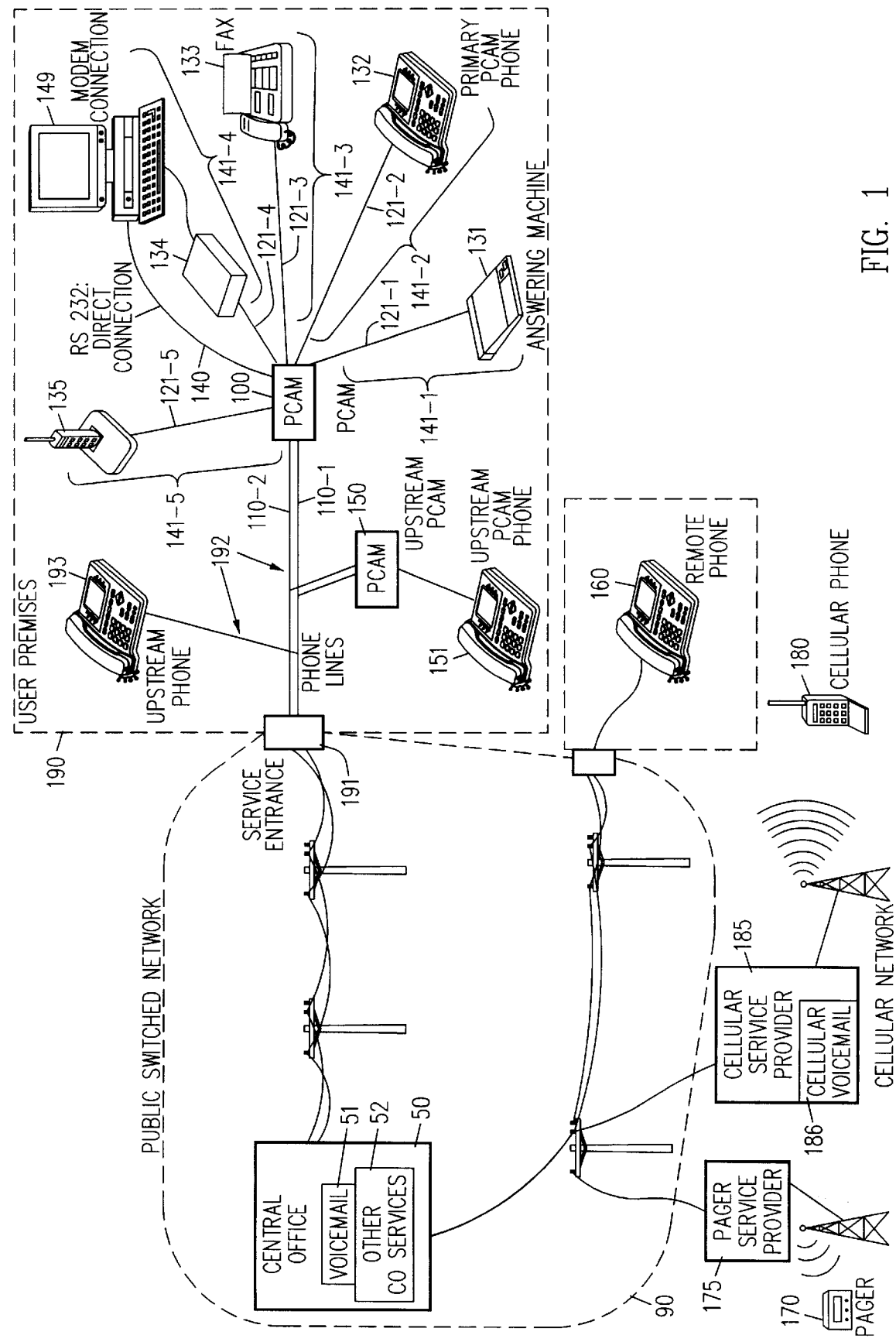
FIG. 1 is an illustration of a system, according to the principles of this invention, that includes the novel user programmable personal call manager (PCAM) of this invention.

A first novel user programmable personal call manager (PCAM) 100, that is located on an individual user's premises 190, provides a new level of capability in call routing, call monitoring, and call handling. Programmable personal call manager 100, sometimes referred to as personal call manager 100 and PCAM 100, programmably routes telephone calls both on and off user's premises 190 and works with current answering machines, facsimile machines (faxes), modems, plain old telephone system (POTS) telephones, cellular telephones, pagers, and regional Bell operating companies (RBOCs) or cellular telephone voice mail services, i.e., any POTS telephone instrument.

In one embodiment, personal call manager 100 simultaneously rings telephone instruments 131 to 135 on user's premises 190, cellular telephone 180 and remote telephone 160, for example, in response to an incoming telephone call on telephone trunk line 110-1. Consequently, the user can take the incoming telephone call at any of several telephone instruments that are either on user's premises 190, or remote from user's premises 190.

When any one of the telephone instruments is answered, the caller is connected to that telephone instrument and all the other telephone instruments discontinue ringing. For example, when cellular telephone 180 is answered by the user, personal call manager 100 discontinues ringing telephone instruments 131 to 135 and remote telephone 160.

Hence, the caller has to know only the primary telephone number for user's premises 190, but yet multiple telephone instruments, that may each have an individual telephone number, are accessed. The need for the caller to know each of the telephone numbers for the various telephone instruments has been eliminated.

Consequently, the prior art complexity associated with a caller connecting to a party that may be at multiple locations with each location having multiple telephone numbers has been eliminated. As explained more completely below, the owner of personal call manager 100 configures PCAM 100 to route incoming calls as necessary so that all a caller has to do to reach the owner is call the owner's primary telephone number for trunk line 110-1.

After an incoming call is answered, personal call manager 100 retains control of the call. Consequently, the user can transfer the call to any other telephone instrument connected to personal call manager 100 on premises 190, or to a remote telephone instrument. In fact, the user can make unlimited transfers after a call is taken, including transfers to voice mail and answering machines.

For example, after the user takes the call on cellular telephone 180, if the user determines that the information provided by the caller needs to be recorded, the user enters a predetermined code, i.e., a programmably defined key or key sequence, on cellular phone 180 and personal call manager 100 connects the caller to telephone answering machine 131. PCAM 100 allows the owner to programmably select each of the predetermined codes described herein.

As used herein, predetermined code or a predetermined number of rings means that when a call is incoming the code and/or number of rings required to cause an action or operation to occur has been previously defined and so for a particular incoming call is fixed. Typically, the predetermined code is an oral statement for voice recognition, a key or key sequence for a DTMF interface, or any other predefined signal or signals that can be detected by personal call manager 100. The predetermined codes, predetermined number of rings, and other predetermined signals are programmable and can be set by the user in either configuring personal call manager 100 or a call handler, as described more completely below.

Hence, according to the principles of this invention, an incoming call to user's premises 190 can be routed by personal call manager 100 to any combination of telephone instruments 131 to 135 on user's premises 190 as well as selectively forwarded to remote locations specified by the user. Consequently, a caller can reach the user by calling a single telephone number, and is unaware of whether the call is being taken on user's premises 190 or some other remote location, e.g., remote phone 160, or cellular telephone 180.

In the above example, personal call manager 100 simultaneously rang telephone instruments 131 to 135 on user's premises 190, cellular telephone 180 and remote telephone 160, and the call was taken by the user. However, personal call manager 100, as explained more completely below, can be configured to simultaneously ring any combination of local extensions, e.g., telephone instruments 131 to 135 and remote extensions such as cellular telephone 180 and remote telephone 160. For example, personal call manager 100 can be configured to ring only a local extension, only a remote extension, or only a local extension and a remote extension.

Also, for any combination of extensions, personal call manager 100 can be configured to perform any of a number of different operations after the extension or combination of extensions are rang a predetermined number of times. In one embodiment, personal call manager 100 presents the caller with a menu of call routing options. The menu of call routing options permits the caller to route the call, i.e., selectively call forward the call, to other extensions or other services, e.g., a pager 170 or central office voice mail 51 or perhaps another of central office services 52.

Consequently, unlike prior art systems that required the caller to make a selection of a POTS telephone number for a specific POTS telephone line, or POTS telephone instrument to reach the called party, e.g, pager 170, cellular telephone 180, remote telephone 160 or telephone 132, personal call manager 100 allows the caller to a call a single telephone number. Personal call manager 100 subsequently provides the caller with alternative call routing options so that the caller can selectively call forward the call. Therefore, personal call manager 100 eliminates the need for a caller to know multiple different numbers for the user of PCAM 100 and eliminates the need for the caller to guess at which of the multiple different telephone numbers the user is located.

Programmable personal call manager 100 also can be configured by the owner to selectively forward incoming calls, based on the type of incoming call. For example, a facsimile or modem transmission can be accepted at premises 190, while all voice calls are available both at premises 190 and at a remote location. Alternatively, only modem transmissions, or only facsimile transmissions, could be forwarded to a remote location. The selective call forwarding to either a local extension, a remote extension, or both, based on the type of incoming call on a POTS telephone line provides a new level of capability in handling and routing the incoming calls.

Unlike call forwarding provided by the RBOCs that requires the user to make a decision to receive a call at only one of a) the user's premises and b) a remote location, and that requires uniform treatment of all incoming calls, personal call manager 100 permits:

(i) call forwarding of all incoming calls to premises 190;
(ii) simultaneous call forwarding of all incoming calls to premises 190 and ringing of any combination of telephone instruments 131 to 135 on premises 190; and
(iii) call forwarding of a selected type of incoming calls to premises 190 and ringing of any combination of telephone instruments 131 to 135 on premises 190.

Currently, a user can configure personal call manager 100 to transfer an incoming call to any one of a telephone answering machine 131 on premises 190, a voice mailbox in a personal computer 149 on premises 190, or a voice mailbox 51 at central office 50 after a predetermined number of rings. Typically, after voice mailbox 51 at central office 50 takes the call, the user on premises 190 can no longer monitor, or take the call. If a user is in physical proximity, i.e., within hearing distance, to either telephone answering machine 131, or personal computer 149, the user can typically hear any message being left, and can pick up the call. However, upon taking the call, the user cannot send the call back to the telephone answering machine 131 to record a message and hang-up. The user may be able to record the conversation using telephone answering machine 131 while remaining on the line.

In contrast, personal call manager 100, as indicated above, and explained more completely below, retains control over all calls even after a call is answered by either a telephone instrument such as telephone answering machine 131, or the user. This provides the user unparalleled call handling flexibility in monitoring, taking, and subsequently, transferring calls.

For example, the user can configure personal call manager 100 so that any telephone on premises 190, remote phone 160, or cellular telephone 180 is a monitor telephone. In response to an incoming call, personal call manager 100 calls the monitor telephone and establishes a one-way connection with the incoming call. Personal call manager 100 simultaneously rings the telephone answering machine 131 and other local telephone instruments or remote telephone instruments specified by the user.

When the user answers the monitor telephone, PCAM 100 informs the user of the monitor call, and the user can either take the monitor call or hang-up. If the user takes the monitor call, when telephone answering machine 131 answers the incoming call, the user can listen to the message being left using the monitor telephone. However, due to the one-way connection to the monitor telephone, the caller is not aware that the call is being monitored.

At any time during the call, the user can take the call from the monitor telephone by entering a predetermined code on the monitor telephone. In response to the predetermined code, personal call manager 100 establishes a two-way connection between the caller and the monitor telephone. After taking the call, the owner can return the call to telephone answering machine 131. Alternatively, the user can take the incoming call from the monitor telephone before the call is answered by the telephone answering device or a telephone answering service.

Similarly, if PCAM 100 transfers the incoming call to central office voice mail 51, or cellular telephone voice mail 186, the user on the monitor telephone can listen to the message and take the call if desired. After the user takes the call, the user can subsequently route the call to any telephone instrument or premises 190 or to either central office voice mail 51 or cellular voice mail 186. The monitor, take, and subsequent transfer capability of personal call manager 100 works not only for telephone answering machine 131, but also for any other telephone instrument on premises 190, cellular telephone voice mail 186, and RBOC voice mail 51.

The ability to monitor an incoming call that has been transferred to either a local or remote answering device provides the user with a new level of capability. Previously, when an answering device took a call, the user could monitor the call, as explained above, only if the user was in physical proximity to the answering device. In the prior art, when an incoming call transferred to central office voice mail 51, it was possible neither to listen while the message was being left, nor to take the call.

Personal call manager 100 is not a PBX. Personal call manager 100 looks to CO 50 like a POTS telephone, but to POTS telephone equipment connected to personal call manager 100, personal call manager 100 provides call routing and call handling functionality that was previously available only through one or more CO services 52, and in addition, services like call monitoring and call routing based upon the type of incoming call that were not previously available. This enhanced level of functionality requires at most two telephone lines 110-1 and 110-2 to user's premises 190 and three-way calling. As explained more completely below, most of the capability of PCAM 100 can be implemented using only a single POTS telephone line and three-way calling.

As indicated above, an important feature of PCAM 100 is that only one POTS telephone number is called, and PCAM 100 takes the call and can route the call to any local extension, or to a remote extension. There are two methods which PCAM 100 can use to route a call on public switched network (PSN) 90. The method chosen depends on whether the user has three-way calling on one of trunk lines 110-1 and 110-2 connected to PCAM 100. The main differences between the two methods are in the resources used, and in the view presented to callers.

A multiple-line routing technique uses telephone trunk lines 110-1 and 110-2 to route a call. By using second telephone trunk line 110-2, the caller on primary telephone trunk line 110-1 is not aware that the call is being routed from user's premises 190. Thus, this technique is preferred for implementing remote call monitoring. The three-way calling technique plays an announcement to the incoming caller, places the incoming call on hold, calls the remote telephone instrument using CO three-way calling and then connects the incoming caller to the three-way call. Thus, with this technique, the caller is aware that the call is being processed.

The particular key sequences entered by a user to route, take, and transfer calls is programmable. In addition, the call routing, call handling, and call monitoring capabilities of PCAM 100 are programmable. The user can configure a plurality of call handlers that are stored in PCAM 100. Each call handler specifies the call routing, call handling, and call monitoring capabilities that are implemented by PCAM 100 when that call handler is activated. Thus, the user can change the functionality of PCAM 100 simply by activating a different call handler.

In one embodiment, the user of PCAM 100 activates a call handler by entering a configuration mode of PCAM 100 and selecting an activate call handler option using a DTMF interface, e.g., a POTS telephone keypad, on a telephone instrument connected to PCAM 100, e.g., either a local or remote extension. Upon detecting the activate call handler selection in the configuration mode, PCAM 100 plays a menu of available call handlers to the user, e.g., plays an oral message that indicates a number and a name for the corresponding call handler for each entry in the menu. The user activates the call handler by entering the number of the call handler using the DTMF interface.

Alternatively, the user of PCAM 100 first configures a call handler by entering the configuration mode of PCAM 100 and selecting a configure call handler option using a DTMF interface, e.g., a POTS telephone keypad, on a telephone instrument connected to PCAM 100, e.g., either a local or remote extension. Upon detecting the configure call handler selection in the configuration mode, PCAM 100 plays a series of oral messages that prompt the user to enter information needed to configure the call handler. After the call handler is configured, the user can then activate that call handler. Alternatively, call handlers can be configured and activated using a graphical user interface on computer 149 connected to serial port 140.

The embodiment of this invention presented in FIG. 1 is described further to provide definitions that assist in more completely describing the operation of personal call manager 100. A telephone call directed to user's premises 190 over public switch network (PSN) 90, i.e., the entire network of central offices, enters user's premises 190 at a service entrance 191. Service entrance 191 demarks the electrical separation between premises wiring 192 and that specific to the telephone service provider. Service entrance 191 may connect a plurality of telephone lines on user's premises 190, referred to as premises wiring 192, to public switched network 90.

A primary POTS telephone trunk line 110-1 connects service entrance 191 to a first personal call manager 100. Primary telephone trunk line 110-1 is the line that carries a ring signal when a primary telephone number is called for user's premises 190. The primary telephone number is the telephone number that the user typically uses for business calls. A user may have more than one primary telephone number, although for simplicity herein a single primary telephone number is assumed. Calls to the primary number are subject to routing, monitoring, and handling by first personal call manager 100. This single telephone number is all that is required to send a fax to the user, make a modem connection, or to reach the user on cellular telephone 180, for example. The user makes the desired selection by either activating a call handler, or configuring and then activating a call handler.

In general, personal call manager 100 of this invention must be connected to a primary telephone trunk line 110-1 and to one or more additional telephone lines 110-2 that also may be primary number telephone lines. As explained more completely below, the additional telephone lines are only required for remote call monitoring. All other features of this invention can be accomplished using primary telephone trunk line 110-1, local extensions 141-1 to 141-5, and three-way calling. Three-way calling is a feature offered within other CO services 52 by local phone companies which allows a single caller to initiate a call between up to three parties. A more complete listing of one embodiment of other CO services 52 is given in TABLE 2 above.

Personal call manager 100 provides distributed control of incoming telephone calls to user's premises 190, and permits calls to be routed between telephone trunk lines 110-1 and 110-2 and extensions 141-1 to 141-5. Personal call manager 100 is capable of detecting and generating all required signals that are typically generated and detected by central office 50 on both telephone trunk lines 110-1 and 110-2 connected to service entrance 191, and telephone lines 121-1 to 121-5 of extensions 141-1 to 141-5, respectively. Personal call manager 100, as described more completely below, serves as an intelligent master in controlling telephone operations for an individual user's premises 190.

Each of extensions 141-1 to 141-5, sometimes called downstream extensions, includes a telephone line, e.g., one of telephone lines 121-1 to 121-5, that is connected at one end to an extension output port of personal call manager 100 and at the other end to one or more telephone instruments, such as answering machine 131, primary personal call manager telephone 132, facsimile machine 133, modem 134, and cordless telephone 135, respectively. Herein, a telephone answering device (TAD) is a commodity telephone answering machine. In general, PCAM 100 works with all commodity telephone instruments without any modification to those instruments.

Personal call manager 100 also has a serial port 140 that is connected to computer 149. Computer 149 can be used to configure personal call manager 100, as explained more completely below.

Upstream telephone 193 is electrically connected to primary telephone trunk line 110-1 in parallel with personal call manager 100. A second personal call manager 150, that is physically identical to first personal call manager 100 but is configured differently, also is electrically connected to primary telephone trunk line 110-1 in parallel with personal call manager 100. Personal call manager 150 is upstream from personal call manager 100.

In general, a remote telephone instrument, such as remote telephone 160, cellular telephone 180, or pager 170, is any telephone instrument that can be reached by dialing a telephone number on PSN 90. In the case of cellular telephone 180, or pager 170, the call is routed over PSN 90 to a cellular telephone service provider 185, or pager service provider 175, respectively, which in turn broadcasts a signal to the telephone instrument. Herein, a remote telephone instrument is sometimes referred to as a remote extension.

An incoming call to the primary telephone number for user's premises 190 is directed to personal call manager 100. An incoming call rings at upstream phone 193, upstream personal call manager 150 (and thereby all extensions connected to PCAM 150) and personal call manager 100. Before PCAM 100 answers the incoming call, all upstream telephone instruments and PCAMs are actually being rung by central office 50. On premises 190, PCAM 100 cannot directly ring an upstream phone, because such an operation is not physically possible.

When any telephone instrument answers, i.e., goes off-hook, PCAM 100 detects the off-hook signal from the telephone, and stops ringing all other telephone instruments. The caller is connected immediately by PCAM 100 to the telephone instrument that went off-hook.

Specifically, when the called party takes the call, personal call manager 100 generates a positive off-hook signal to indicate to the calling party that the called party has gone off-hook, and is ready to take a call. For the off-hook signal to be positive, the off-hook signal is delivered within 200 milliseconds of the called party going off-hook. For the off-hook signal to be universal, the positive off-hook signal is available irrespective of either the location of the calling or called party, or the particular central offices or cellular networks through which the call is routed.

However, for remote telephone instruments, there is no universal off-hook indication that can be detected by PCAM 100, and so PCAM 100 does not rely upon receiving such an off-hook signal to generate a universal positive off-hook signal. Rather, an off-hook indication on remote telephones can be detected in either of two ways. First, the user can enter a DTMF code from the remote telephone to take the call, i.e, inband signaling is utilized. The other way of detecting that a remote telephone has been picked up is to monitor the ring back call progress tone. The ring back call progress tone goes away when a remote telephone is answered. By using either of these two ways to detect a remote telephone going off-hook, PCAM 100 can always generate a universal positive off-hook signal.

If no telephone goes off-hook within a programmable predetermined period, usually three to four rings, PCAM 100, in one embodiment, sends the call either to voice mail, or to answering machine 131. The caller can then leave a message. Alternatively, as indicated above, after a predetermined number of rings, the caller can be presented with a menu of options that allows the caller to route the call. Thus, unlike prior art systems that sent the caller only to voice mail, the caller can be presented routing options such as calling any one of remote telephone 160, cellular telephone 185, pager 170, or CO voice mail 51. In addition, the caller can be given the ability to return to the menu if the call routing choice does not reach the owner of PCAM 100. Thus, knowing only the primary telephone number, the caller can control and route the call to any location provided by PCAM 100 and can make multiple routing choices before going to voice mail.

All calls to the primary telephone number pass through personal call manager 100, no matter what their ultimate destination. This enables personal call manager 100 to monitor calls for DTMF tones, and thus allows personal call manager 100 to control transfers, and to route calls on demand.

As indicated above, personal call manager 100 can route the incoming call to multiple telephone instruments 131 to 135 at user's premises 190 and to telephone instruments 160, 170, 180 at remote locations, whether reached by land lines or wireless connections. Furthermore, the incoming call can be transferred, once taken at any one of these telephone instruments, to any other downstream extension including answering machine 131, to CO voice mail 51, or to cellular telephone voice mail 186, for example. In addition, the user can privately monitor an incoming call from a monitor telephone and, if desired, take the call. As long as a call is in progress, personal call manager 100 monitors, i.e., maintains control over, the call so that all the various options provided by personal call manager 100 are available.

The owner of PCAM 100 controls the operation of PCAM 100 by assigning a call handler to each telephone trunk line connected to PCAM 100. The call handler either routes the call directly, or provides a menu to the caller, and can establish a monitor call for either direct routed calls or calls routed by a menu selection. The owner of PCAM 100 can configure and activate a call handler from either computer 149 or from any telephone instrument, either local or remote, that has a DTMF interface.

Figure 2:
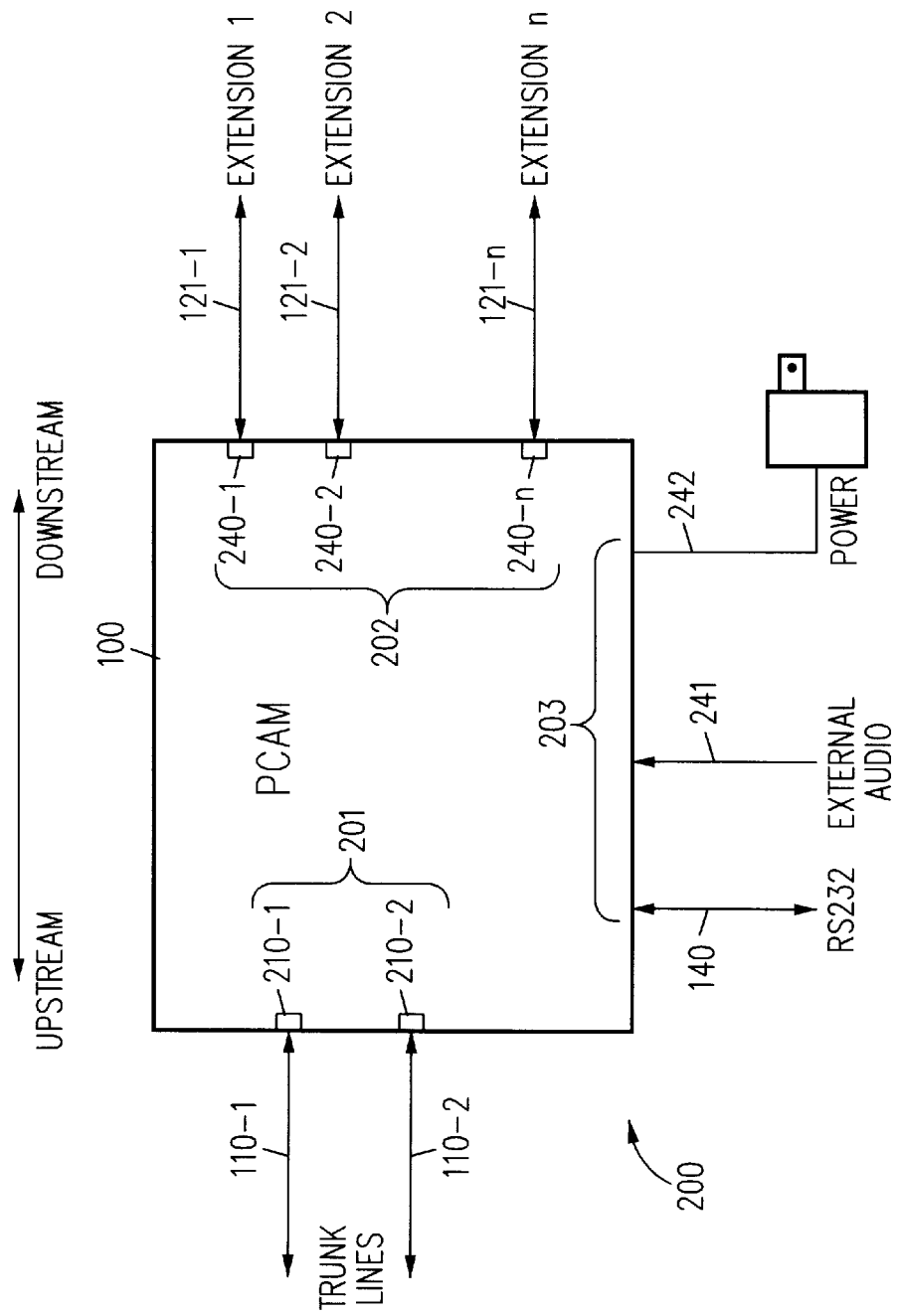
FIG. 2 is a more detailed diagram of the signal interface of one embodiment of the novel user programmable Personal Call Manager (PCAM) of this invention.

FIG. 2 is a block diagram that shows one embodiment of a signal interface 200 for personal call manager 100. First, for convenience, an upstream and a downstream direction are defined. Upstream is from PCAM 100 towards service entrance 191, and downstream is from PCAM 100 away from service entrance 191.

PCAM 100 has a public switched network telephone line interface 201 that includes two bidirectional trunk ports 210-1 and 210-2 for connection to trunk telephone lines that connect through service entrance 191 to public switched telephone network 90. Trunk port 210-1 receives the primary telephone trunk line 110-1 and must always be connected during operation of PCAM 100. Trunk port 210-2 receives a second optional telephone trunk line 110-2.

PCAM 100 also has an extension interface 202 that includes a plurality of extension ports 240-1 to 240-n that are connected by a telephone line to at least one telephone instrument. Each of extension ports 240-1 to 240-n is identical. A utility interface 203 includes RS232 serial port 140, an external audio input port 241 and a power input port 242.

Figure 3:
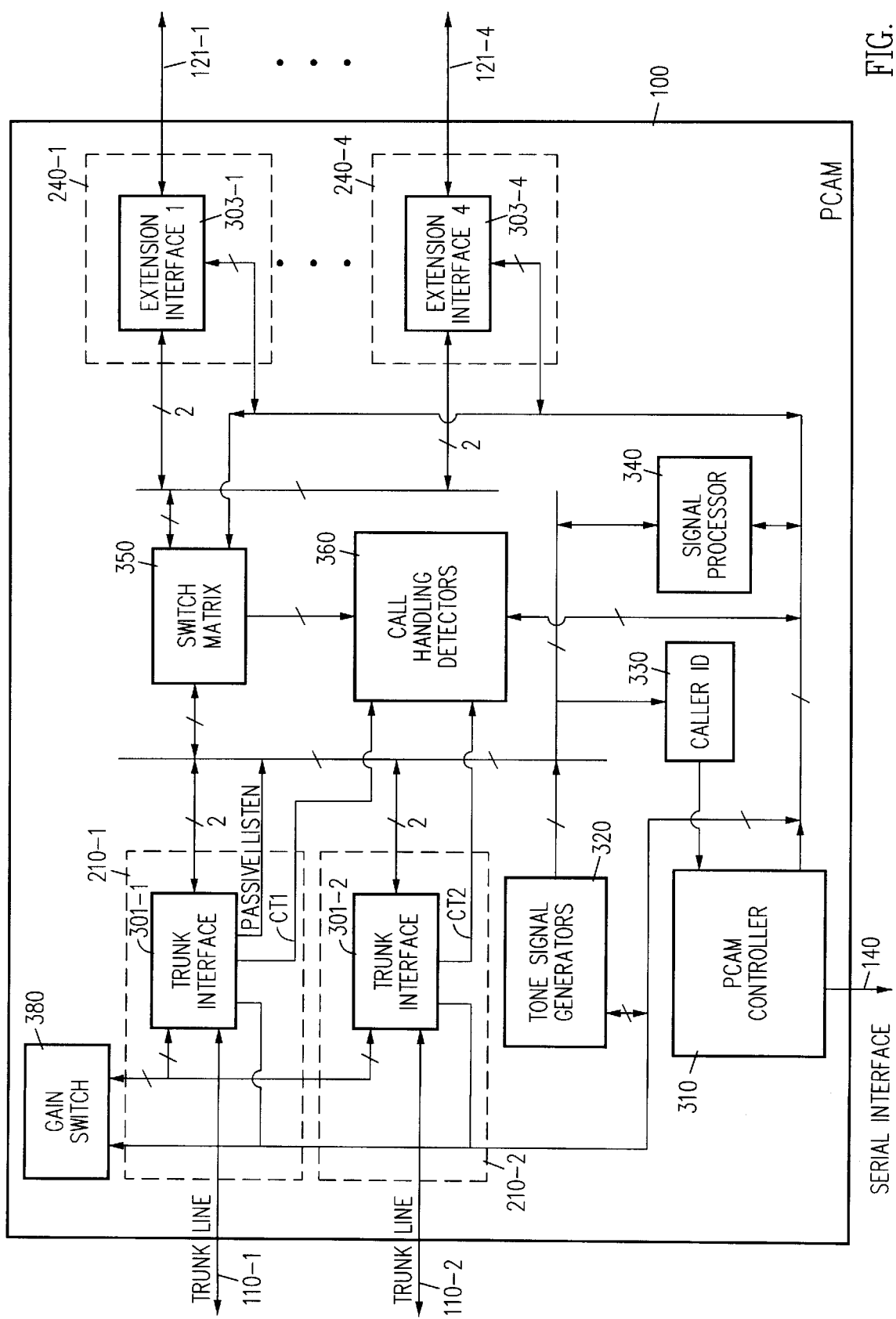
FIG. 3 is a more detailed block diagram of one embodiment of the novel user programmable Personal Call Manager (PCAM) of this invention.

FIG. 3 is a more detailed block diagram of one embodiment of personal call manager 100. In FIG. 3 and subsequent figures, a line with a slash through it is used to represent a plurality of lines. PCAM 100 includes a plurality of trunk interface subsystems 301-1 and 301-2. Each trunk interface subsystem 301-i receives signals from and drives signals on a telephone trunk line 110-i connected to the trunk interface subsystem.

PCAM 100 also includes a plurality of extension interface subsystems 303-1 and 303-4. Each extension interface subsystem 303-i receives signals from and drives signals on a telephone extension line 121-i connected to that extension interface subsystem.

Trunk interface subsystems 301-1, 301-2 and extension interface subsystems 303-1 and 303-4 are each connected to a different input line of programmable switch matrix 350 and to a different output line of switch matrix 350. Each input line of programmable switch matrix 350 is programmably connectable to and disconnectable from each output line of programmable switch matrix 350.

Programmable PCAM controller 310, sometimes called PCAM controller 310, connects a particular extension 121-i to a particular trunk line 110-i by establishing a particular connection within programmable switch matrix 350, i.e., PCAM controller 310 programmably configures switch matrix 350. PCAM controller 310 establishes a two-way connection in switch matrix 350 so that both parties to the call can hear and talk to each other. If PCAM controller 310 establishes a one-way connection in switch matrix 350, one party can hear the other party without the knowledge of the other party. As explained more completely below, a one-way connection is used for call monitoring.

In addition to the trunk and extension subsystems, a tone signal generator subsystem 320 is connected to a plurality of input lines of switch matrix 350. A call handling detector subsystem 360 is connected to a plurality of output lines of switch matrix 350 and a caller identification (ID) circuit 330 is connected to an output line of switch matrix 350. A signal processor 340 is connected to an input line and an output line of switch matrix 350.

PCAM controller 310 is connected to trunk interface subsystems 301-1, 301-2, extension interface subsystems 303-1 and 303-4, tone signal generator subsystem 320, signal processor 340, and call handling detector subsystem 360. As explained more completely below, PCAM controller 310, using a call handler, coordinates operation of the various components to permit the owner of PCAM 100 to route, handle, and, monitor telephone calls. PCAM controller 310 maintains control of a call at all times.

PCAM controller 310 uses tone signal generator subsystem 320 to dial remote telephone numbers, and to generate dial, ring back, and other tones. PCAM controller 310 uses signal processor 340 to record custom messages and to play back the custom messages at appropriate times. PCAM controller 310 uses call handling detector subsystem 360 to monitor the progress of a call, to detect predetermined codes entered by a user and in some applications, a caller, and to detect particular signals on trunk lines 110-1 and 110-2, e.g. fax or modem signals.

Thus, if one of extension ports 141-i is connected to a modem, another to a facsimile machine, another to a telephone answering device, and yet another to a POTS telephone, the caller does not need to know a telephone number for each of the different telephone instruments. Rather, PCAM controller 310 configures switch matrix 350 to pass the incoming call to call handling detector subsystem 360.

Call handling detector subsystem 360 detects whether, for example, the call is a facsimile or modem transmission.

Upon notification that the call is a facsimile transmission, PCAM controller 310 connects the incoming call to either a local facsimile machine or a remote facsimile machine. Consequently, unlike prior art call forwarding that indiscriminately forwarded all calls, personal call manager 100 of this invention can selectively route incoming calls based upon the particular type of incoming call.

PCAM controller 310 programmably configures trunk interface subsystem 301-i to take trunk line 110-i off-hook, e.g., trunk interface subsystem 301-i has an off-hook state. If trunk interface subsystem 301-i is not in the off-hook state, trunk interface subsystem 301-i is in an on-hook state. In the on-hook state, PCAM controller 310 connects a passive listen line from trunk interface subsystem 301-1 to call handling detector subsystem 360 so that PCAM controller 310 can detect DTMF tones entered by a telephone instrument upstream from PCAM 100. The ability to detect DTMF tones while on-hook is a novel capability not found in prior art POTS telephone instruments.

As explained more completely below, PCAM controller 310, in response to a signal from trunk interface subsystem 301-1, detects each ring for an incoming call on trunk line 110-1. Upon detecting an incoming call, PCAM controller 310 can generate a ring signal on any one, or any combination of extension lines 121-1 to 121-4. PCAM controller 310 can also generate a signal to trunk interface subsystem 301-1 to take trunk line 110-1 off-hook at any desired time, i.e, answer the incoming call at any desired time. Thus, PCAM 100 is programmably configurable to provide a wide variety of novel capabilities.

However, although PCAM controller 310 answers the call, PCAM controller 310 can configure switch matrix 350 to connect tone signal generator subsystem 320 to trunk line 110-1 and can configure tone signal generator subsystem 320 to generate signals on trunk line 110-1 such that the caller is not aware that PCAM 100 has answered the incoming call. This allows PCAM 100 to take control of the incoming call and consequently to maintain control of the incoming call throughout the duration of the call without the knowledge of the calling party.

Either after, or prior to answering an incoming call, PCAM controller 310 can configure tone signal generator subsystem and switch matrix 350 to establish a connection with a telephone instrument remote from user's premises 190. This allows PCAM controller 310, for example, to establish a remote monitor call, to transfer the incoming call to a remote telephone answering service, to establish a call to a remote telephone extension, or to do selected combinations of these operations.

As described above, primary telephone trunk line 110-1 to a central office, PBX, or another personal call manager is connected to a first trunk interface subsystem 301-1 in trunk port 210-1. Trunk interface subsystem 301-1 drives a trunk one receive input line 410-1 (FIG. 4) to switch matrix 350 and receives signals on a trunk one transmit output line 411-1 from switch matrix 350.

A second telephone line 110-2 to a central office, PBX, or another personal call manager is connected to a second trunk interface subsystem 301-2 (FIG. 3) in trunk port 210-2. Trunk interface subsystem 301-2 drives a trunk two receive input line 410-2 (FIG. 4) to switch matrix 350 and receives signals on a trunk two transmit output line 411-2 from switch matrix 350.

As indicated above, trunk interface subsystems 301-1 and 301-2 (FIG. 3) are connected to PCAM controller 310. Specifically, as explained more completely below, control registers and status registers in PCAM controller 310 are connected to trunk interface subsystems 301-1 and 301-2. Also, the input lines to switch matrix 350 from trunk interface subsystems 301-1 and 301-2 are both connected to a gain switch circuit 380, that is also connected to a control register in PCAM controller 310. Gain switch circuit 380, as described more completely below, is one embodiment of an amplification and echo cancellation control circuit.

Trunk interface subsystems 301-1 and 301-2 are identical. Hence, in the following discussion reference number 301-i is used and should be read as 301-1 for trunk line 110-1, and as 301-2 for trunk line 110-2.

Figure 5:
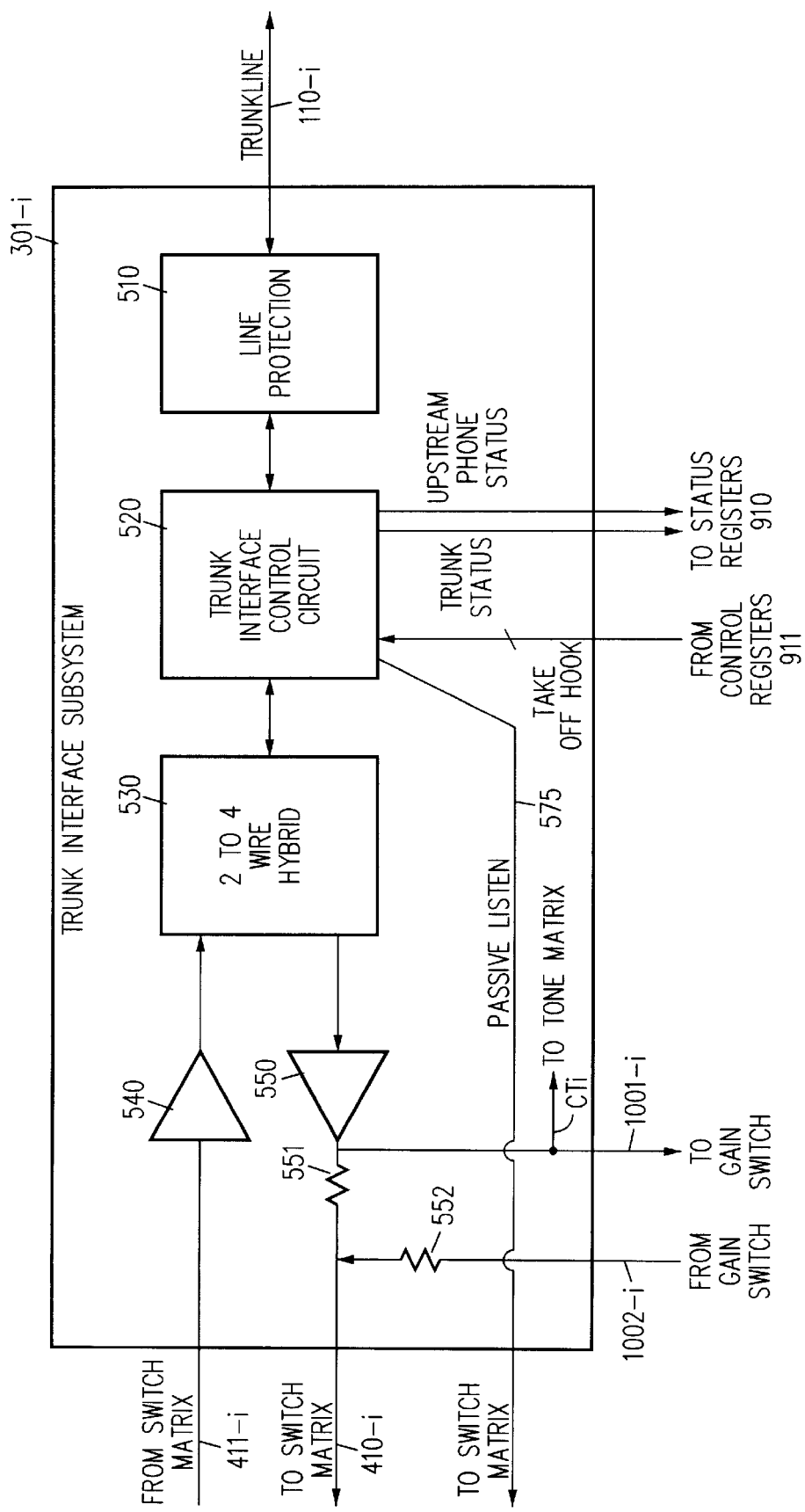
FIG. 5 is a more detailed diagram of one embodiment of the trunk interface subsystem of this invention in FIG. 3.

Trunk interface subsystem 301-i (FIG. 5) includes a line protection circuit 510, a trunk interface control circuit 520, and a two-to-four wire hybrid circuit 530. Line protection circuit 510 is a standard circuit that is required for devices connected to PSN 90.

Trunk interface control circuit 520 includes a line status signal detection circuit and a line interface control circuit. The line status signal detection circuit detects information associated with the telephone call presentation, i.e., information that is presented at service entrance 191 when a call is incoming. This information includes, for example, caller ID and distinctive ring cadences. Call presentation signals are interpreted by the line status signal detection circuit prior to any telephone going off-hook, and an indication of the presence of such signal is provided to PCAM controller 310 by again configuring a bit, corresponding to the particular call presentation signals detected, in a status register of PCAM controller 310.

Specifically, the line status signal detection circuit detects a ring voltage level on line 110-i and sets a ring voltage status bit in an appropriate status register of PCAM controller 310. When the ring voltage level goes away, the line status signal detection circuit clears the ring voltage status bit in the appropriate status register. With this ring on and off information, PCAM controller 310 determines if the timing of the ring cadence is a normal or a distinctive ring cadence. A normal ring cadence is two seconds on, and four seconds off.

Similarly, if the line status signal detection circuit detects a caller ID, line status signal detection circuit configures a corresponding caller ID bit in the appropriate status register. For an incoming call on trunk line 110-i, PCAM controller 310 configures switch matrix 350 so that between the first and second rings, the caller ID information is provided to caller ID circuit 330 (FIG. 3) which, in turn, provides the caller ID to PCAM controller 310 via a second serial port.

The line status signal detection circuit in trunk interface control circuit 520 (FIG. 5) also detects a reverse battery signal, a loop break indicating that a connection through CO 50 has hung up, and a positive off-hook signal from an upstream telephone. Upon detection of any one of these signals, line status signal detection circuit generates a signal that configures a corresponding status bit in the appropriate status register of PCAM controller 310 to indicate the event detected.

To generate a positive off-hook signal on trunk line 110-i, PCAM controller 310 configures a take off-hook bit in a control register for trunk interface control circuit 520, which in turn drives a signal, i.e., a command, to the line interface control circuit within circuit 520. In response to the command from PCAM controller 310, the line interface control circuit generates a positive off-hook signal on trunk line 110-i.

Finally, trunk interface control circuit 520 in trunk interface extension circuit 301-1 drives a passive listen line 575 that is connected to extension input line 420-5 (FIG. 4) of switch matrix 350 (FIG. 3). This assumes that upstream telephone instruments on user's premises 190 are connected only to telephone trunk line 110-1. However, in view of the following disclosure, the passive listen capability can also be implemented on telephone trunk line 110-2.

When a telephone instrument is on-hook, the telephone instrument has no information concerning the activity that is initiated on other telephone instruments connected to the same trunk line. However, when PCAM controller 310 configures switch matrix 350 so that any signals on extension input line 420-5 from passive listen line 575 are passed to a DTMF decoder circuit in call handling detector subsystem 360, PCAM 100 can detect DTMF signals on trunk line 110-1 that are initiated by any upstream telephone instrument, e.g., upstream telephone 193, or upstream PCAM 150 while PCAM 100 is on-hook. Thus, PCAM 100 can monitor activity on trunk line 110-1 while on-hook, and can go off-hook to support upstream telephone instruments in response to DTMF tones that are entered by an upstream telephone instrument. The ability to monitor activity on a trunk line while on-hook is a unique and novel capability.

The signals to and from trunk line 110-i are not only processed by line protection circuit 510 and trunk interface control circuit 520, but also are received from and applied to two-to-four wire hybrid circuit 530. In response to signals from trunk line 110-i, two-to-four wire hybrid circuit 530 drives an amplifier 550 which in turn drives line 410-i from trunk interface subsystem 301-i to switch matrix 350 though resistive element 551.

The output signal from amplifier 550 is applied to gain switch input line 1001-i and the output signal from gain switch 380 on line 1002-i is applied to line 410-i from trunk interface subsystem 301-i to switch matrix 350 though resistive element 552. The output signal from amplifier 550 also drives call progress line CTi to call handling detector subsystem 360. A signal from switch matrix 350 on trunk transmit line 411-i drives a second amplifier 540 which in turn drives two-to-four wire hybrid circuit 530 which in turn drives a signal on trunk line 110-i.

Hence, trunk interface subsystem 301-i (FIG. 3) detects information associated with the telephone call presentation, i.e., information that is presented at service entrance 191 when a call is incoming, and detects a reverse battery signal, a loop break indicating that CO 50 has gone on-hook, and a positive off-hook signal from an upstream telephone. Trunk interface subsystem 301-i informs PCAM controller 310 of the status of each of these signals. Trunk interface circuit 301-i also generates a positive off-hook signal on trunk line 110-i in response to a signal from PCAM controller 310. Finally, trunk interface subsystem 301-i is an interface between switch matrix 350 and trunk line 110-i.

Gain switch circuit 380 (FIG. 10) is used when trunk lines 110-1 and 110-2 are connected together through switch matrix 350. Gain switch circuit 380 compensates for the loss in signal strength each time a call goes through CO 50. When trunk lines 110-1 and 110-2 are interconnected by PCAM 100, a call is routed from the caller's telephone through CO 50 to PCAM 100 and back out on second trunk line 110-2 to another CO and then to the final destination. The two trips through the COs introduce too much signal loss.

To correct for the excessive losses introduced by the COs, PCAM 100 enables gain switch circuit 380 when trunk lines 110-1 and 110-2 are interconnected. Gain switch circuit 380 determines which trunk line 110-i has the loudest signal, i.e, is providing the incoming signal, and applies a larger gain to that signal while dropping the gain of any signal on the other trunk line by the same amount. Thus, one signal is amplified relative to the other signal, and this effectively eliminates echoes.

Consequently, gain switch circuit 380 is one embodiment of an amplification and echo control circuit that is utilized when two trunk lines are interconnected through PCAM 100 to offset the problems introduced by passing a call multiple times through CO equipment. In view of this disclosure, those skilled in the art can implement the functionality of gain switch circuit 380 in a variety of ways.

In this embodiment, PCAM 100 (FIG. 3) has only four extension ports 240-1 to 240-4. As indicated above, each extension port 240-1 to 240-4 is identical. Thus, a generic extension port 240-i that is directly applicable to all the extension ports is considered more completely below. Further, the use of four extension ports is only illustrative of the principles of this invention and is not intended to limit the number of extension ports to this particular number. In view of this disclosure, those skilled in the art can implement personal call manager 100 of this invention with the number of extension ports required for a particular application.

Telephone extension line 121-i is connected to an extension interface subsystem 303-i. Extension interface subsystem 303-i generates signals on an extension receive input line 420-i (FIG. 4) to switch matrix 350 and receives signals on an extension transmit line 421-i from switch matrix 350.

Extension interface subsystem 303-i also is connected to PCAM controller 310. As explained more completely below, control registers and status registers in PCAM controller 310 are connected to extension interface subsystem 303-i.

Figure 6:
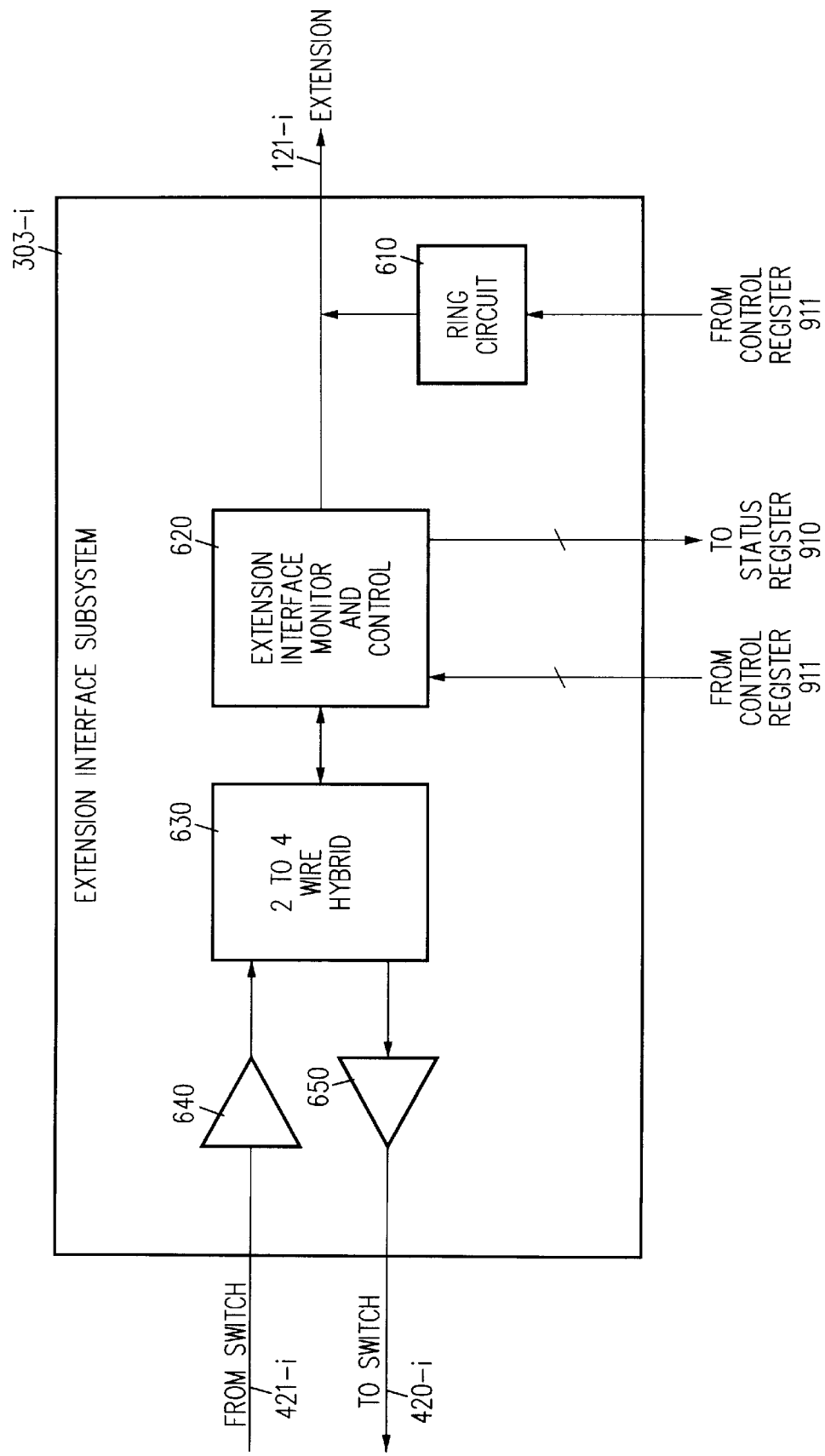
FIG. 6 is a more detailed diagram of one embodiment of the extension interface subsystem of this invention in FIG. 3.

Line 121-i (FIG. 6) is connected to an extension interface monitor and control circuit 620 and a ring circuit 610 in extension interface subsystem 303-i. Extension interface monitor and control circuit 620 includes an extension interface control signal generation circuit and an extension status signal detection circuit. The extension status signal detection circuit detects off-hook and flash hook signals on extension telephone line 121-i. When the extension status signal detection circuit detects one of these signals, the extension signal detection circuit generates a signal which, in turn, configures a bit in the appropriate extension status register in PCAM controller 310 to indicate that the signal was detected. Herein, configuring a bit means either setting or clearing a bit to indicate a particular event. Thus, PCAM controller 310 can detect either an off-hook signal, or a flash hook signal by reading the extension status registers.

If PCAM controller 310 wants to send a caller ID to the telephone instrument on line 121-i, PCAM controller 310 configures switch matrix 350 to pass the caller ID from trunk line 110-i to switch matrix extension transmit line 421-i. When PCAM controller 310 wants to ring the telephone instrument connected to telephone extension line 121-i, PCAM controller 310 configures the ring voltage bit in the control register for extension 141-i which, in turn, drives a signal on a line to ring circuit 610. In response to this signal, ring circuit 610 generates a ring voltage on extension telephone line 121-i to ring the telephone instrument or instruments connected to line 121-i.

The signals to and from extension line 121-i are not only processed by extension interface monitor and control circuit 620, but also are received from and applied to a two-to-four wire hybrid circuit 630. In response to signals from extension telephone line 121-i, two-to-four wire hybrid circuit 630 drives an amplifier 650 which in turn drives line 420-i from extension interface subsystem 303-i to switch matrix 350. A signal from switch matrix 350 on extension transmit line 421-i drives a second amplifier 640 which in turn drives two-to-four wire hybrid circuit 630 which in turn drives a signal on extension telephone line 121-i.

Hence, switch matrix 350 (FIGS. 3 and 4) has one extension receive input line 420-i, where i goes from one to four, from each of extension interface subsystems 303-1 to 303-4, respectively, and one extension transmit output line 421-i, where i goes from one to four, to each of extension interface subsystems 303-1 to 303-4, respectively. Also, as described above, switch matrix 350 has one trunk receive input line 410-i, where i goes from one to two, from each of trunk interface subsystems 301-1 and 301-2, respectively, and one trunk transmit output line 411-i, where i goes from one to two, to each of trunk interface subsystems 301-1 and 301-2.

Switch matrix 350 allows all input lines and output lines to be switched independently. To connect a particular input line to an output line, PCAM controller 310 specifies an address for the output line, and an input line is selected to provide data that is written to the address for the output line. Hence, switch matrix 350 can be configured by PCAM controller 310 to pass a signal from any extension to any trunk line, and to pass a signal from any trunk line to any extension.

However, PCAM 100 includes other circuitry and subsystems that are connected to switch matrix 350. DTMF signals, and busy, call waiting, ring back and dial tones input signals are provided to input lines of switch matrix 350 by tone signal generator subsystem 320 under the control of PCAM controller 310 (FIG. 3). Also, signal processor 340 is connected to an extension input line 420-6 and an output line 431-2 of switch matrix 340.

Signal processor 340 is a virtual extension in PCAM 100. Signal processor 340, under control of PCAM controller 310, can generate a menu of voice prompts that is provided to switch matrix input line 420-6. PCAM controller 310 in turn can pass the menu of voice prompts to either trunk line, or any one of the extension lines by configuring switch matrix 350. Similarly, signal processor 340 can receive an analog signal from switch matrix 350, digitize the signal, and store the digitized signal for future play back. This allows the user to create custom voice prompts.

Finally, a call handling detector subsystem 360 is also connected to switch matrix 350. In the embodiment described below, a tone switch matrix has a plurality of input lines. The plurality of tone switch matrix input lines is connected to output lines of switch matrix 350. Each output line in a plurality of output lines of the tone switch matrix is connected to a different detector which in turn is connected to PCAM controller 310. Call handling detector subsystem 360 detects inband, and voice signals and notifies PCAM controller 310 of the particular signal detected.

Hence, switch matrix 350 (FIG. 4), in this embodiment, has 17 columns and 12 rows. The columns provide input signals to switch matrix 350 and the rows provide switch matrix output signals. The specific lines of switch matrix 350 coupled to tone signal generator subsystem 320, call handling detector subsystem 360, signal processor 340, and PCAM controller 310 are described in more detail below. Moreover, the particular number of columns and rows in switch matrix 350 is not a critical aspect of this invention. In view of this disclosure, the number of columns and rows can be adjusted to provide a desired level of functionality.

An output line of switch matrix 350 can be connected to only one input line at a time. However, row twelve 471 of switch matrix 350 is a unique row. The output signal of row twelve 471 is the sum of the signals on the selected input columns, i.e, input lines. The selected input columns are programmably selected by PCAM controller 310 in response to a preconfigured call handler, or in response to user input to a call handler, as described more completely below. The sum signal from row twelve 471 is connected to conference call (CONF) column 470. This permits configuration of PCAM 100 via switch matrix 350 for conference calls using any of the signals on the other sixteen columns. Also, in this embodiment, a first auxiliary transmit row 431-1 and a first auxiliary receive column 430-1 are not used.

PCAM 100 answers an incoming call on either of trunk telephone lines 110-1 and 110-2 so that PCAM 100 can retain control of the call as indicated above. However, to permit PCAM 100 to process the call, PCAM 100 generates tones on the trunk line, and rings extensions so that the incoming call appears to both the caller and the user as a normal POTS call. In addition, PCAM 100, as explained more completely below, generates DTMF tones to originate telephone calls, and for inband signaling originated by PCAM 100. Consequently, to the users of PCAM 100, PCAM 100 appears to provide functionality and services that previously were either unavailable, or were only available at CO 50.

In this embodiment, tone signal generator subsystem 320 includes a DTMF one tone generator circuit 755-1 and a DTMF two tone generator circuit 755-2, that are identical circuits. Both DTMF one tone generator circuit 755-1 and a DTMF two tone generator circuit 755-2 are connected to control registers in PCAM controller 310 so that PCAM controller 310 can control the signals generated by the two circuits.

DTMF one tone generator circuit 755-1 is connected to DTMF one input line 440-1 of switch matrix 350 and DTMF two tone generator circuit 755-2 is connected to DTMF two input line 440-2 of switch matrix 350. Thus, PCAM controller 310 can generate inband signals on any desired output line of switch matrix 350 using either DTMF one tone generator circuit 755-1, or DTMF two tone generator circuit 755-2 by writing to a transmit data register within the appropriate circuit and by making a connection between the corresponding switch matrix input line and the desired switch matrix output line.

Similarly, PCAM 100 can dial a telephone number on either trunk line 110-1 or 110-2 using either of circuits 755-1 and 755-2. Both circuit 755-1 and circuit 755-2 can generate all sixteen standard DTMF tone pairs. The output frequency spectrum of both circuits 755-1 and 755-2 is preferably defined in accordance with the CEPT T/CS 46-03 recommendations. Hence, the construction and operation of circuits 755-1 and 755-2 are known to those skilled in the art.

As indicated above, to give the caller an indication of the progress of a call being processed by PCAM 100, PCAM 100 plays appropriate tones to the caller using subsystem 320, and in particular a tone generator subsystem 720 within subsystem 320. Each of the required tones, i.e., ring back, busy, call waiting, and dial tones, is generated by tone generator subsystem 720 and supplied to switch matrix 350. PCAM controller 310 passes a particular tone to a particular output line of switch matrix 350 by configuring switch matrix 350 appropriately.

A busy tone generator circuit 757 in tone generator subsystem 720 generates a busy signal on a third auxiliary input line 430-3 of switch matrix 350 in response to a command from PCAM controller 310. For example, when a user picks up an extension, PCAM 100 checks to see if primary trunk line 110-1 is in use, and if it is, uses busy tone generator circuit 757 to provide a busy signal. In another embodiment, PCAM 100 checks each of the trunk lines connected to PCAM 100.

A dial tone generator circuit 759 in tone generator subsystem 720 generates a dial tone on a second auxiliary input line 430-2 of switch matrix 350 in response to a command from PCAM controller 310. A ring back tone generator circuit 758 in tone generator subsystem 720 generates a ring back signal on a fourth auxiliary input line 430-4 of switch matrix 350 in response to a command from PCAM controller 310. For example, when PCAM 100 answers an incoming call, CO 50 no longer generates a ring back signal. Thus, to give the caller the feeling that the call is still waiting to be answered, PCAM controller 310 enables ring back tone generator circuit 758 and connects circuit 758 to the appropriate trunk line so that the caller perceives that the call is still ringing.

Call waiting tone generator 765 in tone generator subsystem 720 drives a call waiting tone on tone generation line 450 of switch matrix 350 in response to a command from PCAM controller 310. Call waiting tone generator 765 also is used to generate signals associated with call monitoring, as described more completely below.

As is known to those skilled in the art, two signaling techniques are used in telephony. Inband signals are those signals that can be delivered through the contents of a call. Such signals must be within the BELLCORE specification, which limits signals to frequency ranges occupied by voice frequencies. Typically, in-band signals, such as fax tones or DTMF tones, cannot be received until at least one telephone is off-hook. An out-of-band signal is a signal transmitted within the customer premises by means other than an in-band signal. Potential methods are by use of RF (FM) signals through telephone or power wires, or household wireless frequencies.

Since PCAM 100 works with any POTS telephone or any standard telephone instrument without modification, only inband signals are used. As indicated above, call handling detector subsystem 360 detects inband signals and voice signals. PCAM controller 310 controls the signals processed by subsystem 360 first by configuring switch matrix 350 to apply particular signals on lines 441-1, 441-2. PCAM controller 310 also configures a tone switch matrix 850 to route a particular input signal on one of input lines 441-1, 441-2, CT1, and CT2 of switch matrix 850 to a particular detector.

DTMF one output line 441-1 from switch matrix 350 is programmably connectable and disconnectable through tone switch matrix 850 only to a first DTMF decoder circuit 854-1. Similarly, DTMF two output line 441-2 from switch matrix 350 is programmably connectable and disconnectable through tone switch matrix 850 only to second DTMF decoder circuit 854-2. PCAM controller 310 first programmably connects a particular input line to switch matrix 350 to DTMF output line 441-i, where i is either one or two, and then connects DTMF output line 441-i to corresponding DTMF decoder circuit 854-i via tone switch matrix 850 to determine the particular DTMF tones being supplied. For example, when a personal identification number (PIN) is entered by the owner of PCAM 100 using a DTMF interface, PCAM controller 310 directs the DTMF signals to the appropriate DTMF decoder circuit 854-i which in turn provides PCAM controller 310 with the data entered.

The signals on call progress lines CT1 and CT2 are connected directly to call progress detector 851-1 and call progress detector 851-2, respectively. Call progress detector 851-i detects low frequency signals, e.g., signals in a range of about 300 Hz to about 1200 Hz, and uses the timing characteristics of the signal to identify the signal. Specifically, in this embodiment, both call progress detectors 851-i detect a dial tone, a busy signal, and a ring back signal. A busy signal is defined as a signal that switches on and off about every 500 milliseconds, i.e., on 500 milliseconds, off 500 milliseconds, on 500 milliseconds and so on. A dial tone is defined as a signal that is one for at least 2.5 seconds. A ring back signal is defined as a signal that is on two seconds and off four seconds.

The signals on call progress lines CT1 and CT2 are programmably connectable to and disconnectable from each of DTMF decoder circuits 854-1 and 854-2, tone detector 853, and voice detector 852 through tone switch matrix 850. Specifically, PCAM controller 310 can connect signals on either call progress line CT1 or call progress line CT2 to any one of the four output lines 860-1 to 860-4 in the same manner as PCAM controller 310 connected an input line and output line of switch matrix 350. Similarly, PCAM controller 310 can programmably connect and disconnect any of the plurality of output lines to analog ground line 460.

PCAM controller 310 programmably connects and disconnects signals on either call progress input line CT1 or call progress input line CT2, using tone switch matrix 850, to voice detector 852. Voice detector 852 detects when a person is speaking on line 860-1 from tone switch matrix 850. When a voice is not detected for a predetermined time interval, voice detector 852 configures a bit in the status registers of PCAM controller 310. Consequently, voice detector 852 can be used to determine when a line is silent and signal PCAM controller 310 so that PCAM controller can take appropriate action. This is used, for example, to detect when a remote extension is no longer being used.

PCAM controller 310 also programmably connects and disconnects signals on either call progress input line CT1 or call progress input line CT2 to tone detector 853 using tone switch matrix 850. Tone detector 853 detects fax and modem tones and notifies PCAM controller 310 when either tone is detected. Consequently, tone detector 853 allows PCAM controller 310 to route incoming modem and fax calls to the appropriate telephone instrument, either local or remote.

Figure 9:
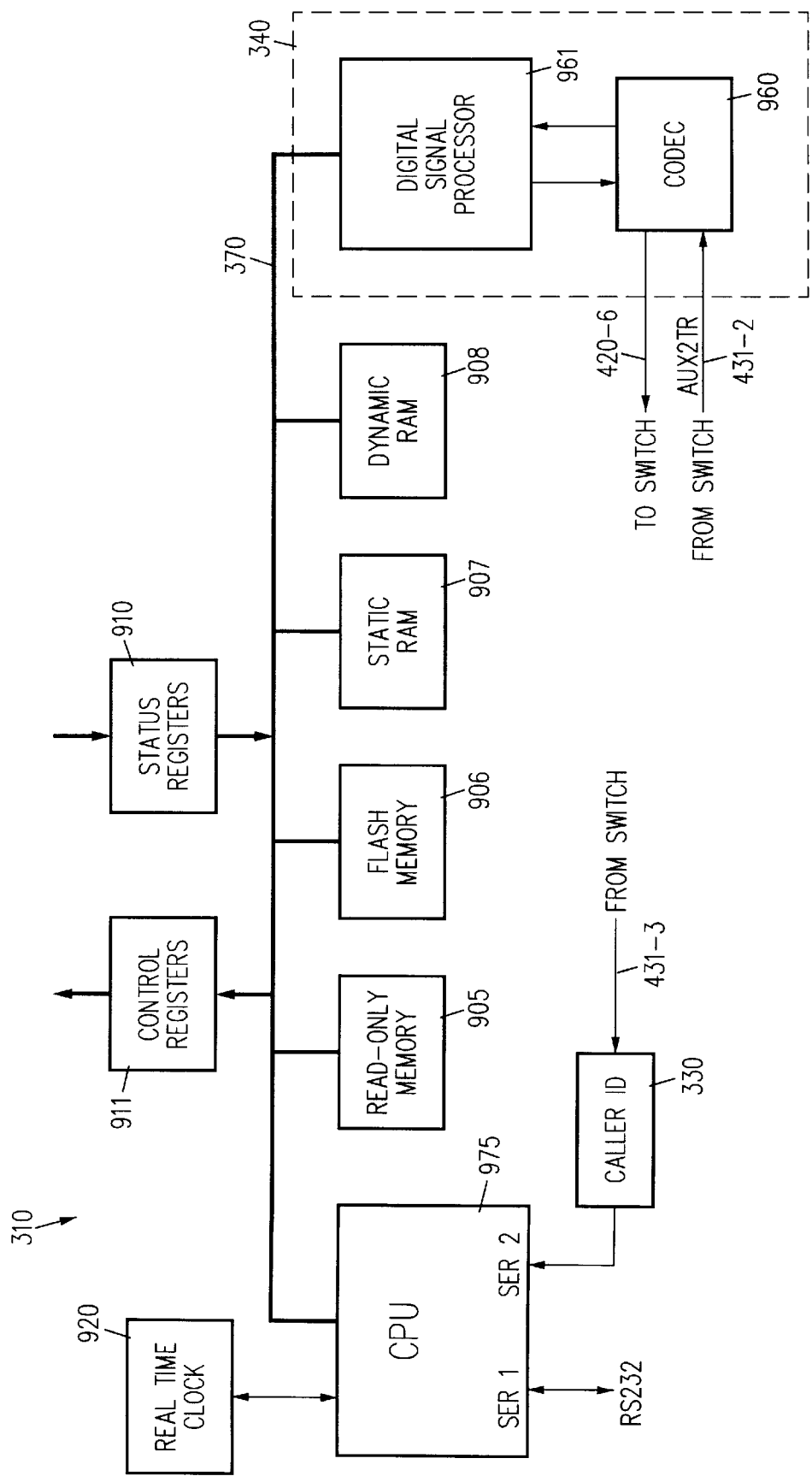
FIG. 9 is a more detailed diagram of one embodiment of the programmable PCAM controller of this invention in FIG. 3.

FIG. 9 is a more detailed diagram of one embodiment of programmable PCAM controller 310. In this embodiment, PCAM controller 310, specifically central processing unit (CPU) 975, executes firmware that is loaded in read-only memory 905. Hereinafter, CPU 975 is described as performing certain operations. Those skilled in the art will appreciate that this means that CPU 975 is processing executable computer code stored in PCAM controller 310. One CPU suitable for use in this invention is sold by MOTOROLA of Phoenix, Ariz. as part number MC68306FC16. ROM 905 includes the operating instructions for PCAM 100, and the pre-configured voice of PCAM 100 that is used when configuring PCAM 100 through a DTMF interface, as described more completely below. ROM 905 also includes the basic architecture for each of the different type of call handlers, as described more completely below. Briefly, a call handler specifies which extensions to ring; whether to use voice mail or an answering machine; whether to permit transfers; and whether to allow remote call monitoring and if yes, at which telephone number.

User recorded greetings, call handlers, and other features, e.g., a PIN and a caller ID list, are stored in a non-volatile memory 906, which in this embodiment is a flash EEPROM. In addition, information on inbound and outbound calls is stored by CPU 975 in flash EEPROM 906. In this embodiment, a 128 k×8 flash EEPROM is used. Flash EEPROM 906 can be accessed by either CPU 975 or digital signal processor 961 over PCAM bus 370.

Static RAM 907, which in this is embodiment has a size of 64 k×8, is used to store the active call handler or handlers and call filters. Dynamic RAM 908 is used to store data and information required for operation of PCAM 100.

Real time clock 920 is used by CPU 975 to obtain times used to indirectly activate call handlers based on time of day criterion and to provide time data that are stored for the incoming and outbound calls.

CPU 975 writes to control registers 911 to generate signals to the various subsystems and circuits, as indicated above. CPU 975 polls status registers 910 to monitor the status of the various subsystems and circuits of PCAM 100.

Signal processor 340 includes a digital signal processor 961 that is connected to a CODEC 960. Signal processor 340 is capable of playing recorded tones, such as voices, into switch matrix 350 and recording tones from switch matrix 350. CODEC 960 digitizes analog signals from switch matrix 350 on line 431-2 and provides the digital signals to DSP 961, which processes and stores the digitized signal in response to commands and control signals received from CPU 975. Conversely, to play a voice prompt, CPU 975 instructs DSP 961 to retrieve and play a voice prompt. In response to the command and control signals from CPU 975 over PCAM bus 370, DSP 961 retrieves the digital sound file and passes the information to CODEC 960 which in turn produces an analog audio signal that is supplied to switch matrix 350 on line 420-6. These operations are similar to those that are commonly found in voice mail systems, and so are known to those of skill in the art.

CPU 975 receives a caller ID from caller ID circuit 330 through a second serial port. As explained more completely below, CPU 975 compares the caller ID with a list of caller IDs when a caller ID filter is active.

Figure 10:
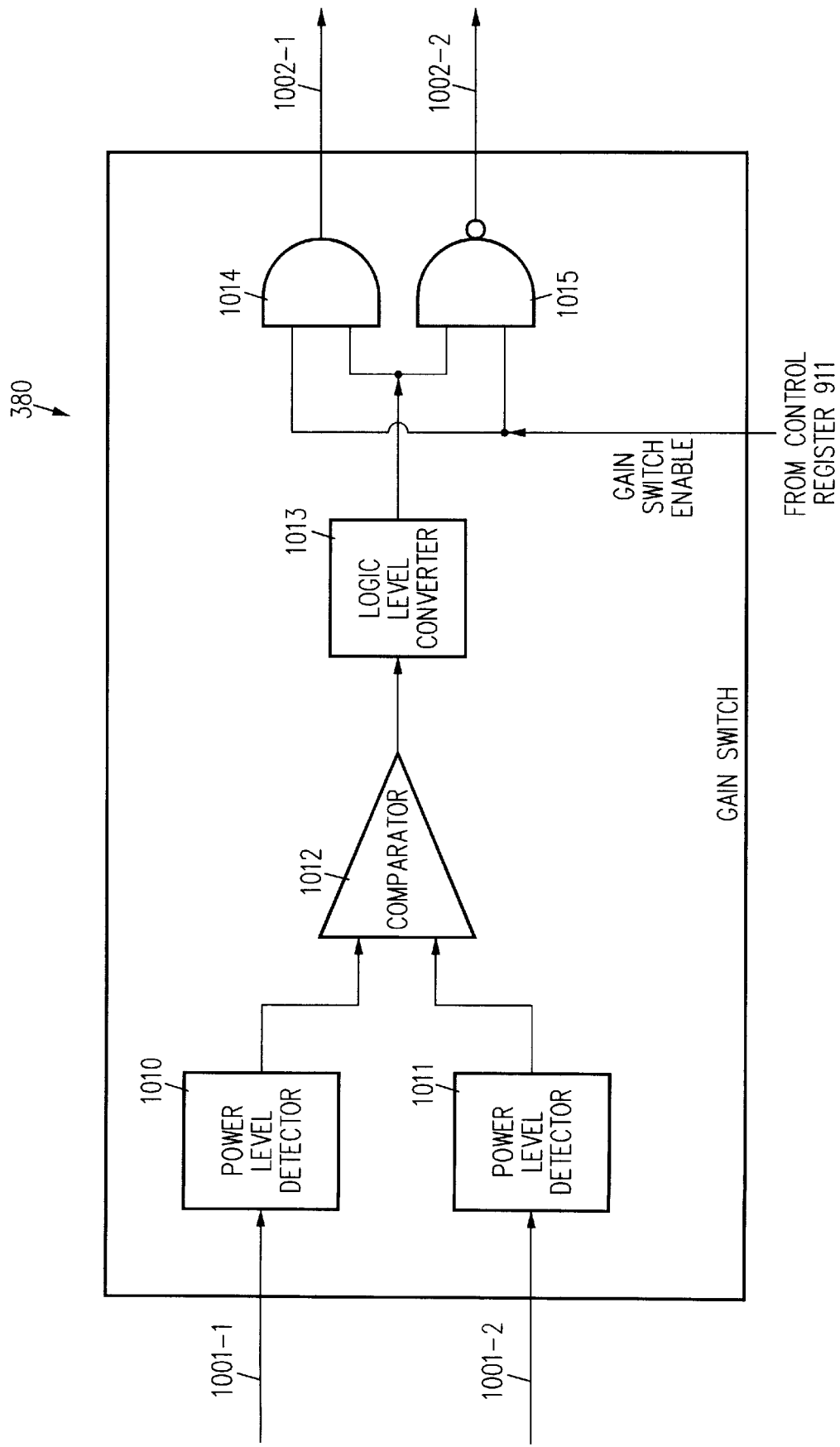
FIG. 10 is a more detailed diagram of one embodiment of the gain switch of this invention in FIG. 3.

FIG. 10 is a more detailed diagram of gain switch circuit 380. Input lines 1001-1 and 1001-2 are from trunk interface circuits 301-1 and 301-2, respectively and provide the input signal from the corresponding trunk line. The signal on input line 1001-1 drives power level detector circuit 1010 and the signal on input line 1001-2 drives power level detector circuit 1011. Each power level detector circuit generates an output signal with a voltage level that represents the power of the input signal.

The voltage level output signals of power detector circuits 1010 and 1011 drive comparator 1012. Comparator 1012 produces an output signal that has a first voltage level when the output signal of power detector 1010 is largest, has a second voltage level when the output signal of power detector 1011 is largest. Thus, the voltage level of the output signal from comparator 1012 indicates which signal on trunk lines 110-1 and 110-2 is the largest. Comparator 1012 has a small amount of hysteresis which requires that the signal strength of the attenuated signal increase above the other signal by a reasonable amount before comparator 1012 switches the output voltage level. Without this hysteresis, gain switch 380 could go into oscillation.

The output signal from comparator 1012 drives logic level convertor circuit 1014 which translates the input signal to a TTL logic level output signal. This output signal drives a first input terminal of AND gate 1014 and a first input terminal of NAND gate 1015. A second input terminal of AND gate 1014 and a second input terminal of NAND gate 1015 are driven by a gain switch enable signal from control registers 911. In this embodiment, if the gain switch enable signal is a logic zero, the output signal from AND gate 1014 and NAND date 1015 is constant irrespective of the output signal from circuit 1013.

Conversely, if the gain switch enable signal is a logic one, the output signals of gates 1014 and 1015 is determined by the logic level of the output signal from circuit 1013. For example, if the signal on trunk line 110-1 is greater than the signal on trunk line 110-2, a logic level zero signal drives AND gate 1014 and NAND gate 1015. Consequently, a logic zero level is driven on output line 1002-1 for trunk line 110-1 and a logic one level is driven on output line 1002-2 for trunk line 110-2. Thus, gain is shifted to trunk line 110-1 and away from trunk line 110-2. The reverse can be worked out if the signal on trunk line 110-2 is greater than the signal on trunk line 110-1.

The specific operation of personal call manager 100 is controlled by an active call handler that is executed by CPU 975. In one embodiment, up to ten call handlers can be stored in flash memory 906 of PCAM controller 310. A call handler defines how to route incoming calls, and which extensions are available to receive incoming calls, and to place outgoing calls. In addition, the call handler defines whether a monitor telephone is active. The owner of PCAM 100 can create, modify, activate, and deactivate call handlers from either personal computer 149 or any telephone instrument with a DTMF interface that can connect to PCAM 100. Hence, a call handler can be created, modified, or activated from remote telephone 160, or cellular telephone 180, for example.

The call handlers allow an individual owner to configure PCAM 100 to provide real-time call routing and caller control based on the individual owner's requirements. Each owner may have a different set of call types and routing requirements. Incoming call types include fax calls, modem calls, caller ID calls and distinctive ringing calls. Routing requirements may include voice mail, cellular service, local extensions, remote extensions, and pager service. In addition, even this set of requirements may vary depending on the time of day and day of week for a particular user. Call handlers permit PCAM 100 to handle all these individual incoming, outgoing, and time requirements without customizing the hardware for each particular owner.

In this embodiment, three types of call handlers are available: i) direct call handlers; ii) menu driven call handlers; and iii) monitor call handlers. Independent of the type of call handler, the user can select one or more local extensions to ring. In addition the user can specify a remote telephone instrument 160 by providing a remote telephone number to dial.

Specifically, when PCAM controller 310 executes a direct call handler, only the local extensions indicated in the direct call handler are rung by PCAM 100 in response to an incoming call. In addition, a direct call handler allows the user to specify one remote telephone number that is dialed in response to an incoming call if PCAM 100 is connected to two trunk lines 110-1 and 110-2, or if three-way calling is available on primary trunk line 110-1. The user must specify the remote telephone number if three-way calling is available on primary trunk line 110-1. As indicated above, the remote telephone number can be a POTS remote telephone 160, cellular telephone 180, pager 170, voice mail 51, or perhaps cellular voice mail 186.

When PCAM controller 310 executes a menu call handler, the caller is presented with an oral menu of choices for routing the call. Each choice can ring any or all of local extensions 121 to 124 and one remote telephone number can be dialed. Again, the remote telephone number can be for POTS remote telephone 160, cellular telephone 180, pager 170, voice mail 51, or perhaps cellular voice mail 186.

Up to ten menu choices, zero through nine, can be configured, and the user must specify the local extensions and remote telephone number for each choice. The owner can also choose one of the four custom pre-recorded audio greetings for each choice. The owner can of course re-record any of the four custom pre-recorded audio greetings at any time, as explained more completely below. Thus, if a menu call handler is active, the caller hears a user recorded greeting offering call routing choices to select from. For example the greeting might say " . . . to call me on my car phone press one, to call me at my remote office press two, to leave me a voice message press three."

When PCAM controller 310 executes a monitoring call handler, only the local extensions indicated in the monitoring call handler are rung by PCAM 100 in response to an incoming call. In addition, the user must configure a voice mail choice. The voice mail options are a TAD connected as one of extensions 141-1 to 141-4, or a remote voice mail telephone number. Typically, the remote voice mail telephone number is the same telephone number as the telephone number for primary trunk line 110-1 to PCAM 100. The user also has the option of configuring PCAM 100 so that incoming calls can be monitored from any of local extensions 141-1 to 141-4, or from a remote telephone instrument that can be reached using PSN 90. The use of a remote telephone instrument for monitoring requires that PCAM 100 be connected to secondary trunk line 110-2.

After a call handler or call handlers have been configured and stored in memory 906, a call handler must be activated by the owner of PCAM 100 before PCAM 100 uses that call handler. The owner can activate a call handler either directly or indirectly.

A call handler can be directly activated locally using a local extension of PCAM 100, e.g, a telephone instrument that has a DTMF user interface, or by using personal computer 149. Using personal computer 149, the owner simply selects the desired call handler from a list of call handlers. Personal computer 149 transmits the choice to CPU 975 through the RS232 serial port.

As explained more completely below, when using a local extension, the user first places PCAM 100 in the configuration mode, and then selects a particular call handler from a menu to activate that call handler. In one embodiment, each call handler is simply assigned a number. In another embodiment, the user can record a name for each call handler, or alternatively, select a name from a set of prerecorded names. Similarly, from a remote telephone with a DTMF interface, the owner calls the primary telephone number, places PCAM 100 in the configuration mode, and then selects a particular call handler from a menu to activate that call handler.

A call handler can be activated indirectly using a call handler filter. As explained above, PCAM 100 detects the call presentation characteristics of an incoming call such as distinctive ringing and caller ID. PCAM 100 can be configured to activate a particular call handler based on the call presentation characteristics of the incoming call. In another embodiment, the call handler could be activated based on the call type.

In the embodiment where the call presentation characteristics can be used to selectively activate a call handler, each trunk port in PCAM 100 can be configured to select an active call handler from two call handlers. For example, a first call handler is the default call handler and is used for "normal" calls, and the other call handler is used for "filtered" calls. All calls that do not match a filter criterion for the particular port use the normal call handler.

A filter criterion can include a caller ID, or a group of caller ID's of interest to the owner. For example, when a caller ID is received by CPU 975 from caller ID circuit 330, CPU 975 compares the incoming caller ID with caller IDs in a list defined for the active filtered call handler for the trunk port receiving the incoming call. If a match is found the filtered call handler is used, and otherwise, the normal call handler is used. This feature could be used if the user wants to play a special greeting for a particular caller or group of callers. Similarly, CPU 975 can be informed of a distinctive ring cadence, and upon such notification, activate another filtered call handler.

Another way of indirectly activating a call handler is by time of day. A simple example of this would be to use a normal call handler that played one greeting to callers during the normal business day, but after 6:00 PM to use a filtered call handler with a different greeting indicating that the business is closed, e.g., routed the call directly to a telephone answering service without waiting for a predetermined number of rings.

In addition to the user configurable call handlers, PCAM 100 permits the PCAM owner to record a plurality of custom greetings that can be used by any menu call handler. In one embodiment, up to four custom greetings can be recorded by the PCAM owner. To record a greeting, the owner first enters the configuration mode and then enters a predetermined code from a touch tone phone to place PCAM 100 in record mode. In response to the predetermined code for recording, PCAM 100 requests the number of the greeting from the PCAM owner. After the number of the greeting is entered by the PCAM owner, PCAM 100 connects the owner's extension to signal processor 340 which processes and stores the greeting for later recall. Alternatively, hardware and software could be added to personal computer 149 so that the user could use personal computer 149 to record a greeting, configure the greeting for use in PCAM 100, and then download the configured greeting to PCAM 100. For this alternative, the firmware in PCAM 100 would be modified to support the transfer, storage, and subsequent use of the greeting from personal computer 149.

For security, PCAM 100 also allows the owner to configure a PIN which is subsequently used for remote call monitoring and for configuration changes. The PIN can be set using either personal computer 149 or a DTMF telephone. This PIN provides a level of security for the configuration of PCAM 100, and at the telephone that is used for remote monitoring. Alternatively, voice recognition circuits could be added to PCAM 100 and PCAM 100 could be configured to recognize an oral password.

The owner of PCAM 100 can also configure the number of times PCAM 100 drives a ring voltage on an extension line before the extension is considered unanswered. This ring count is the number of times the PCAM 100 rings a local extension before taking secondary routing choices. This option can be configured independently for each trunk line and can range from zero to any specified number.

In addition to up to two call handlers for each trunk port, PCAM 100 can be configured to also allow each incoming trunk line to look for a fax tone. Upon detection of a fax tone, PCAM 100 can route the incoming call to any local extension 141-i or to an external phone number. For example, PCAM 100 could be set up so that upon receipt of a fax tone on either primary trunk line 110-1 or secondary trunk line 110-2, the incoming call is automatically connected to extension 141-3 where fax machine 133 is connected.

The operation for entering the configuration mode to set the various parameters and other features described above is a part of the operation used by PCAM 100 monitoring an in-progress call that is described more completely below.

Figure 11:
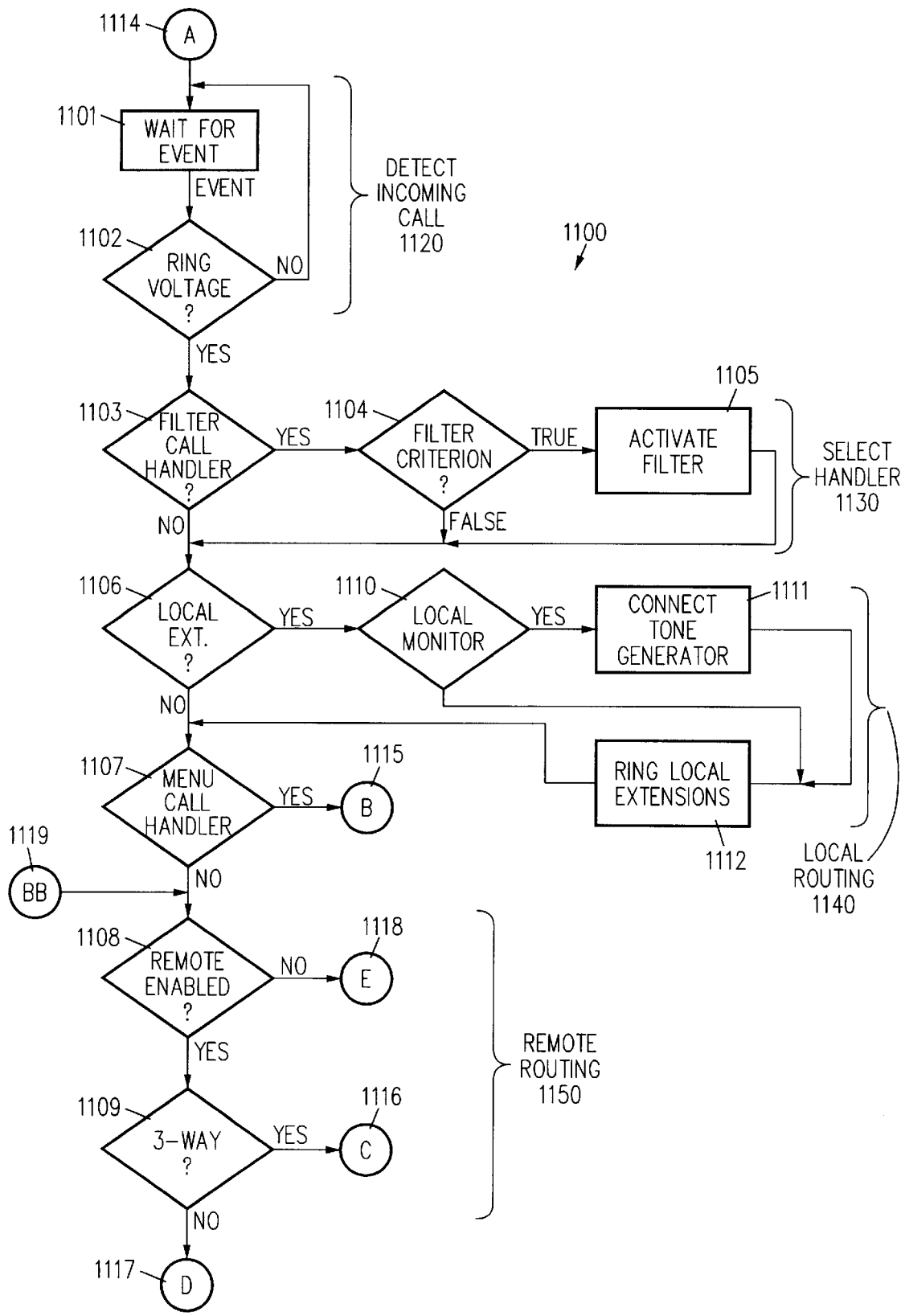
FIG. 11 is a process flow diagram of one embodiment of an initial call routing operation used by the PCAM of this invention to handle incoming telephone calls.

FIG. 11 illustrates one embodiment of an initial call routing operation 1100 used by PCAM 100 to handle incoming telephone calls. Operation 1100 is in an idle state when personal call manager 100 is not handling a telephone call. In the idle state, operation 1100 waits for an event in operation 1101. A process executing on processor 975 periodically reads status registers 910, e.g., monitors the signals from trunk interface subsystems 301-1 and 301-2 and from extension interface subsystems 303-1 to 303-4, using a memory mapped I/O. When this process determines that an event has occurred, e.g., one of the bits in status registers 910 changed state, CPU 975 sends a message to waiting for an event to occur operation 1101. The message is sent using a standard in memory message queue that is in RAM 908. This message queue is similar to message queues that are used in UNIX and Windows systems.

In FIGS. 11 through 26, a check operation following a wait for event to occur operation shows the event that is of interest at this particular instant. As those skilled in the art will appreciate, a message handling process can check for a wide variety of events to determine which of a plurality of events occurred. Alternatively, the message can be coded such that the message handler simply branches to the appropriate operation after reading a message in the message queue. Therefore, for convenience in the figures, when a check requires a particular message indicating that an event has occurred, if that message is not found, the Figure shows that processing returns to the wait for event to occur operation. Also, herein an operation is the number of steps required to complete the operation described. Thus, an operation can be, for example, only a single step or a number of operations that each include a number of steps.

When a call comes in on primary trunk line 110-1, trunk interface control circuit 520 in trunk interface circuit 301-1 detects the ring voltage and sets a corresponding bit in status registers 910. This results in a ring voltage event message being added to the message queue. Consequently, wait for event to occur operation 1101 transfers to a ring voltage check operation 1102.

In ring voltage check operation 1102, the message is processed to determine whether a call is incoming. If the message is not for a ring voltage event, processing returns to wait for event to occur operation 1101. Conversely, if the message is for a ring voltage event, processing passes to filtered call handler check operation 1103. Hence, operations 1101 and 1102 are a detect incoming call operation 1120.

When an incoming call is detected by operation 1120, select call handler operation 1130 selects one of the two possible call handlers for the trunk line port receiving the incoming call. Specifically, if the owner of PCAM 100 specified both a normal call handler and a filter call handler for the trunk line port receiving the incoming call, PCAM controller 310 must determine whether to activate the filter call handler. In this embodiment, select call handler operation 1130 includes operations 1103 to 1105, that are described more completely below.

Filter call handler check operation 1103 first determines whether a filter call handler is defined for the trunk line port receiving the incoming call, e.g. port 210-1. If a filter call handler is not defined for port 210-1, processing simply transfers through filter call handler check operation 1103 to ring local extensions check operation 1106.

However, if a filter call handler is defined for trunk line port 201-1, PCAM controller 310 transfers to filter criterion check operation 1104 to determine whether to activate the filter call handler.

The actions performed by filter criterion check operation 1104 depend upon the particular type of filter call handler specified for trunk line port 210-1. If the filter call handler is a time of day call handler, CPU 975 reads real time clock 920 and compares the time with the criteria or criterion specified for activation of the time of day call handler. If the criteria are satisfied, processing transfers to activate filter call handler 1105, and otherwise to ring local extensions check operation 1106.

If the filter call handler is a caller ID call handler, the actions by CPU 975 (FIG. 9) in filter criterion check operation 1104 (FIG. 11) depend on the configuration of switch matrix 350. If in the idle state of PCAM 100, switch matrix 350(FIG. 4) is configured to pass the information on trunk one receive line 410-1 to third auxiliary output line 431-3, i.e, from trunk interface circuit 301-1 (FIG. 3) to caller ID circuit 330, CPU 975 (FIG. 9) must only read the incoming caller ID and compare that caller ID with the caller ID or list of caller IDs specified in the filter call handler. If the PCAM 100 is not configured in the idle state to pass the caller ID through switch matrix 350 to caller ID circuit 330, CPU 975 must first configure switch matrix 350 prior to the second ring, and then read the incoming caller ID and make the comparison. In either case, if the incoming call ID matches one of the stored caller IDs, operation 1104 transfers to activate filter operation 1105 and otherwise to ring local extension check operation 1106.

If the filter call handler is a distinctive ring call handler, in filter criterion check operation 1104 the ring voltage bit in the status registers for trunk interface circuit 301-1 is periodically polled. The polling period is selected so that CPU 975 can determine the time periods over which the ring voltage is active and inactive. CPU 975 uses the time periods that the ring voltage is active and inactive to determine whether the incoming call has a distinctive ring. If a distinctive ring is detected, processing transfer to activate filter operation 1105 and otherwise to ring local extension check operation 1106.

Activate filter operation 1105 activates the filter call handler for the incoming call. As explained above, the filter call handler can provide services, information, or capabilities to selected incoming callers. In the following discussion, only the active call handler is discussed.

The active call handler depends on the result of select call handler operation 1130 that was just described. While in this embodiment three types of filter call handlers were described, these examples are illustrative only of the principles of this invention and are not intended to limit the invention to the particular types of filter call handlers described. Other filters can be used, for example logical combinations, e.g., AND, OR, Exclusive OR, etc, of the three types described above, to provide even more special handling capability.

After a call handler is selected, PCAM controller 310 performs route to premises operation 1140 to determine whether to ring any or all of extensions 141-1 to 141-4 on user's premises 190. In this embodiment, route to premises operation 1140 includes operations 1106, 1110, 1111, and 1112.

Specifically, ring local extensions check operation 1106 determines if one or more local extensions are specified in the active call handler. If one or more local extensions are specified, processing transfers to local monitor check operation 1110, and otherwise to menu call handler check operation 1107.

Thus, in this embodiment, ringing of local extensions is initiated prior to implementation of other features of the invention. However, this is illustrative only and is not intended to limit the invention to this specific embodiment.

In view of the following disclosure, ringing of both local and remote extensions could be started and then other features, such as presenting a menu, implemented. Alternatively, a remote extension could be rung initially followed either by implementing other features described below, or subsequently ringing one or more local extensions. In general, the particular sequence of events can be altered to fit the user's needs because personal call manager 100 retains control over the call and includes hardware to generate the various tones and signals needed in the various combinations of call routing, handling and monitoring.

If the active call handler is a monitor call handler, local monitor check operation 1110 determines whether a local extension 141-i is the monitor extension. Processing transfers to connect tone generator operation 1111 if a local extension 141-i is specified as the monitor extension, and otherwise processing transfers from check operation 1110 to ring local extensions operation 1112. In connect tone generator operation 1111, CPU 975 configures switch matrix 350 (FIG. 4) so that the signal on line 450 from call waiting tone generator 756 in tone generator circuit 710 is connected to extension transmit line 421-i. Thus, when monitor extension 141-i goes off-hook, the listener hears the tone from generator 756.

In this embodiment, CPU 975 switches generator 756 off and on with a cadence that is 40 milliseconds on, 50 milliseconds off, 40 milliseconds on, and 200 milliseconds off. As explained more completely below, this pattern repeats until a predetermined code is entered on monitor extension 141-i, or a time out period ends following monitor extension 141-i going off-hook. Upon completion of making the connection through switch matrix 350, CPU 975 transfers processing to ring local extensions operation 1112.

In ring local extension operation 1112, CPU 975 (FIG. 9) writes to control registers 911 so that a signal is sent to ring circuit 610 (FIG. 6) in extension interface circuit 303-i for each extension i specified in the call handler. The signal sent to each ring circuit 610 causes a ring voltage to be generated on extension telephone line 121-i. Ring local extension operation 1112 also transfers to menu call handler check operation 1107 upon completion.

Figure 15A:
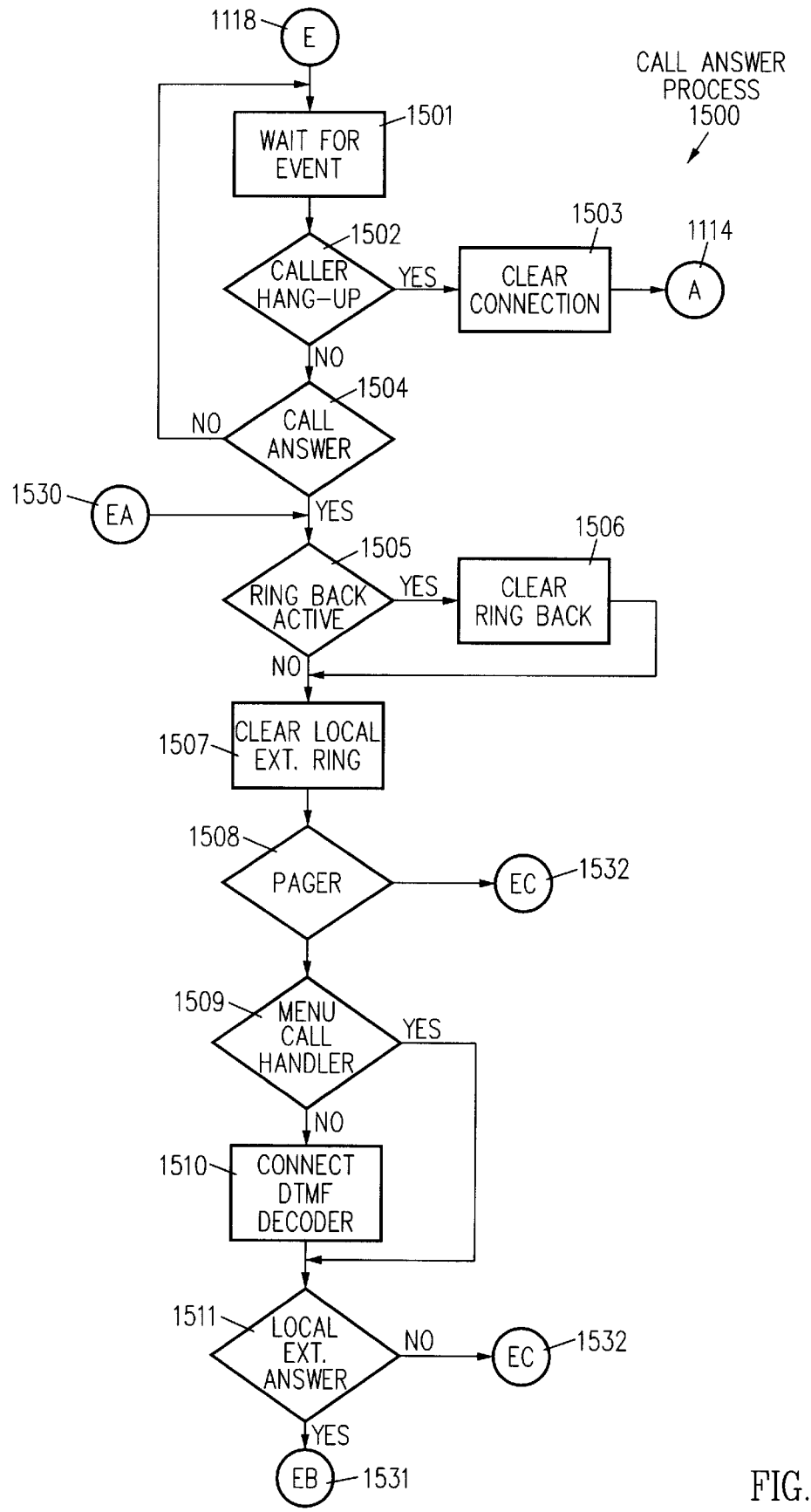
FIGS. 15A and 15B are process flow diagrams for a call answer operation used by the PCAM of this invention in response to an incoming call.
Figure 15B:
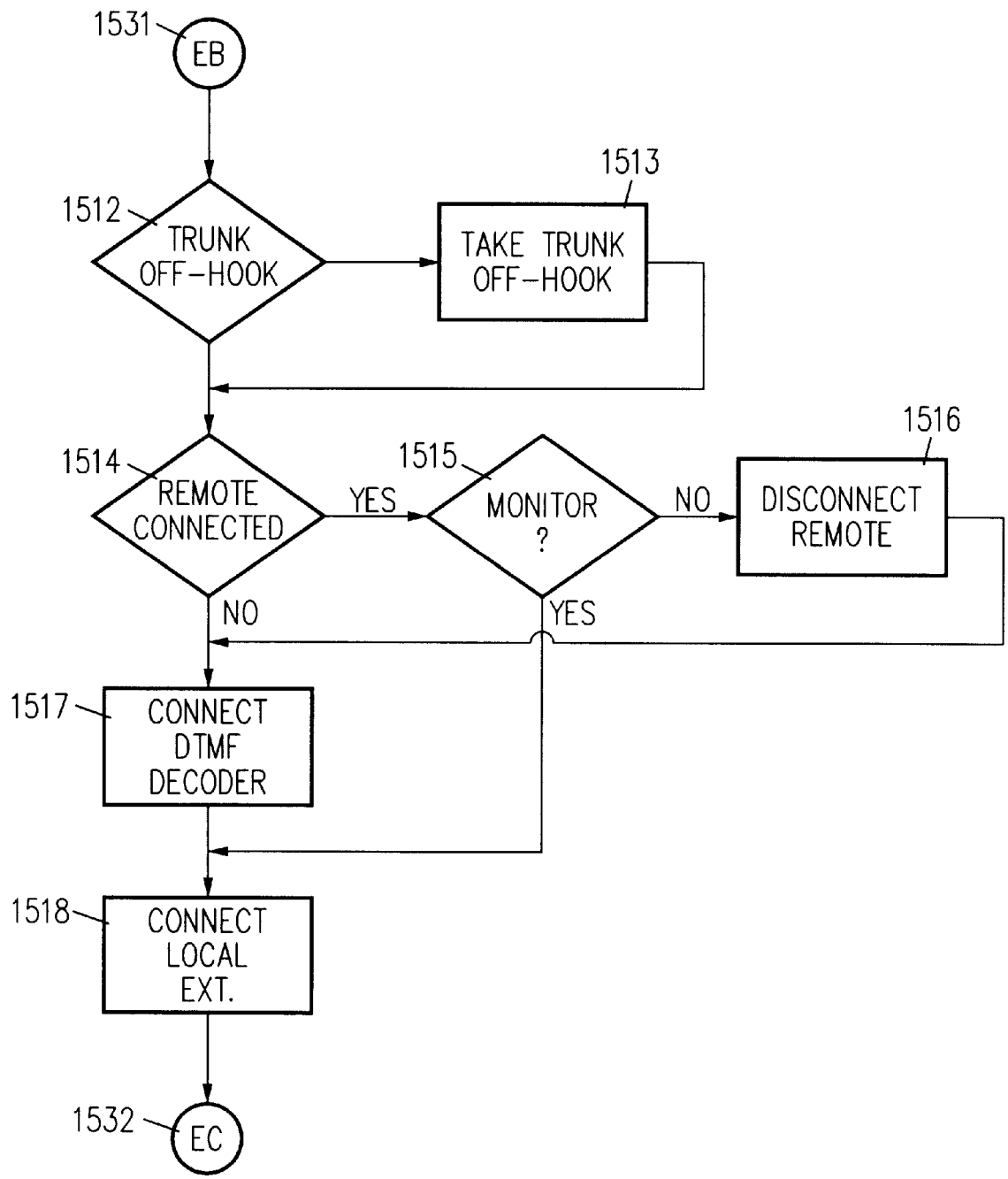

As explained above, in this embodiment, a menu call handler is used to provide call routing options to the caller when a local extension is not answered within a predetermined number of rings. Thus, menu call handler check operation 1107 determines whether the active call handler is a menu call handler. If the active call handler is a menu call handler, processing transfers from check operation 1107 to menu call transfer operation 1200 (FIGS. 12A and 12B) through node 1115. Conversely, if the active call handler is not a menu call handler, processing transfers from check operation 1107 to remote call enabled check operation 1108. If the owner of PCAM 100 has configured the active call handler for remote calling, remote call enabled check operation 1108 is true and otherwise false. If remote call enabled check operation 1108 is false, personal call manager 100 continues operation, as described more completely below, in call answering operation 1500. (FIGS. 15A and 15B.) Conversely, if remote call enabled check operation 1108 is true, processing transfers to three-way call enabled check operation 1109.

Three-way call enabled check operation 1109 examines the information in the active call handler to determine whether three-way calling is available on the trunk line receiving the incoming call. If three-way calling enabled check operation 1109 is true, processing transfers through node 1116 to a make three-way call connection operation 1300 (FIGS. 13A and 13B) that is described more completely below. However, if three-way calling is not enabled and remote calling is enabled, this means that a second trunk line is connected to PCAM 100. Therefore, three-way calling enabled check operation 1109 transfers to make remote connection operation 1450 (FIG. 14) through node 1117.

Figure 12A:
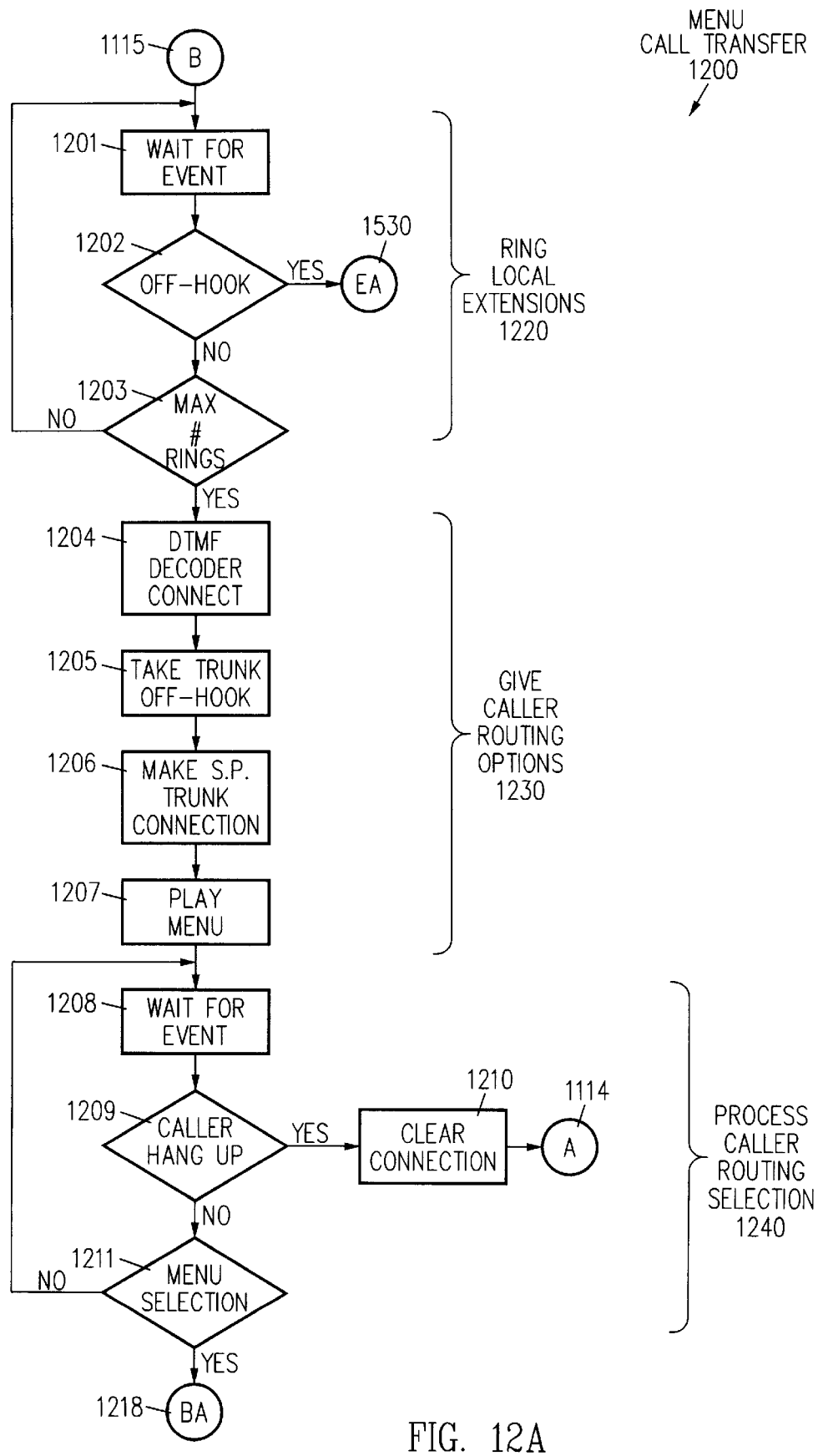
FIGS. 12A and 12B are process flow diagrams for a menu call transfer operation used by the PCAM of this invention for a menu call handler.
Figure 12B:
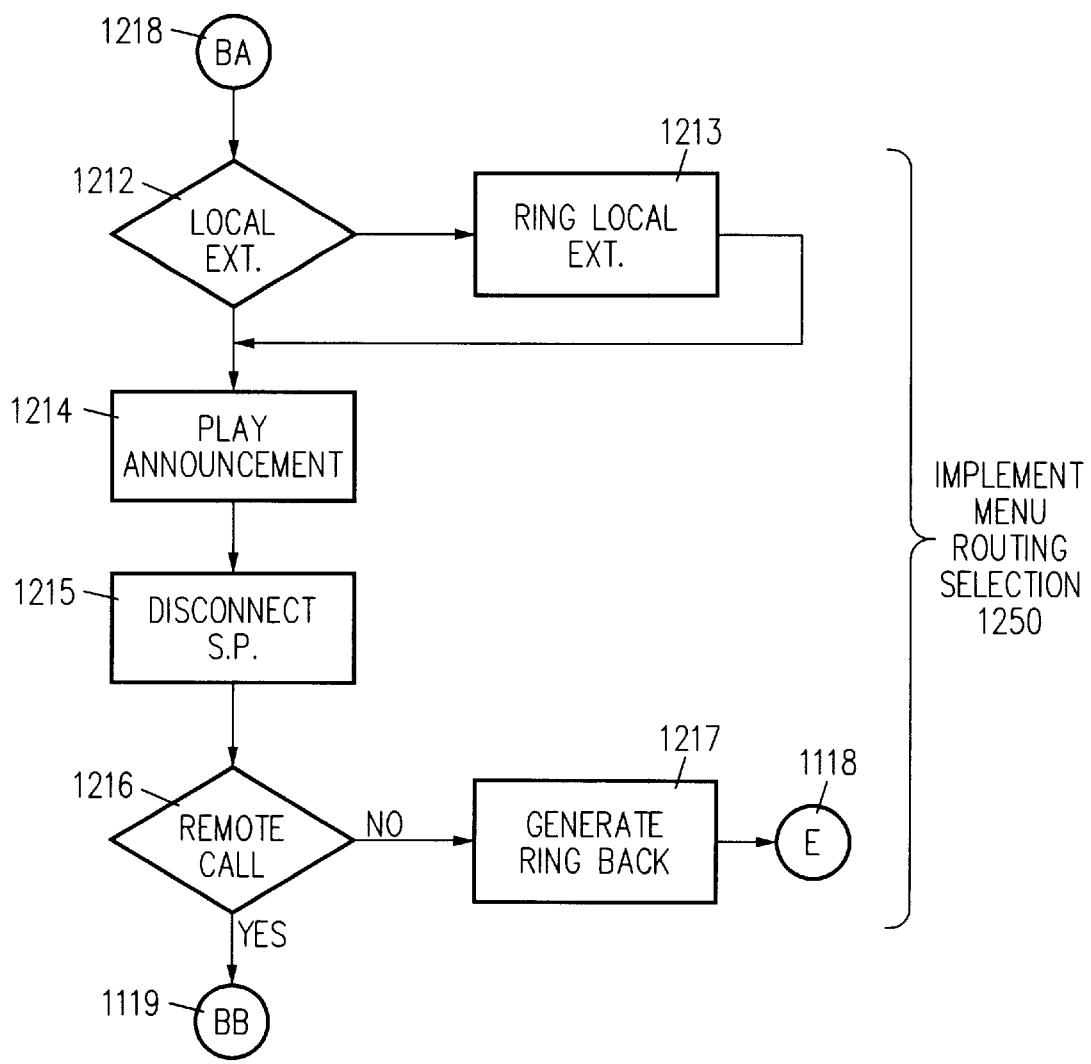

When a menu call handler is active, processing transfers through node 1115 (FIGS. 11 and 12A) to menu call transfer operation 1200 (FIGS. 12A and 12B). Prior to transferring, initial call routing operation 1100 initiated ringing of any local extensions specified in the call handler. In ring local extensions operation 1220, CPU 975 continues to ring the extensions. Wait for event operation 1201 waits for a message indicating that an event occurred.

At this time, two events are of interest, either a local extension goes off-hook, or a maximum number of rings of the local extensions, as specified in the PCAM configuration, occurs. When a local extension is answered, extension interface monitor and control circuit 620 (FIG. 6) generates a signal, in response to an off-hook signal on line 121-i, that changes the off-hook status bit for extension 141-i to indicate that the extension is off-hook. When CPU 975 determines that an extension has gone off-hook, a message is placed on the message queue indicating that extension 141-i is off-hook. Each time an extension is rung, wait for event operation 1201 receives an extension ring event. Wait for event operation 1201 counts the number of extension ring events.

When wait for an event operation 1201 receives an indication of a new message, processing transfers to check operations 1202 and 1203. Off-hook check operation 1202 determines if the message indicates that the extension is off-hook. If the message is not for an off-hook extension, check operation 1202 transfers processing to maximum number of rings check operation 1203, and conversely, if a local extension is off-hook, to call answering operation 1500 through node 1530.

If the ring count is equal to a maximum ring count specified in the PCAM configuration, maximum number of rings check operation 1203 transfers to DTMF decoder connect operation 1204 and otherwise returns to wait for event operation 1201. Thus, if a local extension is not answered within the predetermined number rings, CPU 975 initiates further processing that allows the caller to determine how the call is routed. In another embodiment, the maximum ring count is specified in each call handler rather than in the PCAM configuration.

In DTMF decoder connect operation 1204, CPU 975 configures switch matrix 350 (FIG. 4) so that trunk one receive line 410-1 is connected to DTMF one output line 441-1. (This assumes that the incoming call is on trunk line 110-1.) CPU 975 configures tone switch matrix 850 so that DTMF decoder circuit 854-1 is connected to DTMF one output line 441-1. Hence, DTMF decoder circuit 854-1 is configured to receive any DTMF tone or tones input by the calling party. Upon completion of operation 1204, CPU 975 transfers processing to take trunk off-hook operation 1205.

In take trunk off-hook operation 1205, CPU 975 writes to the bit in control registers 911 to configure trunk interface control circuit 520 in trunk interface circuit 301-1 (FIG. 5) so that a positive off-hook signal is generated on trunk line 110-1. CPU 975 transfers from take trunk off-hook operation 1205 to make trunk signal processor connection operation 1206.

In make trunk signal processor connection operation 1206, CPU 975 connects extension six receive line 420-6 from signal processor 340 to trunk one transmit line 411-2 so that signal processor 340 is connected to the incoming call. After the connection is made, CPU 975 transfers processing to play menu operation 1207.

In play menu operation 1207, CPU 975, using information from the menu call handler, sends instructions to digital signal processor 961 over bus 370 that indicates the custom prerecorded messages that digital signal processor 961 is to play back. The custom prerecord messages are the menu of call routing choices available to the caller. Also, the messages typically inform the caller that if a menu routing selection does not answer, or if the caller decides another routing selection is desired, the caller can return to the menu by entering a predetermined key or key sequence.

Digital signal processor 961 retrieves the stored custom prerecorded messages from non-volatile memory 906 and passes the custom prerecorded messages to CODEC 960 which in turn drives an analog signal onto switch matrix input line 420-6. The analog signal is transferred to the caller through switch matrix 350 and trunk interface circuit 301-1. After the menu is played back to the caller, CPU 975 transfers processing to wait for event operation 1208.

Wait for event operation 1208, as described previously, waits for a message on the message queue. At this point, two events are of interest, a hang-up by the caller, and a menu selection by the caller.

If the caller hangs-up, the line status signal detection circuit in trunk interface control circuit 520 (FIG. 5) detects a loop break and generates a signal to PCAM controller 310 that configures a corresponding status bit in the appropriate status register of PCAM controller 310. This results in a hang-up event. Thus, when wait for message event 1208 sends a message for the hang-up event to the operation that includes caller hang-up check operation 1209, check operation 1209 transfers to clear connections operation 1210.

In clear connections operation 1210, CPU 975 disconnects the connection between trunk one receive line 410-1 and DTMF one output line 441-1 and the connection between signal processor 340 and trunk one transmit line 411-2. The connection in tone switch matrix 850 also is cleared. If a connection or connections exist for a monitor extension through switch matrix 350, these connections are also cleared. Upon completion of clear connections operation 1210, processing returns to wait for event operation 1101. (FIG. 11.)

The other event of interest is the caller making a menu selection. In this case, the caller presses a key or key combination on the keypad of the telephone instrument being used by the caller, and as a result a DTMF signal is transmitted over PSN 90 to trunk line 110-1, though trunk interface circuit 301-1, through switch matrix 350 and tone switch matrix 850 to DTMF decoder circuit 854-1. DTMF decoder circuit 854-1 processes the received signal and transmits information to CPU 975 that specifies which key or keys were pressed by the caller, i.e., which menu selection was made. In response to the information from DTMF decoder circuit 854-1, a message is generated with an event indicating the keys pressed.

Menu selection operation 1211 processes the message and if it is a menu selection, transfers processing to local extension check operation 1212. If the message is for neither a hang-up, nor a menu selection, processing returns to wait for event operation 1208.

In another embodiment, not shown, a third event check operation is included following operation 1208. This check determines whether the key pressed by the caller is for an invalid menu selection. If the menu selection is invalid, the caller could be provided a special message by signal processor 340, or the operation could return to play menu operation 1207 so that the valid menu selections are replayed for the caller. Alternatively, a menu selection can be included that when selected by the caller, the caller is returned to play menu operation 1207.

Thus, operations 1208 to 1211 process the information entered by the caller which is a call routing selection. Consequently, unlike prior art systems where either calls were simply not answered or automatically went to voice mail, PCAM 100 provides the caller the opportunity to select how the call is processed. The possibilities could include dialing local extensions other than those originally rung; calling a remote telephone 160; calling a pager 179; calling central office voice mail 51; calling cellular telephone 180; calling any other telephone instrument that can be reached via PSN 90; routing the call to facsimile machine 133; routing the call to modem 134; or a combination of these possibilities. Thus, the caller is given control over how the owner of PCAM 100 is contacted. Notice again, that the caller has dialed a single number, but yet the caller is provided access to a variety of telephone instruments that may each have a different telephone number.

When processing transfers to local extension check 1212, the caller has selected one of the call routing possibilities from the menu. Local extension check 1212 determines whether the menu selection includes one or more local extensions. If one or more location extensions was selected, processing transfers to ring local extension operation 1213, and otherwise to play announcement operation 1214.

Ring local extension operation 1213 is the same operation as operation 1112 and so the description of operation 1112 is incorporated herein by reference. Upon completion of ring local extension operation 1213, processing also transfers to play announcement operation 1214.

Play announcement operation 1214 is optional. In this embodiment, CPU 975 sends instructions to signal processor 340 to play a message that tells the call to hold while the call is being transferred. Upon completion of play announcement operation 1214, processing transfers to disconnect signal processor operation 1215. In operation 1215, CPU 975 clears the connection in switch matrix 350 between input line 420-6 and output line 411-1.

As indicated above, the menu selection can be for local extensions only, a remote telephone number, or a combination of one or more local extensions and a remote telephone number. Thus, operation 1215 transfers to remote call check operation 1216, which in turn checks whether the menu selection included initiating a three-way call, a call on the second trunk line, or a combination of the two. If the menu selection includes a telephone number for either a three-way call or a call on the second trunk line, processing transfers through node 1119 to remote enabled check operation 1108 (FIG. 11). If only a local extension or extensions were selected, remote call check operation 1216 transfers to generate ring back operation 1217.

In generate ring back operation 1217, CPU 975 turns on ring back tone generator 758, and connects output line 430-4 of ring back tone generator 758 through switch matrix 350 (FIG. 4) to trunk one transmit line 411-1, which in turn is connected to trunk line 110-1, as described above. Thus, the caller is given a ring back signal while PCAM 100 rings the local extension or extensions. Processing transfers from generate ring back operation 1217 to call answer operation 1500 (FIGS. 15A and 15B) through node 1118.

Hence, if a menu call handler is active for the incoming call, operation 1200 gives the caller the option to route the call if none of the local extensions originally dialed answered. If a telephone instrument was selected that is not on user's premises, the processing reaches remote enabled operation 1108 which transfers through to three-way calling enabled check operation 1109.

Figure 13A:
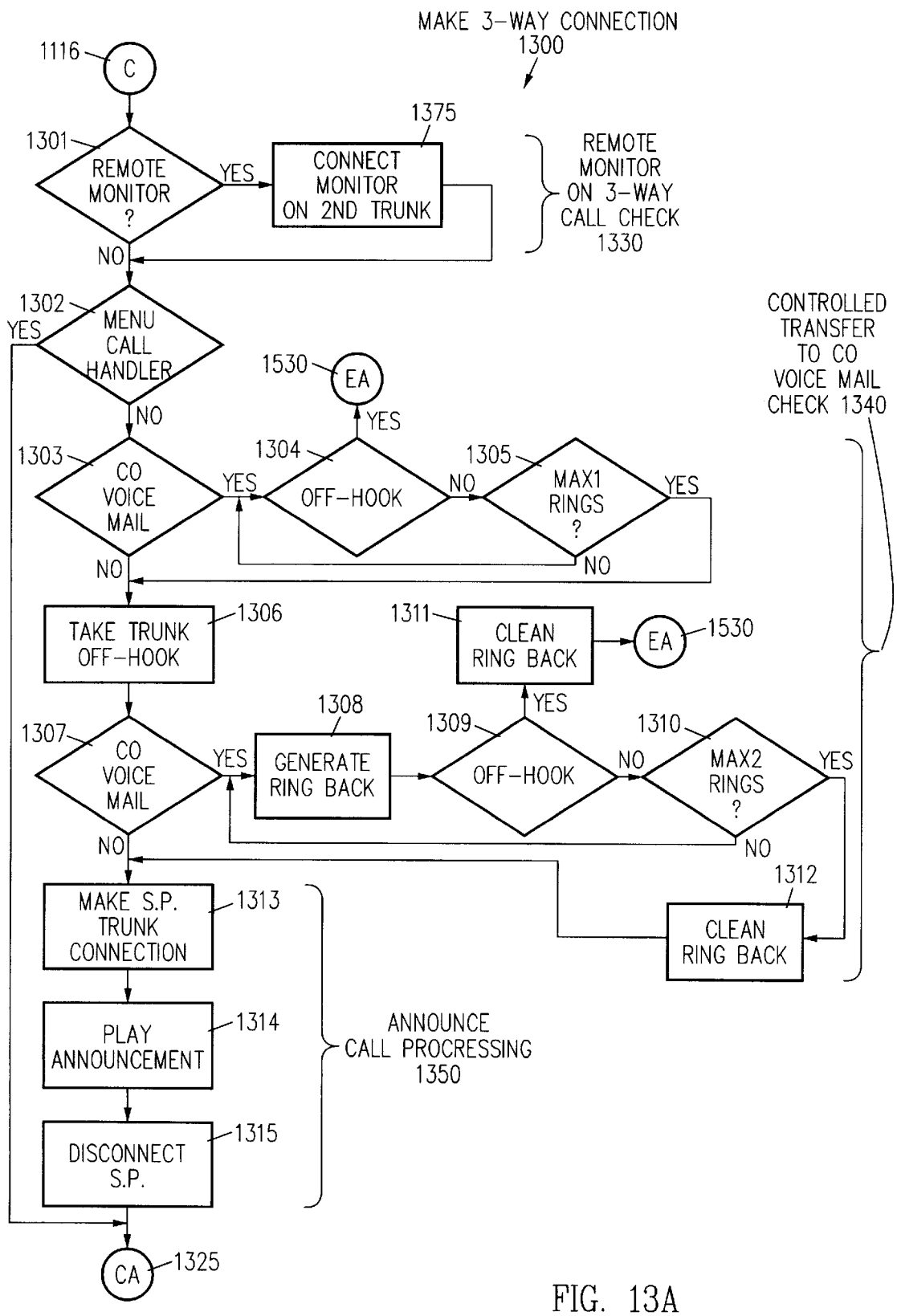
FIGS. 13A and 13B are a process flow diagram for a make three-way call connection operation used by the PCAM of this invention to implement a three-way call.
Figure 13B:
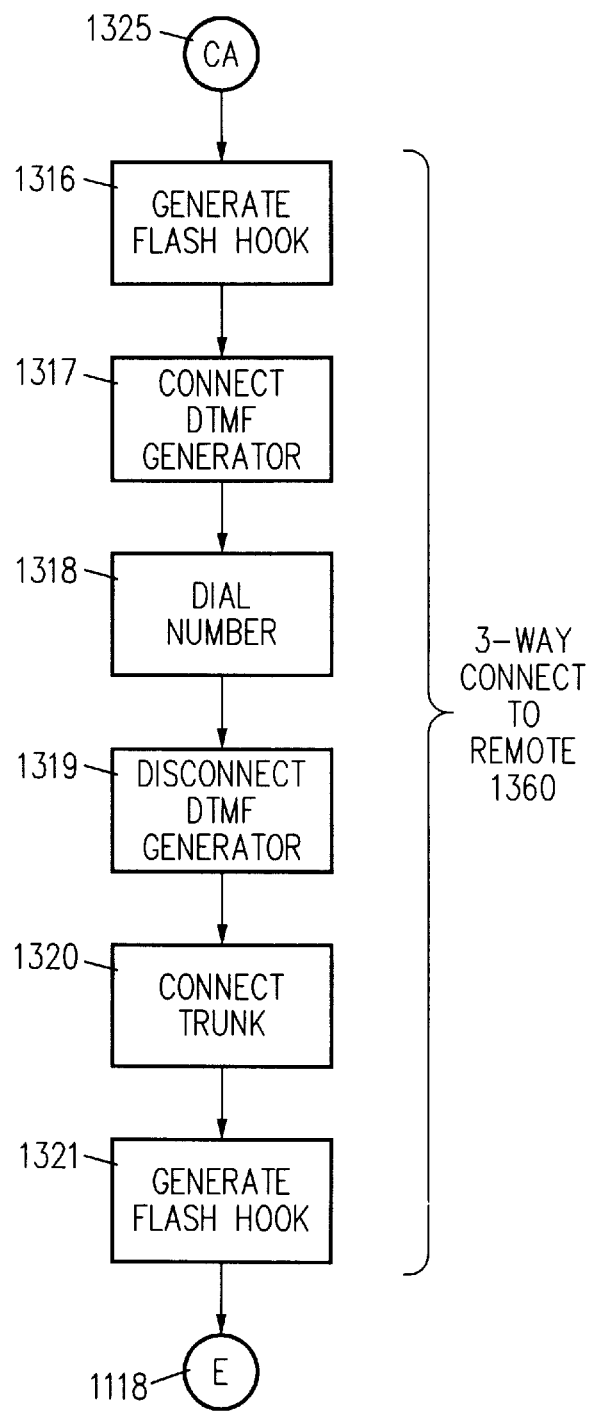

As indicated above, if three-way calling enabled check 1109 is true, processing transfers through node 1116 to a make three-way call connection operation 1300, that is illustrated in FIGS. 13A and 13B. Thus, three-way connection operation 1300 can be reached both directly through operation 1100 when a menu call handler is not active and indirectly though a menu call handler if the call selects a routing option that is implemented by the call handler using three-way calling.

Remote monitor check 1301 determines whether the active call handler has specified a monitor telephone on second trunk line 110-2. If a monitor telephone is not specified, remote monitor check 1301 transfers to menu call handler check operation 1302 and otherwise to connect remote telephone monitor operation 1375.

Figure 14:
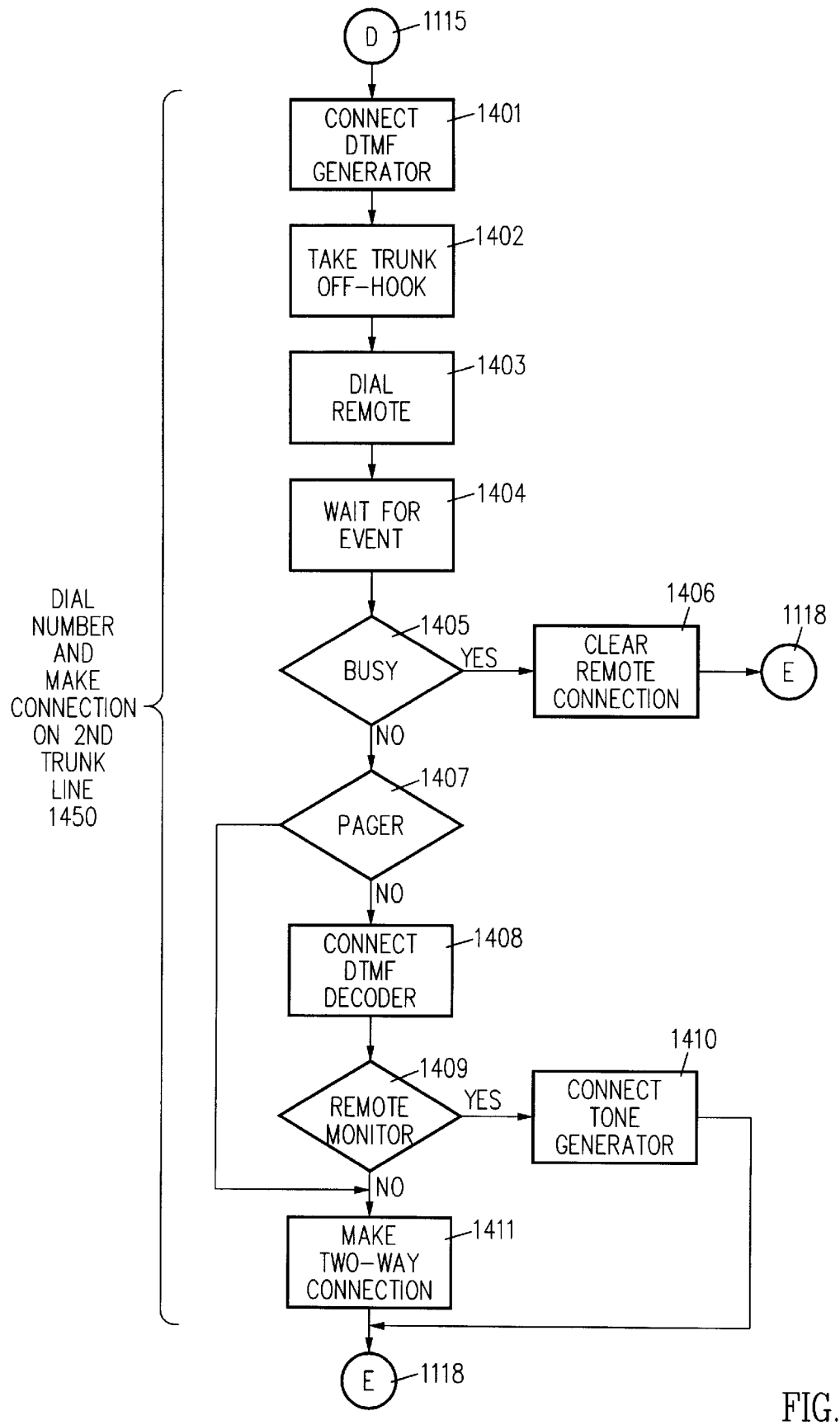
FIG. 14 is a process flow diagram for a make remote connection operation used by the PCAM of this invention to implement a call on a second telephone trunk line.

In this embodiment, the operations in connect remote telephone monitor operation 1375 are the same as in make remote connection operation 1450 (FIG. 14), except the entry point and the exit point are different for operation 1375. Specifically, in operation 1375, the entry is from check operation 1301 rather than through node 1115 as shown in FIG. 14, and operation 1375 exits to check operation 1302, rather than through node 1118, as shown in FIG. 14. Therefore, the description given below for operation 1450 is incorporated herein by reference for operation 1375.

When processing transfers to menu call handler check operation 1302, CPU 975 determines whether the active call handler is a menu call handler. If the active call handler is a menu call handler, the caller has chosen a routing option via three-way calling that either connects the caller to central office voice mail 51 to another remote telephone number. Therefore, executing controlled transfer to CO voice mail check operation 1340 is unnecessary. Consequently, if the active call handler is a menu call handler, processing transfers from check operation 1302 to three-way connect to remote operation 1360 (FIG. 13B), and otherwise to CO voice mail check operation 1303.

CO voice mail check operation 1303 is reached when either a direct call handler, or a monitor call handler is active. In either instance, the owner of PCAM 100 has implemented a call routing option that uses three-way calling, and the processing must determine which of the two possible routing choices is specified, because routing to CO voice mail 51 requires special processing. Specifically, when using CO voice mail 51, CO 50 determines the maximum number of rings MAXCO that occur on primary trunk line 110-1, before CO 50 routes the call to voice mail 51. Once CO 50 routes the incoming call on primary trunk line 110-1 to voice mail 51, PCAM 100 can no longer process or control the incoming call. Therefore, to maintain control over all incoming calls, PCAM 100 must answer the call before CO 50 routes the call to voice mail 51. Prior to considering the operations that control these operations, some definitions are useful.

PCAM 100 uses a maximum answer ring count and a maximum extension ring count in determining when to answer incoming telephone calls. In the following description, these ring counts are specified by the active call handler. In another embodiment, the ring counts are a part of the PCAM configuration and are set for each trunk line port.

The maximum answer ring count is the number of rings on a trunk line 110-i before PCAM 100 answers an incoming call. Thus, if the maximum answer ring count is two rings, PCAM 100 answers the call at the start of the third ring. The maximum extension ring count is the number of times that local extensions are rung before PCAM implements call handling options. If the maximum answer ring count is greater than the maximum extension ring count, the maximum answer ring count is the number of times that local extensions are rung before PCAM implements call handling options.

Thus, for direct and monitor call handlers that implement routing options that do not include a transfer to CO voice mail, and for menu call handlers, the maximum answer ring count is set greater than the maximum extension ring count. Thus, PCAM 100 rings local extensions the number of times specified by maximum answer ring count and then either answers the call if necessary, e.g., to play a menu or to announce an option such as "Please wait while your call is routed to my pager. The paging service will provide instructions on entering your telephone number," or implements some other routing option, e.g., initiates a call on second trunk line 110-2 to a remote telephone. This configuration of the maximum answer and extension ring counts facilitates parallel ringing. If no additional routing options are used by the call handler, e.g., when a local telephone answering device answers the call, the maximum answer ring count is set to a large number.

In another embodiment, described more completely below, PCAM 100 takes trunk line 110-1 off-hook after the maximum answer ring count, which is less than the maximum extension ring count, and generates a ring back signal to the caller. PCAM 100 checks for a fax tone. If a fax tone is detected, the incoming call is connected by PCAM controller 310 either to the appropriate local extension, or a remote extension is dialed and connected to trunk line 110-1. If a fax tone is not detected, and a local extension is not answered within the maximum extension ring count, PCAM controller 310 implements the call routing selection or selections specified by the active call handler. Thus, in this embodiment, a remote call is implemented only after the local extensions have been rung the number of times specified by the maximum extension ring count.

Returning to FIG. 13A, when the active call handler specifies use of CO voice mail 51, the maximum answer ring count is selected as at least one ring less than maximum number of rings MAXCO so that PCAM 100 answers the call before CO 50 can route the call to CO voice mail 51. In this case, the maximum extension ring count controls the total number of rings on the local extensions before the incoming call is transferred to CO voice mail 51.

Thus, if CO voice mail check operation 1303 determines that the active call handler has a transfer to CO voice mail, processing transfers to local extension off-hook check operation 1304. Local extension off-hook check operation 1304 is the same as operation 1202 described above and that description is incorporated herein by reference. If a local extension is not answered, local extension off-hook check operation 1304 transfers to MAX1 rings check 1305 and otherwise through node 1530 to call answer operation 1500. Also, a caller hang-up check could be included with check operations 1304 and 1305 that would be similar to operation 1209, described above. In MAX1 rings check 1305, CPU 975 monitors the number of rings on trunk line 110-1. When the number of rings equals the maximum answer ring count specified in the active call handler, processing transfers to take trunk off-hook operation 1306, and otherwise back to off-hook check operation 1304.

In take trunk off-hook operation 1306, CPU 975 answers the incoming call by transmitting a command to the line interface control circuit within trunk interface control circuit 520 in trunk interface subsystem 301-1, which in turn generates an off-hook signal on primary telephone trunk line 110-1. Thus, if a transfer to CO voice mail is specified, PCAM 100 always answers the call before CO So can take control of the call.

Also, note that if a transfer to CO voice mail is not specified, this embodiment assumes that if a menu call handler is not active, the active call handler has specified either ringing of local extensions and a remote extension simultaneously, or only ringing of a remote extension. PCAM 100 can also implement an option where the local extensions are rung a predetermined number of times and then a three-way call is initiated. The additions to implement this option within operation 1300 will be apparent to those skilled in the art. Briefly, to include this option, the no exit from check operation 1303 would go to a delayed remote transfer check operation. If a delayed remote transfer is not specified, the delayed remote transfer check would transfer to operation 1306. Conversely if a delayed remote transfer was specified, the delayed remote transfer would transfer to an off-hook check operation, and if the incoming call was not answered, to a MAX2 rings check, that functions the same as operation 1310, which in turn transfers either to the off-hook check operation or to operation 1306.

After the incoming call is answered in operation 1306, processing transfers to a second CO voice mail check operation 1306. If CO voice mail 1306 determines that the active call handler has a transfer to CO voice mail, processing transfers to generate ring back operation 1308, and otherwise to make signal processor trunk connection operation 1313.

In generate ring back operation 1308, CPU 975 turns on ring back tone generator 758, and connects output line 430-4 of ring back tone generator 758 through switch matrix 350 (FIG. 4) to trunk one transmit line 411-1, which in turn is connected to trunk line 110-1, as described above. Thus, even though PCAM 100 has answered the incoming call, the caller continues to hear only a ring back signal and so is unaware that the call has been answered.

Generate ring back operation 1308 transfers to off-hook check operation 1309. Off-hook check operation 1309 also is the same as operation 1202 described above and that description is incorporated herein by reference. If a local extension is not answered, off-hook check operation 1309 transfers to MAX2 rings check operation 1310 and otherwise to clear ring back operation 1311. Again, a caller hang-up check could be included with check operations 1309 and 1310 that would be similar to operation 1209, described above.

When processing transfers to operation 1311, clear ring back operation 1311 turns off ring back tone generator 758 and clears the connection of generator 758 to trunk line 110-1 in switch matrix 350. Operation 1311 transfers through node 1530 to operation 1500.

Alternatively, when processing transfers to MAX2 rings check operation 1310, CPU 975 monitors the total number of rings on trunk line 110-1. When the total number of rings equals the largest of the maximum extension ring count and the maximum answer ring count specified in the active call handler, processing transfers to clear ring back operation 1312, and otherwise back to generate ring back operation 1308. Operation 1312 performs the same function as operation 1311 and transfers to make signal processor trunk connection 1313.

Make signal processor trunk connection operation 1313 performs the same operations as described above for operation 1206 and that description is incorporated herein by reference. Operation 1313 transfers to play announcement operation 1314.

Play announcement operation 1314 performs the operations similar to those described above for operation 1214 and that description is incorporated herein by reference. Operation 1314 transfers to disconnect signal processor operation 1315.

Disconnect signal processor operation 1315 performs the same operations as described above for operation 1215 and that description is incorporated herein by reference. Operation 1315 (FIG. 13A) transfers to generate flash hook operation 1316.

In generate flash hook operation 1316, CPU 975 writes to control registers 911 to configure trunk interface control circuit 520 within trunk interface subsystem 301-1 so that trunk interface control circuit 520 generates a one second flash hook signal on primary trunk line 110-1, e.g., trunk line 110-1 is placed on-hook for one second and then taken off-hook again. The flash hook signal places the call on primary telephone line 110-1 on hold at CO 50. Upon completion of generate flash hook operation 1316, processing transfers to connect DTMF generator operation 1317.

In connect DTMF generator operation 1317, CPU 975 issues control signals to switch matrix 350 (FIG. 4) to connect input line 440-1 from DTMF one tone generator circuit 755-1 to trunk one transmit 411-1 of switch matrix 350. Thus, DTMF one tone generator circuit 755-1 is connected by trunk line 110-1 to CO 50. Connect DTMF generator operation 1317 transfers processing to dial telephone number operation 1318.

In dial telephone number operation 1318, CPU 975 sequentially writes the code for each of the digits in the telephone number for the remote telephone to DTMF one tone generator circuit 755-1. DTMF one tone generator circuit 755-1, in response to each code, generates the tones for the remote telephone that in turn are transmitted through switch matrix 350, two-to-four wire hybrid circuit 530, trunk interface control circuit 520, and line protection circuit 510 to trunk line 110-1. When the telephone number for the remote telephone is dialed, processing transfers from dial telephone number operation 1318 to disconnect DTMF generator operation 1319.

In disconnect DTMF generator operation 1319, CPU 975 clears the connection in switch matrix 350 between DTMF one input line 440-1 and trunk one transmit line 411-1. Operation 1319 transfers to connect trunk operation 1320.

Figure 4:
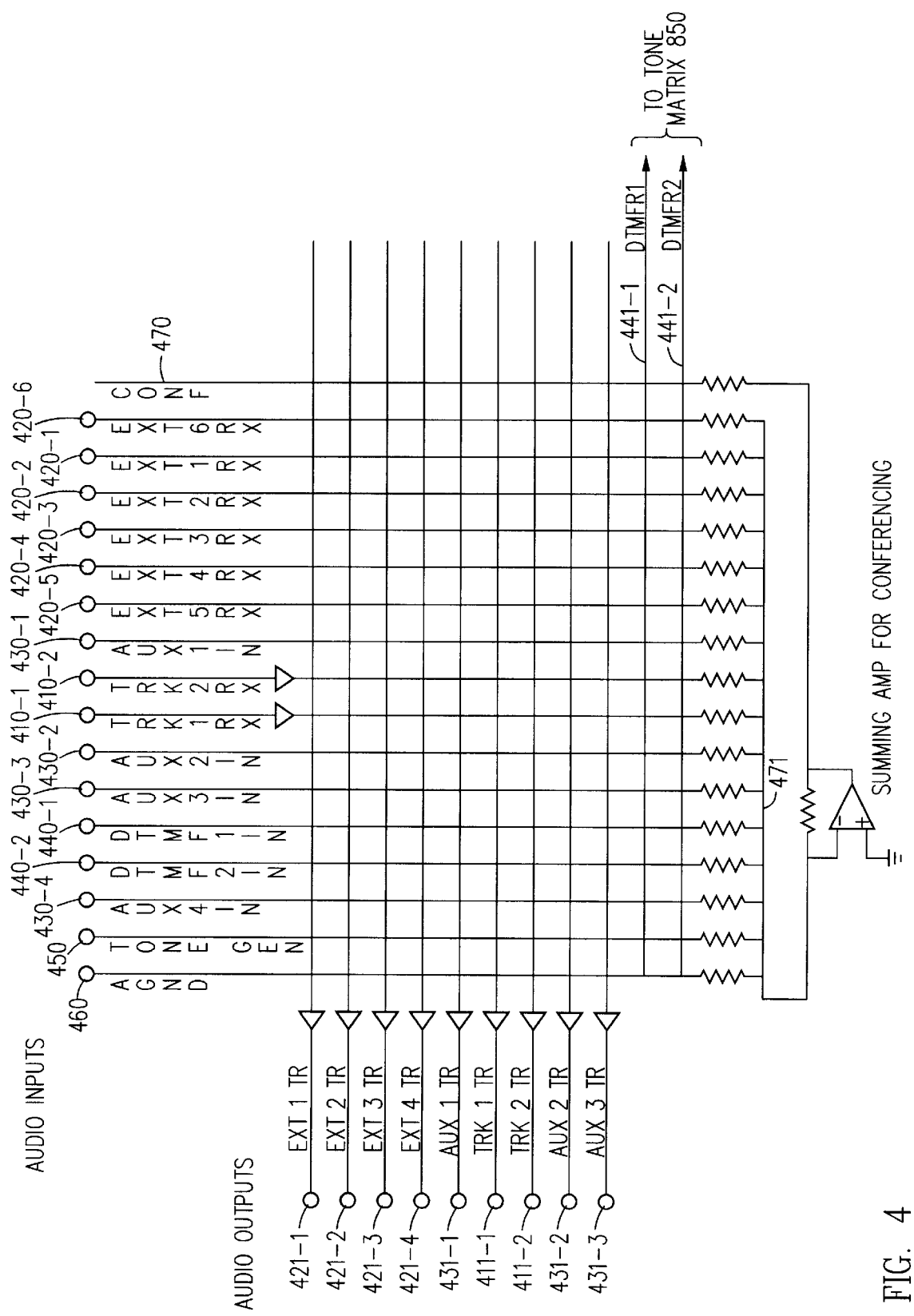
FIG. 4 is a more detailed diagram of one embodiment of the switch matrix of FIG. 3.

In connect trunk operation 1320, CPU 975 reconfigures switch matrix 350 so that trunk one receive line 410-1 is connected to trunk one transmit line 411-1 of switch matrix 350 (FIG. 4). After switch matrix 350 is reconfigured, processing transfers from connect trunk operation 1320 to generate flash hook operation 1321.

In generate flash hook operation 1321, CPU 975 generates a flash hook signal on trunk line 110-1 in the same manner as described above for operation 1316. However, the second flash hook signal is generated with a delay time in the range of 320 milliseconds to 2500 milliseconds after the first flash hook signal in operation 1316. The flash hook signal causes CO 50 to connect together the incoming call, personal call manager 100, and the call to the telephone dialed.

Thus, personal call manager 100 is a party to the call and continues to monitor for DTMF tones. Also, if the telephone number dialed in response to the incoming call is the telephone number for trunk line 110-1, and the telephone number has CO voice mail 51, trunk line 110-1 is busy and so CO 50 transfers directly to CO voice mail 51. Thus, even though PCAM 100 prevented a transfer to voice mail 51 by CO 50, the call is transparently transferred by PCAM 100 to voice mail 51, and PCAM 100 retains control of the incoming call. Upon completion of operation 1321, processing transfers through node 1118 to call answer operation 1500 (FIGS. 15A and 15B).

The above description assumed that three-way calling was enabled and so three-way call enabled check operation 1109 (FIG. 11) transfers through node 1116 to operation 1300 (FIGS. 13A and 13B). However, if three-way calling was not enabled, processing transfers from operation 1109 through node 1117 to make remote connection operation 1450 (FIG. 14).

In make remote connection operation 1450, a telephone instrument is dialed over second trunk line 110-2. The type of connection established to second trunk line 110-2 depends on whether a monitor call is being established. Initially, in connect DTMF generator operation 1401, CPU 975 issues control signals to switch matrix 350 (FIG. 4) to connect DTMF input line 440-2 from DTMF two tone generator circuit 755-2 to trunk two transmit line 411-2 of switch matrix 350. Thus, DTMF two tone generator circuit 755-2 is connected to trunk line 110-2. Connect DTMF generator operation 1401 transfers processing to take trunk off-hook operation 1402.

Take trunk off-hook operation 1402 is similar to take trunk off-hook operation 1306, that was described above, and is incorporated herein by reference, except trunk line 110-2 is taken off-hook instead of trunk line 110-1. Take trunk off-hook operation 1402 transfers processing to dial remote operation 1403.

In dial remote operation 1403, CPU 975 sequentially writes the code for each of the digits in the remote telephone number to DTMF two tone generator circuit 755-2. DTMF two tone generator circuit 755-2, in response to each code, generates the tones for the remote telephone number that in turn are transmitted through switch matrix 350, two-to-four wire hybrid circuit 530, trunk interface control circuit 520, and line protection circuit 510 in trunk interface subsystem 301-2 to trunk line 110-2. When the telephone number for the remote telephone is dialed, processing transfers from dial remote telephone number operation 1403 to wait for event operation 1405.

When wait for event operation 1405 receives a message, processing transfers to busy check operation 1405. Call progress detector two circuit 850-2 is connected to trunk line 110-2. Thus, if the remote line is busy, circuit 850-2 detects the busy signal and notifies CPU 975 which in turn generates a message for a busy event on trunk line 110-2. Conversely, if the remote line is not busy, circuit 850-2 detects a ring back signal, and notifies CPU 975 which in turn generates a message for a ring back event on trunk line 110-2. Thus, if busy check operation 1405 determines that a busy event has occurred, processing transfers to clear remote connection operation 1406 and otherwise to pager check operation 1407. In clear remote connection operation 1406, CPU 975 clears all connections in switch matrix 350 to or from trunk line 110-2 and transfers processing though node 1118 to call answer operation 1500 (FIGS. 15A and 15B).

In pager check operation 1407, CPU 975 checks the active call handler to determine whether the number dialed on trunk line 110-2 is to pager service provider 175. When a call is routed through PCAM 100 to pager service provider 175, a direct connection is made to provider 175 and PCAM 100 does not monitor the connections with a DTMF decoder circuit so that the DTMF data provided by the caller to provider 175 is not misinterpreted by PCAM 100 as instructions for PCAM 100. Thus, if provider 175 is being called, pager check operation 1407 transfers directly to make two-way connection operation 1411, and conversely to connect DTMF decoder operation 1408.

In DTMF decoder connect operation 1408, CPU 975 configures switch matrix 350 (FIG. 4) so that trunk two receive line 410-2 is connected to DTMF two output line 441-2. (This assumes that the incoming call is on trunk line 110-1.) CPU 975 configures tone switch matrix 850 so that DTMF decoder circuit 854-2 is connected to DTMF two output line 441-2. Hence, DTMF decoder circuit 854-2 is configured to receive any DTMF tone input from the DTMF interface on the telephone instrument used to answer the call on trunk line 110-2. Upon completion of DTMF decoder connect operation 1408, processing transfers to remote monitor check operation 1409.

In remote monitor check operation 1409, CPU 975 determines whether the call handler designated the call on trunk line 110-2 as a monitor call. If the call is a monitor call, check operation 1409 transfers processing to connect tone generator operation 1410, and otherwise processing transfers from check operation 1409 to make two-way connection operation 1411.

In connect tone generator operation 1410, CPU 975 configures switch matrix 350 (FIG. 4) so that the signal on line 450 from call waiting tone generator 756 in tone generator circuit 710 is connected to trunk two transmit line 411-2. Thus, when the telephone instrument called over trunk line 110-2 goes off-hook, the listener hears the tone generated by generator 756. In this embodiment, CPU 975 switches generator 756 off and on with a cadence that is 40 milliseconds on, 50 milliseconds off, 40 milliseconds on, and 200 milliseconds off. As explained more completely below; this pattern repeats until a predetermined code is entered on trunk line 110-2 or a time out period ends following the extension going off-hook. Upon completion of making the connection through switch matrix 350, CPU 975 transfers processing through node 1118 to call answer operation 1500 (FIGS. 15A and 15B).

In make two-way connection operation 1411, CPU 975 configures switch matrix 350 so that trunk one receive line 410-1 is connected to trunk two transmit line 411-2, and trunk two receive line 410-2 is connected to trunk one transmit line 411-1. Thus, a two-way connection is made through PCAM 100 between trunk lines 110-1 and 110-2. CPU 975 also enables gain switch 380. Two-way connection operation 1411 transfers through node 1118 to call answer operation 1500 (FIGS. 15A and 15B).

In the above embodiments, a two-way connection was made between the incoming call and any remote extension when the incoming call could be taken at either a local or a remote extension. This allowed the caller to hear the tones generated by the CO for the remote connection. Further, as described below, the remote connection is cleared when the local extension answers. Thus, if the local extension is answered first, the incoming call can not be taken on the remote extension unless the call is routed to the remote extension by the answering party.

If it is desired to allow either the remote extension or the local extension to take the call, the operations to clear the remote extension could be delayed for a predetermined period to allow time for both extensions to answer. In this embodiment, the parties answering the incoming call would decide who took the call.

One way to implement this feature would be to take the incoming call off-hook and generate ring back tones to the caller. When an extension is answered, either remote or local, the ring back tones are terminated and the answering extension would be connected to the incoming call by a two-way connection using the conference call capability of switch matrix 350. This allows connecting both the local and remote extensions to the incoming call via a two-way connection. If the other extension is not answered in the predetermined time period, the call to that extension is terminated. The operations necessary to perform this type of call handling will be apparent to those skilled in the art in view of the following disclosure.

Returning to the present embodiment, in call answer operation 1500, wait for event operation 1501 detects when a new message is added to the message queue and transfers to caller hang-up check operation 1503. Caller hang-up check operation 1503 determines whether the caller terminated the call before an extension connected to PCAM 100, either a remote or local extension, answered.

Specifically, when trunk line 110-1 is off-hook, trunk interface circuit 301-1 detects a loop break signal on trunk line 110-1, which indicates that the caller hung up. Upon trunk interface circuit 301-1 detecting a loop break signal, an appropriate bit is set in status registers 910, which in turn results in a message being added to the message queue that indicates a loop break on trunk line 110-1.

Alternatively, if the caller hangs up before the call is answered, CPU 975 detects the absence of a ring voltage and adds a message to the message queue indicating a caller hang-up. Recall that trunk interface circuit 301-1 informs CPU 975 each time a ring voltage is detected on trunk line 110-1.

When caller hang-up operation 1502 detects either the caller hang-up, or loop break message for trunk line 110-1, processing transfers to clear connections operation 1503. In clear connections operation 1503, the various connections in switch matrix 350 and tone switch matrix 850 to implement and handle the incoming call are cleared and processing is transferred to wait for event operation 1101 (FIG. 11). Conversely, if the message is not for a hang-up on trunk line 110-1, check operation 1502 transfers to call answer operation 1504, that in turn determines whether the message is for an extension, either local or remote, going off-hook that is not a monitor extension.

The operation used to detect an extension going off-hook is different for remote extensions and for local extensions. For a remote extension, the call progress detector, that is connected to trunk line 110-i on which the remote telephone number was dialed, detects the remote extension going off-hook when the ring back signal stops. Alternatively, to take a remote call, the party on the remote telephone instrument could be required to enter a predetermined key or key sequence using the DTMF interface. In this case, the off-hook condition would be detected by the DTMF decoder circuit connected to trunk line 110-i. In either case, a message is generated indicating that the remote extension is off-hook.

When a local extension 141-i goes off-hook, extension interface monitor and control circuit 620 (FIG. 6) generates a signal, in response to the off-hook signal on line 121-i, that changes the off-hook status bit for extension 141-i to indicate that the extension is off-hook. When CPU 975 determines that an extension has gone off-hook, a message is sent indicating that extension 141-i is off-hook. Thus, if call answer check operation 1504 receives a message that either a remote extension or a local extension is off-hook, processing transfers to pager check operation 1505, and otherwise returns to wait for event operation 1501. In check operation 1504, if a monitor extension goes off-hook, this is not considered a call answer, because the monitor extension answer is handled by a separate operation that is described more completely below.

Notice also, that if the call was answered in one of the operations described above, the operation transfers through node 1530 to ring back active check operation 1505. In ring back active check operation 1505, CPU 975 determines whether a ring back signal is being applied to trunk line 110-1. If a ring back signal is being generated, check operation 1505 transfers to clear ring back operation 1506 and otherwise to clear local extension ringing operation 1507.

Clear ring back operation 1506 turns off ring back tone generator 758 and clears the connection of generator 758 to trunk line 110-1 in switch matrix 350. Operation 1506 also transfers to clear local extension ringing operation 1507.

In clear local extension ringing operation 1507, PCAM controller 310 clears the ring command to each extension interface subsystem 303-i that was originally rung, but did not answer the incoming call. Operation 1507 transfers to pager check operation 1508.

Figure 16:
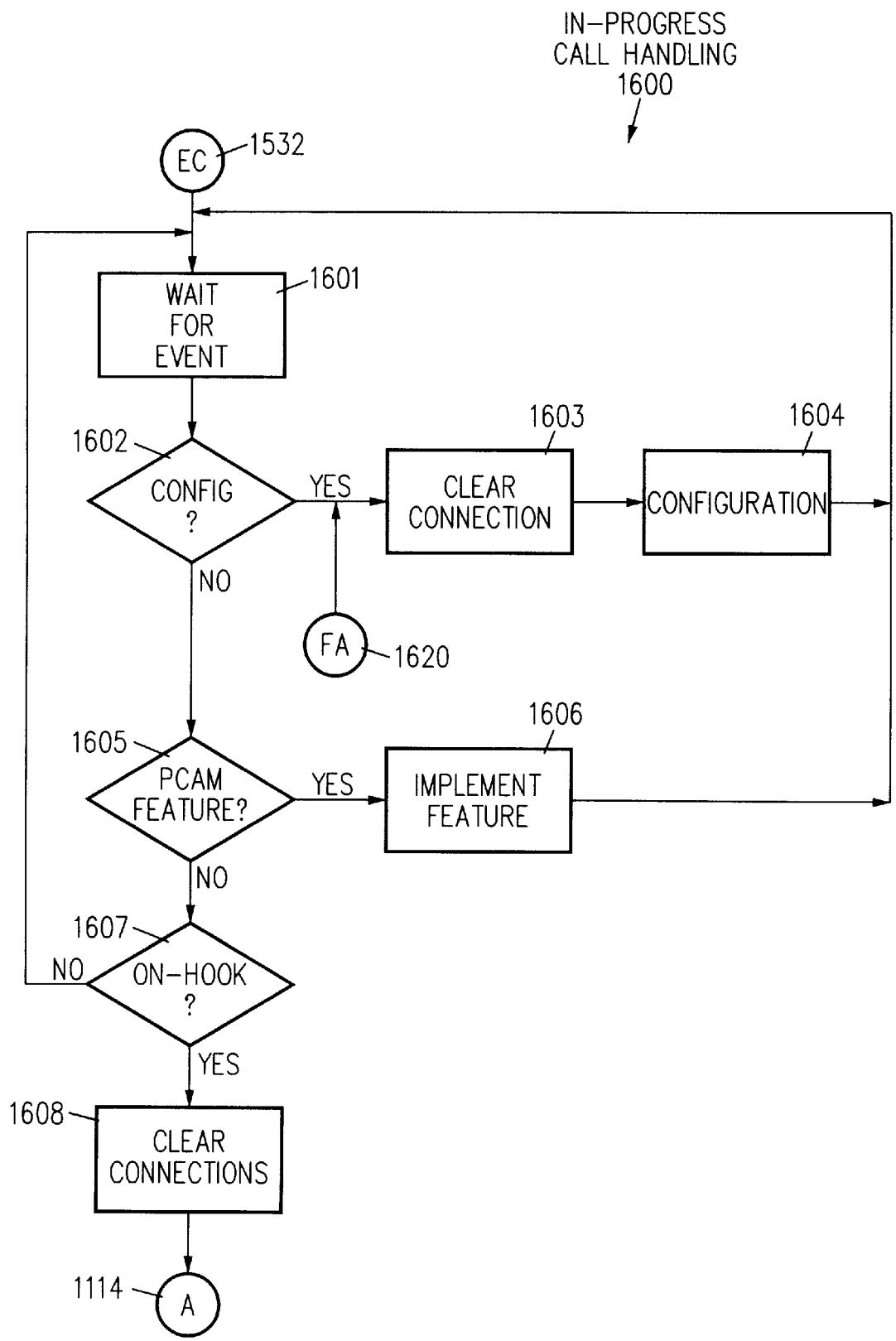
FIG. 16 is a process flow diagram for an in-progress call handling operation used by the PCAM of this invention to retain control over a call in-progress.
Figure 17:
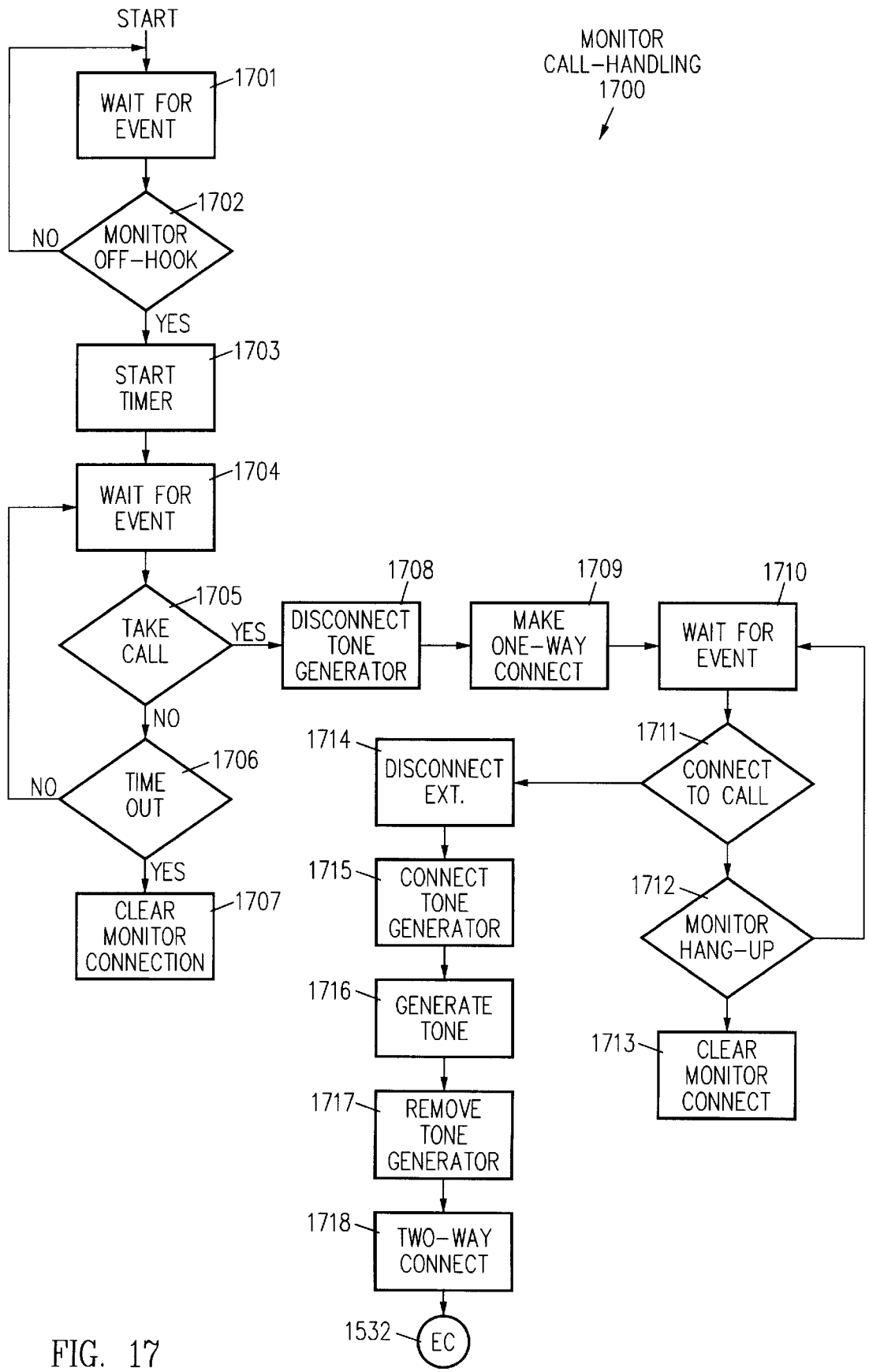
FIG. 17 is a process flow diagram for a monitor call handling operation used by the PCAM of this invention to process instructions from a monitor telephone instrument after a monitor call is made.

As indicated above, if a call is being placed to a pager service provider 175, PCAM 100 does not use the DTMF decoders to monitor the call. Accordingly, if the active call handler is placing a call to pager service provider 175, pager check operation 1508 transfers through node 1532 to in-progress call handling operation 1600 (FIG. 16). Conversely, if pager service provider 175 is not being called, pager check operation 1508 transfers to menu call handler check operation 1509.

If a menu call handler is active, DTMF decoder circuit 854-1 was already connected to trunk line 110-1, but for a direct call handler or a monitor call handler, DTMF decoder circuit 854-1 is not connected to trunk line 110-1. Consequently, if a menu call handler is active, check operation 1509 branches around connect DTMF decoder operation 1510 to local extension answer check operation 1511, and conversely to operation 1510.

Operation 1510 is the same as DTMF decoder connect operation 1204 described above, and that description is incorporated herein by reference. Operation 1510 also transfers to local extension answer check operation 1511.

If either a three-way call or a remote call on second trunk line 110-2 has answered, a two-way connection is already established between the remote call and the incoming call and a DTMF decoder circuit is connected so as to monitor the call progress. Consequently, if the extension answering is not a local extension, local extension check operation 1511 transfers to in-progress call handling operation 1600 (FIG. 16) so as to branch around the operations that configure PCAM 100 to monitor the call on a local extension. Hence, if a local extension answered the incoming call, check operation 1511 (FIG. 15A) transfers to trunk off-hook check operation 1512 (FIG. 15B).

Trunk off-hook check operation 1512 determines whether trunk line 110-1 is already off-hook. If trunk line 110-1 is off-hook, processing transfers to remote connected check operation 1514, and otherwise to take trunk off-hook operation 1513. Take trunk off-hook operation 1513 is the same as operation 1205 described above and that description is incorporated herein by reference. Take trunk off-hook operation 1513 also transfers to remote connected check operation 1514.

As described above, PCAM 100 can ring both remote and local extensions simultaneously. Since a local extension has answered the incoming call, PCAM controller 310 must determine whether a connection to a remote extension has been established. Thus, if no connection to a remote extension has been established, remote connected check operation 1514 transfers to connect DTMF decoder operation 1517. Conversely, if a connection to a remote extension exists, check operation 1514 transfers to monitor call handler check 1515.

If the remote connection is to a remote monitor telephone, PCAM controller 310 does not want to disconnect the remote connection at this point. Thus, for a monitor call handler, monitor call handler check operation 1515 transfers processing to connect local extension operation 1518. However, if the remote connection is not for a monitor telephone instrument, check operation 1515 transfers to disconnect remote operation 1516.

Disconnect remote operation 1516 clears all connections through switch matrix 350 and tone switch matrix 850 for the remote connection. If a three-way call has been established, disconnect remote operation 1516 generates a flash hook signal on trunk line 110-1 to terminate the three-way call. In particular, the connection of DTMF decoder circuit 854-2 is cleared so that circuit 854-2 can be used for the local extension. Upon completion of clearing the connections, operation 1516 transfers to connect DTMF decoder operation 1517.

In connect DTMF decoder operation 1514, CPU 975 configures switch matrix 350 (FIG. 4) so that extension receive line 420-i is connected to DTMF two output line 441-2. CPU 975 also configures tone switch matrix 850 so that DTMF decoder circuit 854-2 is connected to DTMF two output line 441-2. Hence, DTMF decoder circuit 854-2 is configured to receive any DTMF tone input from the DTMF interface on the local telephone instrument on local extension 141-i that answered the incoming call. Upon completion of DTMF decoder connect operation 1514, processing transfers to connect local extension operation 1515.

In connect local extension operation 1518, a two-way connection is made through switch matrix 350 between trunk line 110-1 and line 121-i of the extension answering the call. Specifically, CPU 975 configures switch matrix 350 so that trunk one receive line 410-1 is connected to extension transmit line 421-i, and extension receive line 420-i is connected to trunk one transmit line 411-1. Thus, a two-way connection is made through PCAM 100 between trunk line 110-1 and extension 141-i that answered the call. Further, if the call is not monitored, PCAM 100 has a DTMF decoder circuit connected to each party so that PCAM 100 can implement any features provided by the active call handler, as explained more completely below. Connect local extension operation 1518 transfers to in-progress call handling operation 1600.

In-progress call handling operation 1600 (FIG. 16) idles in wait for event operation 1601. When an event occurs, wait for event operation 1601 passes a message to a series of check operations that determine whether to operation the event.

When the call is established, three basic events are of interest. A first event is entry of a predetermined DTMF key or key sequence that is used to configure PCAM 100 using a DTMF interface. A second event is entry of a predetermined DTMF key or key sequence that is used to instruct PCAM 100 to implement a particular PCAM feature, for example, a transfer to another extension either local or remote including a remote voice mail service or a local telephone answering device. The final event is termination of the call.

Thus, operation 1600 idles in wait for event operation 1601 until either one of the parties to the call enters a tone using the DTMF interface, or both parties hang up so that an on-hook condition is detected for both lines. If a party presses a key, the resulting tone is passed though switch matrix 350 and tone switch matrix 850 to the appropriate DTMF decoder circuit 854-i.

In response to the tone, DTMF decoder circuit 854-1 sets a bit in status registers 910, and wait for event operation 1601 receives a message that indicates the entry of a character using a DTMF interface. In response to the message wait for event operation transfers to configuration check operation 1602. Configuration check 1602 determines whether the predetermined key sequence to initiate configuration of PCAM 100 has been pressed. In one embodiment, the predetermined key sequence is pressing the star key twice. For this key sequence, configuration check 1602 is active only on the first two key presses and is inactive during subsequent operations. This prevents conflicts with other CO services, e.g., CO voice mail 51, that may use the same key sequence. Thus, after the first key press, the predetermined key sequence for initiating configuration of PCAM 100 has not been entered, and so check operation 1602 passes to PCAM feature check operation 1605. Remaining checks 1605 and 1606 in operation 1600 are performed and if none of the checks is true, processing returns to wait for event operation 1601.

When the user enters another tone, DTMF decoder circuit 854-i generates another event that results in a message being placed on the message queue. Wait for event operation 1601 again transfers to configuration check operation 1602. Again, if the user has pressed the star key twice, check 1602 transfers to clear connection operation 1603. Otherwise, remaining checks 1605 and 1607 are again performed and if none are true, processing returns to wait for event operation 1601.

When processing transfers to clear connection operation 1603, CPU 975 clears any connections in switch matrix 350 and tone switch matrix 850 to lines other than the lines associated with the telephone instrument that entered the PCAM configuration code. After the connections are cleared, processing transfers to configuration operation 1604.

In configuration operation 1604, signal processor 340 is connected to the transmit output line of switch matrix 350 for the telephone instrument from which the configuration code was entered. Note that the telephone instrument can be either at a remote location or on user's premises 190. CPU 975 passes instructions to signal processor 340 so that a message is played asking for entry of a PIN. If the user enters the proper PIN, processing continues and otherwise returns to wait for event operation 1601 after playing a message to inform the caller of the incorrect entry.

When the owner enters the correct PIN number, a menu of configuration options is played to the owner. The owner uses the DTMF interface to select the desired option and to select particular features for that option. For example, the caller can change the active call handler, record different messages, change the PIN, or configure a call handler.

If the code for a PCAM feature is entered, PCAM feature check operation transfers to implement feature operation 1606 which in turn performs the operations necessary to implement the feature. Implement feature operation 1606 returns processing to wait for event operation 1601. Examples of implementing PCAM features are described more completely below.

When on-hook check operation 1607 determines that the extension and the incoming call are both on-hook, e.g., by detecting a loop break signal and/or an extension on-hook signal, processing transfers to clear connections operation 1608. Operation 1608 clears all connections in switch matrix 350 and tone switch matrix 850 that were made to handle the incoming call and returns processing to wait for event 1101 to wait for another incoming call.

In operation 1600, a monitor telephone is not handled. Rather, operation 1700 handles events for a monitor telephone. Recall, as described above, when a monitor call handler is active, a monitor telephone can be either a local extension, or a remote telephone that can be reached by dialing over trunk line 110-2. As explained above, the monitor telephone is called and tone generator 756 is connected to the line.

Operation 1700 idles in wait for event operation 1701 until a message is placed on the message queue, and then wait for event operation 1701 transfers processing to monitor off-hook check operation 1702.

If the monitor telephone is reached over trunk line 110-2, call progress detector two circuit 850-2 detects a ring back signal, and notifies CPU 975. Thus, when CPU 975 fails to receive notice of a ring back signal, the remote monitor telephone has gone off-hook and check process 1702 transfers to start timer operation 1703.

If the monitor telephone is a local extension, when the telephone instrument goes off-hook, extension interface circuit 303-i sets a status bit which results in a message being sent to wait for event operation 1701. Consequently, in this embodiment, check operation 1702 transfers to start timer operation 1703.

Start timer operation 1703 starts a timeout counter. In this embodiment, the timeout counter is set to forty-five seconds. When the timer times out, a time-out message is placed on the message queue.

When the monitor phone is answered, the person hears the preprogrammed tone cadence that indicates a monitor call. To take the call, the person must press a preprogrammed key on the telephone keypad, e.g., the star key. As explained above, when a key is pressed, the tone is passed through switch matrix 350 and tone switch matrix 850 to DTMF decoder circuit 854-2. Circuit 854-2 decodes the resulting tone and notifies CPU 975 of the key press.

Consequently, a message is placed on the message queue indicating the key pressed on the monitor telephone instrument, and processing transfers from operation 1704 to take call check operation 1705. Take call check operation 1705 determines whether the message indicates that the monitor call is to be taken. If the call is to be taken, check operation 1705 transfers to disconnect tone generator operation 1708, and otherwise to timeout check operation 1706.

If the person answering the monitor telephone does not take the call within a predetermined timeout period, e.g., forty-five seconds, the timeout message is generated. If the message is not a timeout message, timeout check operation 1706 transfers to wait for event operation 1704. Conversely, if the message is for a timeout, processing transfers to clear monitor connect operation 1707.

Clear monitor connect operation 1707 clears all connections in switch matrix 350 and tone switch matrix 850 associated with the monitor telephone call. Operation 1707 terminates operation 1700.

As explained above, when the person answering the call enters the key sequence to take the call, processing transfers to disconnect tone generator operation 1708. In operation 1708, CPU 975 clears the connection in switch matrix 350 between tone generator output line 450 and the transmit line to the monitor telephone instrument. Processing transfers to make one-way connection operation 1709.

In make one-way connection operation 1709, CPU 975 makes a connection between trunk one receive line 410-1 and the transmit output line from switch matrix 350 to the monitor telephone instrument. Also, for security if the monitoring telephone instrument is remote, prior to making the one-way connection, PCAM 100 connects signal processor 340 to trunk line 110-2 and plays a message requesting entry of a PIN number. DTMF decoder circuit 854-2 decodes and transmits the PIN number to CPU 975. If the PIN number is correct, the one-way connection is then made. If the PIN number is incorrect, processing transfers to clear monitor connect operation 1707 to terminate the monitor connections.

All of these transactions take place without knowledge of the incoming caller. Further, the one-way connection allows the person answering the monitor telephone instrument to listen to the incoming call without the knowledge of the caller. Consequently, operation 1709 transfers to wait for event operation 1710.

At any point after entering the PIN, the PCAM owner may elect to either connect with the calling party or stop monitoring the call by hanging up the monitoring telephone instrument. Thus, when wait for event operation 1710 receives a message, connect to call check operation 1710 and monitor hang-up check operation 1711 read the message to determine whether the PCAM owner has entered a predetermined key sequence to take the call, or hung-up.

In this embodiment, to connect to the calling party the PCAM owner presses the one key on the monitoring telephone instrument. DTMF decoder circuit 854-2 receives the tone as described above and notifies CPU 975. When, in response to this message, wait for event operation 1710 transfers to connect to call check operation 1711, operation 1711, in turn, transfers to disconnect extension operation 1714.

In disconnect extension operation 1714, CPU 975 clears the connection of the switch matrix input line to trunk line one transmit line 411-1. This disconnects the transmission capability of the extension connected to the incoming caller. Disconnect extension operation 1714 transfers to connect to tone generator operation 1715.

In connect to tone generator operation 1715, CPU 975 connects tone generator output line 450 from call waiting tone generator 756 to trunk one transmit line 411-1 and either the local monitor extension transmit line or trunk two transmit line 411-2, depending on whether the monitor telephone instrument is local or remote, respectively. Connect to tone generator operation 1715 transfers to generate tone operation 1716.

In generate tone operation 1716, the duration of the tone is timed by CPU 975. The tone is left connected to both parties for 200 milliseconds and then processing transfers to remove tone generator operation 1717.

In remove tone generator operation 1717, CPU 975 clears the connections in switch matrix 350 to tone generator output line 450. Operation 1717 transfers to make two-way connection operation 1718.

In make two-way connection operation 1718, CPU 975 makes a complete two way connection between the monitor telephone instrument and the incoming call on trunk line 110-1. Specifically, the input line to switch matrix 350 from the monitor telephone instrument is connected to trunk one transmit line 411-1 to complete the two-way connection. Two-way connection operation 1718 transfers processing to wait for event operation 1601 in operation 1600 (FIG. 16).

Figure 18:
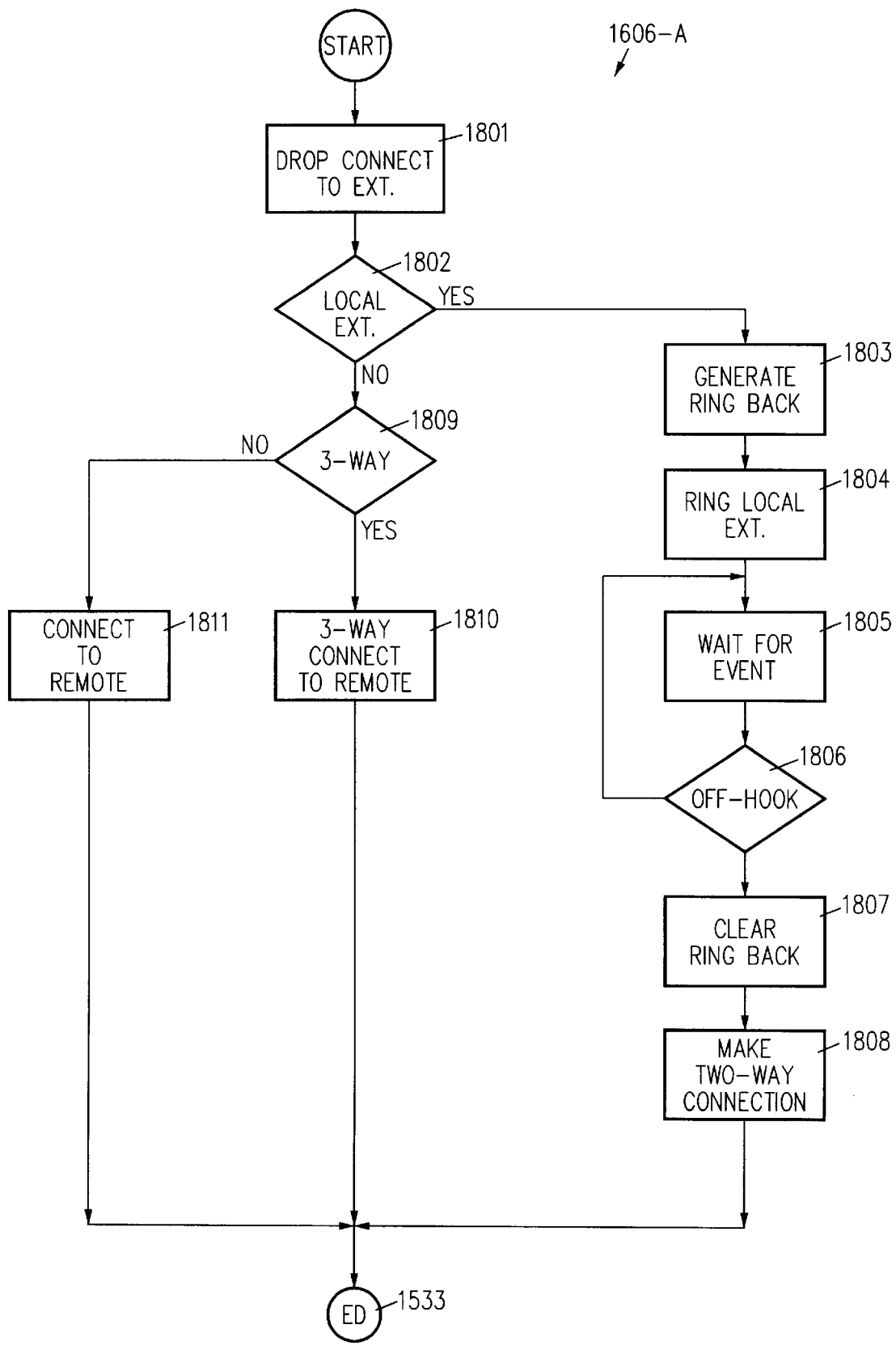
FIG. 18 is a process flow diagram for a transfer to voice mail during an on-going conversation used by the PCAM of this invention when a party enters a predetermined code for the transfer.

The previous description assumed that the PCAM owner decided to take the monitor call. However, if the PCAM owner only listens and then hangs-up, a loop break is detected if the monitor extension is remote and an on-hook signal is detected if the monitor extension is local. In either case, a message is placed on the message queue indicating the hang-up. Monitor hang-up check operation 1712 detects the hang-up message and transfers processing to clear monitor connections operation 1713. In clear monitor connections operation 1712, CPU 975 clears all the connections in switch matrix 350 and tone switch matrix 850 make for the monitor telephone call and terminates the monitor call handling operation 1700. FIG. 18 is a process flow diagram 1606-A for implementation of one PCAM feature, a transfer to voice mail during an on-going conversation. The owner of PCAM 100 has entered the predetermined code for a transfer to voice mail. PCAM feature check operation 1605 recognized the predetermined code and transferred to drop connection to extension operation 1801. Recall as described above, that each output line of switch matrix 350 (FIG. 4) can be connected to only a single input line. Thus, drop connection to extension operation 1801 clears the connection in switch matrix 350 (FIG. 4) between the switch matrix input line driven by the user's telephone instrument, and trunk one transmit output line 411-1 to allow a two-way connection to be made with voice mail.

However, the connection in switch matrix 350 between the switch matrix input line driven by the user's telephone instrument and DTMF two output line 441-2 to DTMF decoder circuit 854-2 is maintained so that the user can subsequently make another transfer or implement another PCAM feature. Also, the connection between trunk one receive line 410-1 and the switch matrix output line to the user's telephone instrument is maintained so that the user can monitor the message being left. Operation 1801 transfers to local extension check operation 1802.

In local extension check operation 1802, CPU 975 determines whether the active call handler specifies a local extension for voice mail, or a remote extension. If a local extension is specified, check operation 1802 transfers to generate ring back operation 1803 and otherwise to three-way call enabled check operation 1809.

Generate ring back operation 1803 is the same as operation 1308 described above, and that description is incorporated herein by reference. Generate ring back operation 1803 transfers to ring local extension operation 1804. Ring local extension operation 1804 is the same as operation 1112 described above, and that description is incorporated herein by reference. Thus, ring local extension operation 1804 rings answering machine 131 on extension 141-1 and transfers to wait for event operation 1805.

Operation 1606-A idles in wait for event operation 1805 until telephone answering machine 131 on local extension 141-1 answers the call, which in turn results in an extension off-hook message being generated, as explained above. When off-hook check operation 1806 receives that message, processing transfers to clear ring back operation 1807.

Clear ring back operation 1807 is the same as operation 1311 described above and that description is incorporated herein by reference. Clear ring back operation 1807 transfers processing to make two-way connection operation 1808.

In make two-way connection operation 1808, CPU 975 configures switch matrix 350 (FIG. 4) so that trunk one receive line 410-1 is connected to extension one transmit line 421-1 and trunk one transmit line 411-1 is connected to extension one receive line 420-1. Thus, a two-way connection is made between the call on trunk line 110-1 and telephone answering machine 131. Two-way connection operation 1808 returns through node 1532 to wait for event operation 1601.

The previous discussion assumed that the active call handler identified a local extension for voice mail. However, if a remote extension was identified, check operation 1802 transferred to three-way call enabled check 1809.

If the active call handler indicates that three-way calling is enabled for trunk line 110-1, check operation 1809 transfers to three-way connect to remote operation 1810. Operation 1810 includes operations 1316 to 1321 as described above for three-way connect to remote operation 1360. The only difference in the two operations is the entry and exit points. As described above, if the voice mail telephone number is the same as the primary telephone number, the caller is routed directly into CO voice mail 51 without waiting three or four rings. In one embodiment, when the owner transfers the call to voice mail, the owner is disconnected from the caller and the connections to the owner are cleared. In another embodiment, operation 1810 returns through node 1532 to wait for event operation 1601. In this embodiment, the owner of PCAM 100 retains control over subsequent call routing, and can listen to the message being left.

If three-way calling is not enabled, check operation 1809 transfers to connect to remote operation 1811. Note that a basic assumption here is that the user is not on second trunk line 110-2. Connect to remote operation 1811 includes operations 1401 to 1406, 1408, and 1411. In operation 1811, operations 1401 to 1406 progress as shown in FIG. 14. However, operation 1405 transfers directly to operation 1408 if the voice mail telephone number is not busy, and operation 1408 transfers directly to operation 1411. Therefore, the above description of these operations is incorporated herein by reference. In this embodiment, operation 1811 also transfers through node 1532 to wait for event operation 1601. In the other embodiment, the owner is disconnected from the caller upon indicating the transfer to voice mail.

Figure 19:
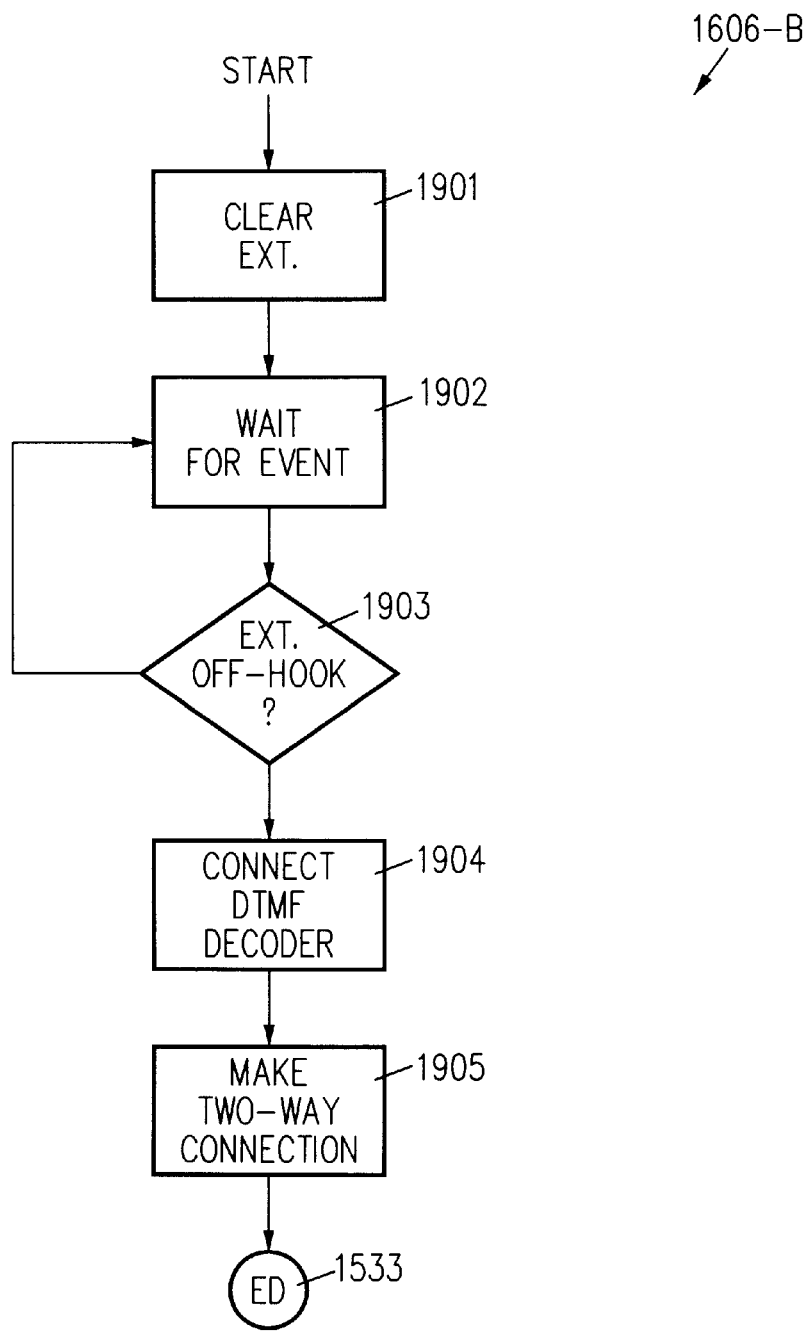
FIG. 19 is a process flow diagram for a hold and transfer to a local extension during an on-going conversation used by the PCAM of this invention when a party enters a predetermined code for the PCAM feature.
Figure 20:
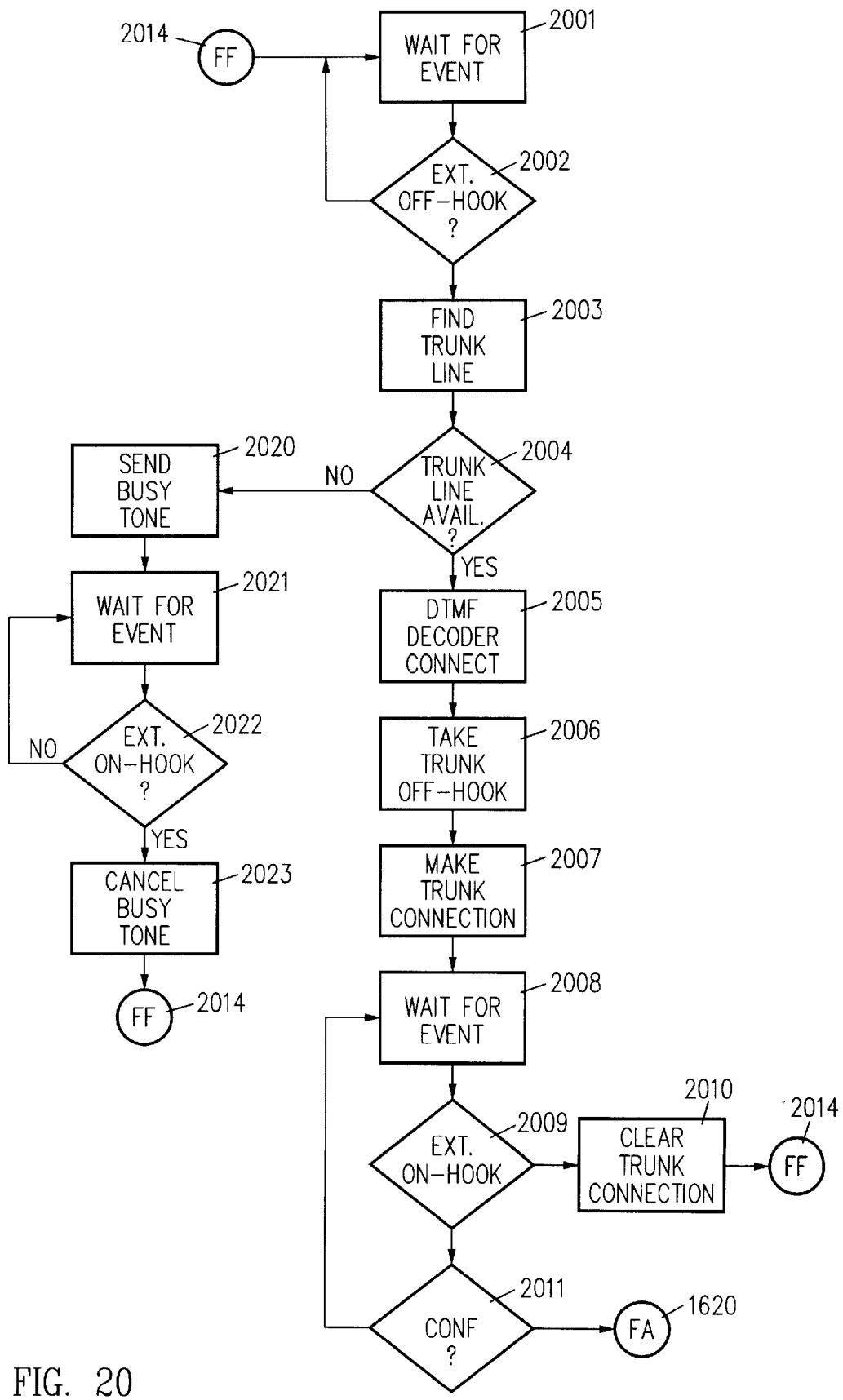
FIG. 20 is a process flow diagram of one embodiment of an initial call routing operation used by the PCAM of this invention to handle a local extension initiated telephone call.

FIG. 19 is a process flow-diagram 1606-B for implementation of another PCAM feature, a hold and transfer to a local extension during an on-going conversation. This feature is used, for example, when the owner has taken a call on a remote extension, e.g., a fixed cellular telephone 180 in the owner's car. The owner has arrived at user's premises 190 and wants to take the call on a local extension on premises 190. Consequently, the owner enters the hold and transfer code and hangs-up cellular telephone 180. Normally, this would terminate the call. However, PCAM 100 retains control as described below.

When the owner of PCAM 100 entered the preprogrammed code for the hold and transfer to a local extension, PCAM feature check operation 1605 recognized the preprogrammed code and transferred to clear trunk operation 1901. Since PCAM controller 310 knows the trunk line on which the preprogrammed code was entered, PCAM controller 310 clears all connections in switch matrix 350 and tone switch matrix 850 to and from that trunk line when a loop break message is received.

Clear trunk operation 1901 transfers to wait for event operation 1902. PCAM 100 remains idles in wait for event operation 1902. When the user goes into premises 190 and takes a local extension 141-i off-hook, an extension off-hook message is generated as previously described. Thus, extension off-hook check operation 1903, in response to that message, transfers processing to connect DTMF decoder operation 1904.

Connect DTMF decoder operation 1904 connects DTMF decoder circuit 854-2 through switch matrix 350 and tone switch matrix 850 to the extension that went off-hook, as previously described. Connect DTMF decoder operation 1904 transfers to make two-way connection operation 1905.

Make two-way connection operation establishes a two-way connection between the local extension and trunk line 110-1 so that the call can proceed. Thus, the owner was able to transfer the call without requiring either party to initiate another call.

In view of the PCAM features described above, the operations necessary to route the call to any desired extension will be apparent to those skilled in the art. Thus, the PCAM features described above are only illustrative of the principles of this invention and are not intended to limit the invention to the specific PCAM features described. As explained above, other PCAM features include the ability to make multiple transfers of a call and to route a call to a remote extension including central office voice mail at any time during a call. In these cases, personal call manager 100 detects entry of the predetermined code for transfer to a particular extension, and then performs the operations necessary to make the connections and to generate the signals required to route the call to that extension, either local or remote.

The above discussion assumed that the initiator for processing by PCAM 100 was an incoming call. However, another initiator is one of the local extensions going off-hook. Again, initially, CPU 975 is in an idle state, i.e., in wait for event operation 2001.

When an event has occurred, e.g., one of the bits in status registers 910 changed state, CPU 975 sends a message to a process that is waiting for an event to occur. As explained above, the message is sent using a standard in memory message queue that is in RAM 908.

In this embodiment, when a message is received, CPU 975 transfers processing to off-hook check operation 2002, which determines if the message is an extension off-hook message. If the message is not an extension off-hook message, check 2002 returns to wait for event operation 2001.

Extension interface monitor and control circuit 620 (FIG. 6) generates a signal, in response to an off-hook signal on line 121-i, that changes the off-hook status bit for extension 141-i to indicate that the extension is off-hook. When CPU 975 determines that an extension has gone off-hook, a message is sent indicating that extension 141-i is off-hook to operation 2001 that is waiting for an event to occur. When operation 2002 receives that message, processing transfers to a find trunk line operation 2003.

Find trunk line operation 2003 determines which of trunk lines 110-1 and 110-2 should be connected with the extension that went off-hook. In this embodiment, the trunk line used by a particular extension is fixed by the active call handler. In this example, trunk line 110-1 is taken as primary trunk line 110-1. Hence, find trunk line operation 2003 returns an identifier for primary trunk line 110-1 and processing is transferred to trunk line available check 2004.

In trunk line available check 2004, CPU 975 determines whether the trunk line specified by the identifier from operation 2003 is busy. Specifically, the status, i.e., the states, of trunk lines 110-1 and 110-2, is stored in static RAM 907. In this embodiment, the possible states of trunk line 110-1 are available and busy. If trunk line 110-1 is available, CPU 975 transfers processing to DTMF decoder-connect operation 2005 and otherwise to send busy tone operation 2020.

Figure 7:
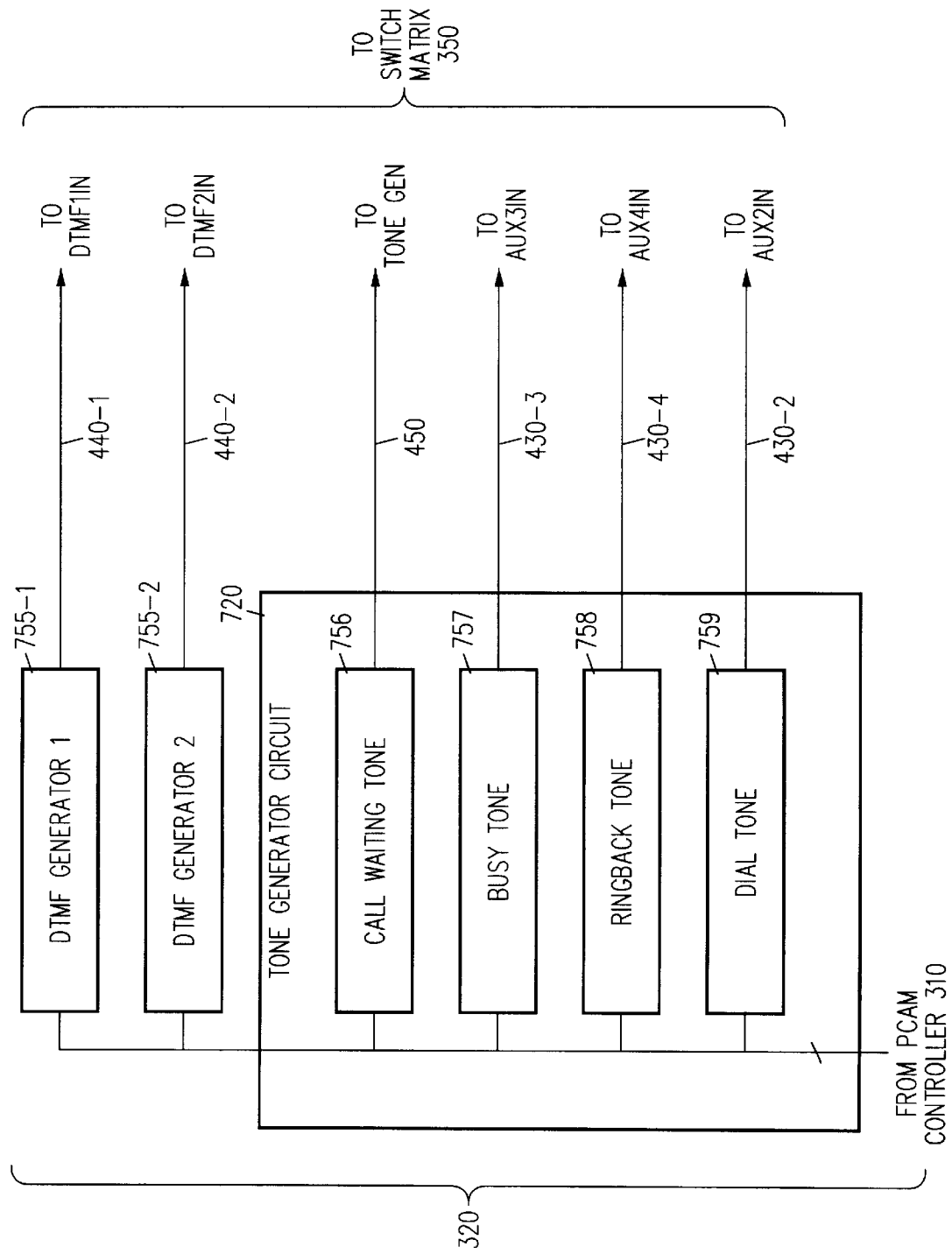
FIG. 7 is a more detailed diagram of the tone generator and Dual-Tone-Multi-Frequency (DTMF) generator subsystem of FIG. 3.

Assuming trunk line 110-1 is busy, and processing transfers to send busy tone operation 2020, CPU 975 (FIG. 9) configures switch matrix 350 (FIG. 4) so that the third auxiliary input line 430-3 is connected to extension receive line 420-i, where i is the extension that generated the off-hook signal. CPU 975 also writes to control registers 911 to enable busy tone generator circuit 757 (FIG. 7), which in turn generates a busy tone on third auxiliary line 430-3 that is transferred through switch matrix 350 to line 420-i. Upon completion of send busy tone operation 2020, CPU 975 (FIG. 9) transfers processing to a wait for event operation 2021.

When the user discontinues use of extension 141-i, extension interface monitor and control circuit 620 configures a bit in status registers 910 to indicate that extension 141-i is on-hook. Consequently, when a process reads the status registers and determines that extension 141-i is on-hook, a message is sent indicating that extension 141-i is on-hook.

In response to the message, waiting for an event to occur operation 2021 transfers to extension on-hook check operation 2022. When extension on-hook check operation 2022 detects the message that extension 141-i is on-hook, processing transfers to cancel busy tone operation 2023.

In cancel busy tone operation 2023, CPU 975 breaks the connection between extension receive line 420-i and third auxiliary line 430-3 and resets the control bit for busy tone generator circuit 757 in control registers 911. CPU 975 transfers from cancel busy tone operation to wait for event operation 2001.

Figure 8:
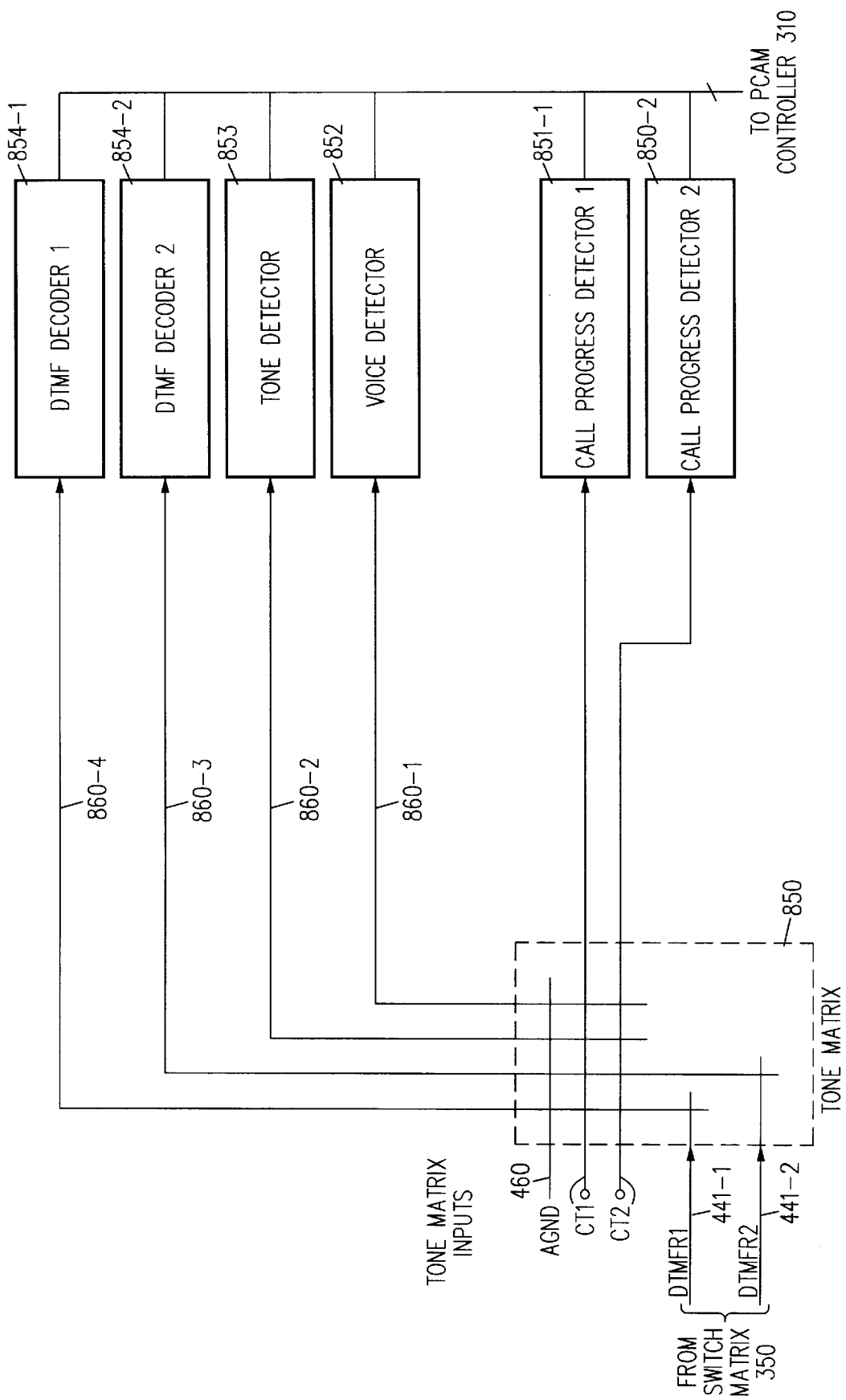
FIG. 8 is a more detailed diagram of the call handling detector subsystem of FIG. 3.

Returning to trunk available check operation 2004, if trunk line 110-1 is not busy, processing transfers to DTMF decoder connect operation 2005. In decoder connect operation 2005, CPU 975 configures switch matrix 350 (FIG. 4) to connect extension receive line 420-i with DTMF one output line 441-1. CPU 975 also configures tone switch matrix 850 (FIG. 8) so that DTMF output line 441-1 is connected to DTMF decoder circuit 854-1. Thus, CPU 975 configures PCAM 100 so that extension 141-i is connected to DTMF decoder circuit 854-1. Consequently, PCAM 100 can detect any DTMF tones entered by the user from extension 141-i. Upon completion of the connection to DTMF decoder circuit 854-1, CPU 975 transfers processing to take trunk off-hook operation 2006.

In take trunk off-hook operation 2006, CPU 975 writes to the bit in control registers 911 to configure trunk interface control circuit 520 (FIG. 5) so that an off-hook signal is generated on trunk line 110-1 in trunk interface circuit 301-1. CPU 975 transfers from take trunk off-hook operation 2006 to make trunk connection operation 2007.

In make trunk connection operation 2007, a two-way connection is made in switch matrix 350 between trunk line 110-i and extension 141-i. In general, all twoway telephone calls require two connections in switch matrix 350. Specifically, CPU 975 connects extension receive line 420-i to trunk one transmits line 411-1 so that CO 50 can hear DTMF tones entered by the user, and trunk one receive line 410-1 to extension transmit line 421-i so that the user can hear the dial tone from CO 50. Upon making the two-way connection through switch matrix 350, CPU 975 transfers from make trunk connection operation 2007 to wait for event operation 2008.

At this point two events are of interest, the local extension hangsup or the PCAM owner enters the predetermined code to enter the configuration mode. When an event occurs and a message is placed on the message queue, wait for event operation 2008 transfers to extension on-hook check operation 2009.

When the local extension is hung-up, extension interface subsystem 303-i detects the on-hook condition, and an on-hook message is generated and placed on the message queue. When extension on-hook check operation 2009 reads that message, processing transfers to clear trunk connection operation 2010.

In clear trunk connection operation 2010, PCAM controller 310 clears all the connections in switch matrix 350 and tone switch matrix 850 that were made between the local extension and trunk line 110-i. Clear trunk connection operation transfers to wait for event operation 2001.

However, if the message is not an extension on-hook message, extension on-hook check operation 2009 transfers processing to configuration check operation 2011. The operation for detecting the PCAM configuration code, i.e, the entry of the predetermined key sequence, was described above and that description is incorporated herein by reference. Thus, if the user does not dial a telephone, but instead dials the PCAM configuration code, e.g., presses the star key twice, configuration check 2011 transfers through node 1620 to clear connection operation 1603 (FIG. 16). Clear connection operation 1603 continues as described above and that description is incorporated herein by reference. Thus, the user can proceed to transfer a call and perform similar operations to those that were described above for an incoming call to user's premises 190.

Figure 21A:
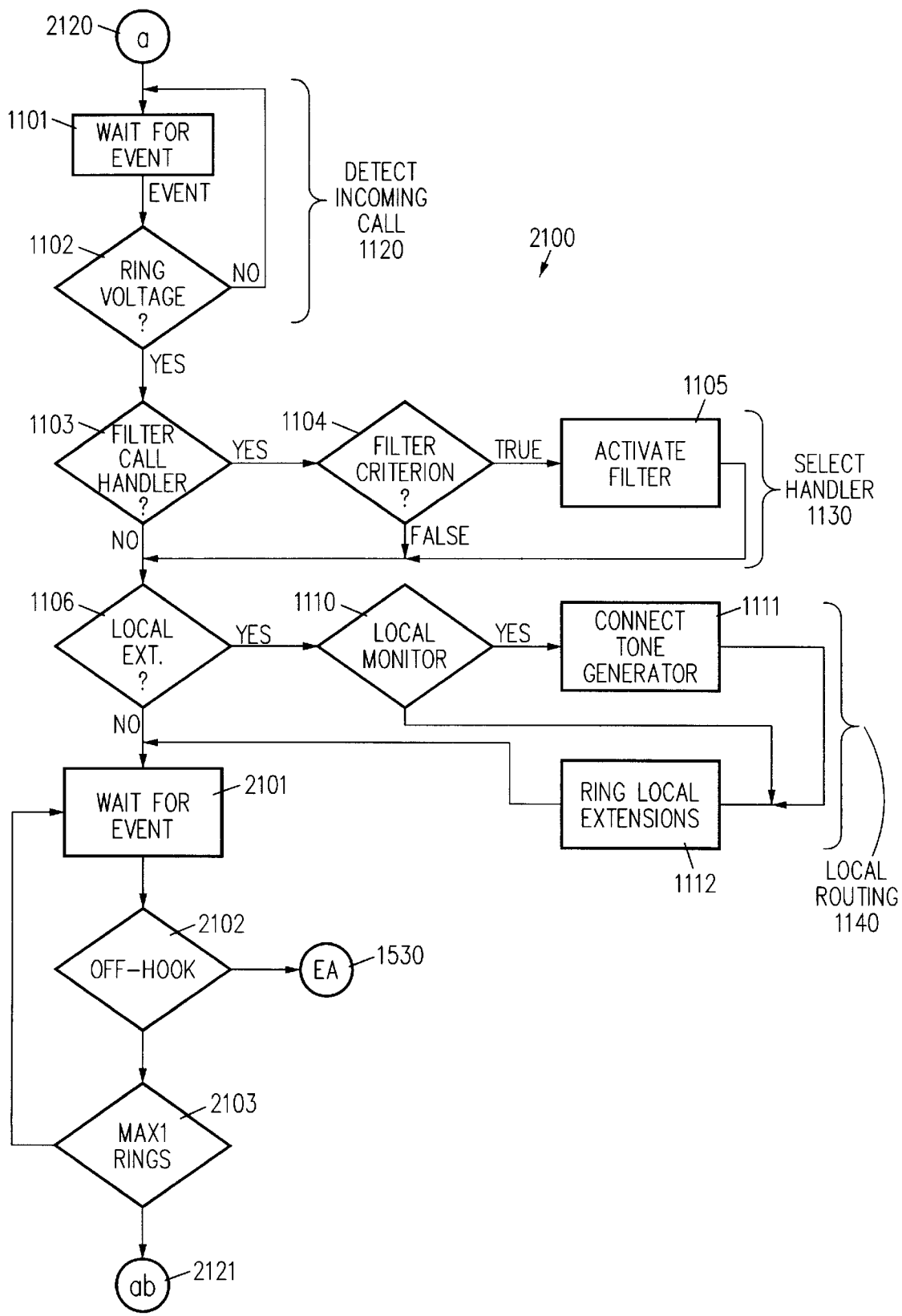
FIGS. 21A and 21B are a process flow diagram of a second embodiment of an initial call routing operation used by the PCAM of this invention to handle incoming telephone calls.
Figure 21B:
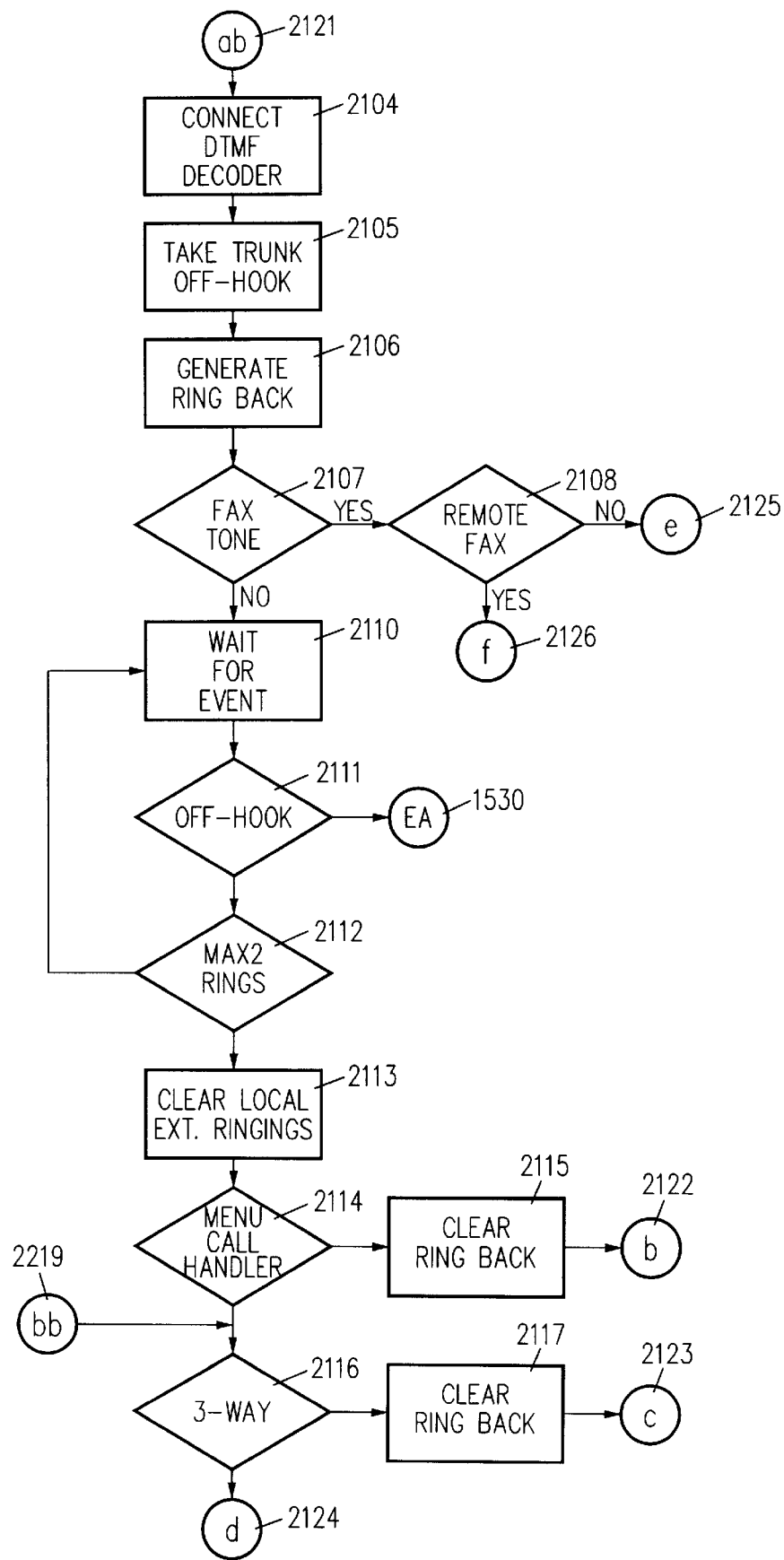

In the above embodiment, parallel ringing was established for remote and local extensions. In another embodiment, local extensions are rung a predetermined number of times, i.e., the maximum extension ring count which can be equal to the maximum answer ring count, and then alternate routing options specified by the active call handler are implemented. FIG. 21 illustrates another embodiment of an initial call routing operation 2100 used by PCAM 100 to handle incoming telephone calls. In this embodiment, PCAM controller 310 programs switch matrix 350 to connect trunk one receive line 410-1 to auxiliary three transmit line 431-3 and consequently to caller ID circuit 330 and to DTMF output line 441-1. PCAM controller 310 also programs tone switch matrix 850 to connect tone detector 853 to DTMF output line 441-1 so that tone detector 853 can detect a fax tone on trunk line 110-1.

Operations 1101 to 1112 are the same as described above with respect to FIG. 11 and that description is incorporated herein by reference. However, in this embodiment, operations 1106 and 1112 transfer processing to wait for event operation 2101. When a message is placed on the message queue, wait for event operation 2101 transfers to off-hook check operation 2102.

Off-hook check operation 2102 functions similar to operation 1202 for local extensions as described above. If a local extension goes off-hook, operation 2102 transfers through node 1530 to call answer operation 1500. In this embodiment, call answer operation 1500, and in-progress call handling operation 1600 are used. However, those skilled in the art will appreciate that some operations within those operations may be unnecessary and so could be removed without affecting the performance of the invention. In addition, in this embodiment, operations 1500 and 1600 return to node 2120 rather than node 1114 as shown in FIGS. 15 and 16.

If a local extension is not off-hook, processing transfers from off-hook check operation to MAX1 ring count check operation 2103. MAX1 ring count check operation 2103 functions the same as operation 1305 described above and that description is incorporated herein by reference. Briefly, operation 2103 determines whether the local extensions have been rung the number of times specified by the maximum answer ring count. In this embodiment, the maximum answer ring count is selected as described above if CO voice mail 51 is used by the active call handler. In any case, a typical selection for maximum answer ring count is two. If the ring count is less than the maximum answer ring count, operation 2103 transfers to wait for event operation 2101 and otherwise to DTMF decoder connect operation 2104.

DTMF decoder connect operation 2104, take trunk off-hook operation 2105, and generate ring back signal operation 2106 are the same as DTMF decoder connect operation 1204, take trunk off-hook operation 1206, and generate ring back signal operation 1217, respectively, and the description of each of the three operations is incorporated herein by reference. Generate ring back signal operation 2106 transfers to fax tone check operation 2107.

If the incoming call on trunk line 110-1 is a facsimile transfer, tone detector circuit 853 detects the fax tone and notifies CPU 975 by configuring an appropriate bit in status registers 910. If a fax tone is detected, fax tone check operation 2107 transfers to remote fax check operation 2108 and otherwise to wait for event operation 2110.

Remote fax check operation 2108 determines whether the active call handler specifies a local extension or a remote extension for facsimile transfers. If a local extension is specified, processing transfers from remote fax check operation 2108 to connect to local fax operation 2500 (FIG. 25) through node 2125. Conversely, if a remote extension is specified, remote fax check operation 2108 transfers to connect to remote fax operation 2600 (FIG. 26) through node 2126.

Returning to wait for event operation 2110, processing idles in operation 2110 until a message is added to the message queue and then transfers to off-hook check operation 2111. Operation 2111 is the same as operation 2102 above and that description is incorporated herein by reference. If the message is an off-hook message, processing transfers through node 1530 to call answer operation 1500 (FIG. 15) and otherwise to MAX2 rings check operation 2112.

When the total number of rings equals the largest of the maximum extension ring count and the maximum answer ring count, processing transfers from MAX2 rings check operation 2112 to clear local extension ringing operation 2113, and otherwise back to wait for event operation 2110.

When processing transfers to clear local extension ringing operation 2113, PCAM 100 had rung the local extensions the maximum number of times specified in the active call handler, and the incoming call has not been answered at any of the local extensions. Consequently, PCAM controller 310 clears the ring signal to the local extensions in operation 2113, and initiates any call handling, or call routing selections specified in the active call handler. Specifically, PCAM 100 can present a menu of options to the caller, or route the call to a remote extension including CO voice mail 51.

Thus, clear local extension ringing operation 2113 transfers to menu call handler check operation 2114. Menu call handler check operation 2114 determines whether the active call handler is a menu call handler. If the active call handler is a menu call handler, processing transfers from check operation 2114 to clear ring back operation 2117. Clear ring back operation 2115 performs the same function as clear ring back operation 1311, that was described above. Clear ring back operation 2115 transfers processing to menu call transfer operation 2200 (FIG. 22) through node 2122.

Conversely, if the active call handler is not a menu call handler, processing transfers from check operation 2114 to three-way call enabled check 2116. Three-way call enabled check 2116 examines the information in the active call handler to determine whether three-way calling is available on the trunk line receiving the incoming call. If three-way calling enabled check 2116 is true, processing transfers to clear ring back operation 2117, that functions the same as operation 2115, and in turn to make three-way call connection operation 2300 (FIG. 23) that is described more completely below.

However, if three-way calling is not enabled and remote calling is enabled, this means that a second trunk line is connected to PCAM 100. Therefore, three-way calling enabled check 2116 transfers to make remote connection operation 2450 through node 2124.

Figure 22:
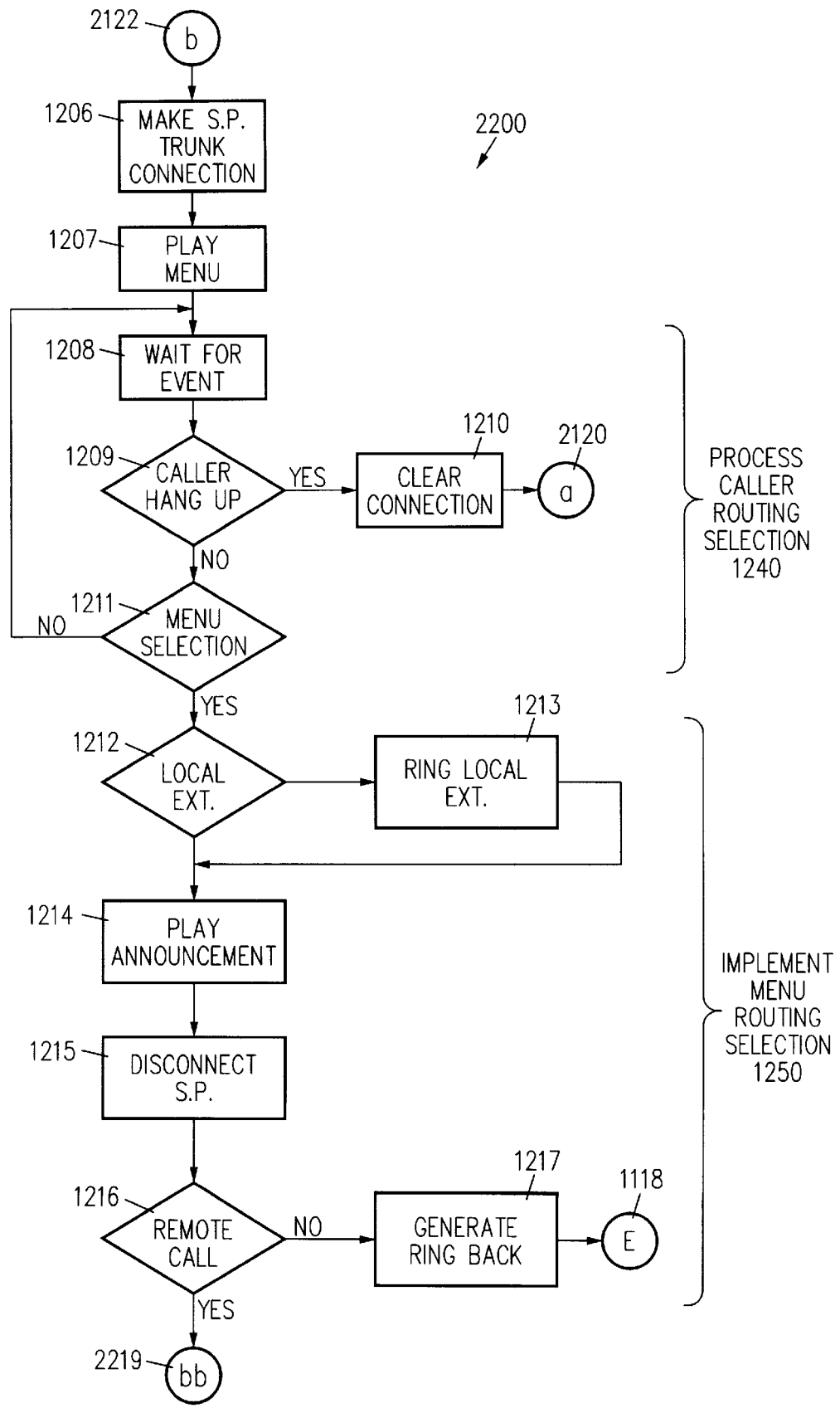
FIG. 22 is a process flow diagram for a second menu call transfer operation used by the PCAM of this invention for a menu call handler.

Menu call transfer operation 2200 is illustrated in FIG. 22. Menu call transfer operation 2200 includes operations 1206 to 1217 in the same sequence as described above with respect to FIG. 12. Consequently, the description of the functions performed by operations 1206 to 1217 is not repeated for operation 2200. Rather, the above description of these operations is incorporated herein by reference. The only changes are the various nodes through which processing transfers. Specifically, clear connection operations 1210 (FIG. 22) transfers through node 2120, and remote call check operation 1216, when true, transfers through node 2219.

Figure 23:
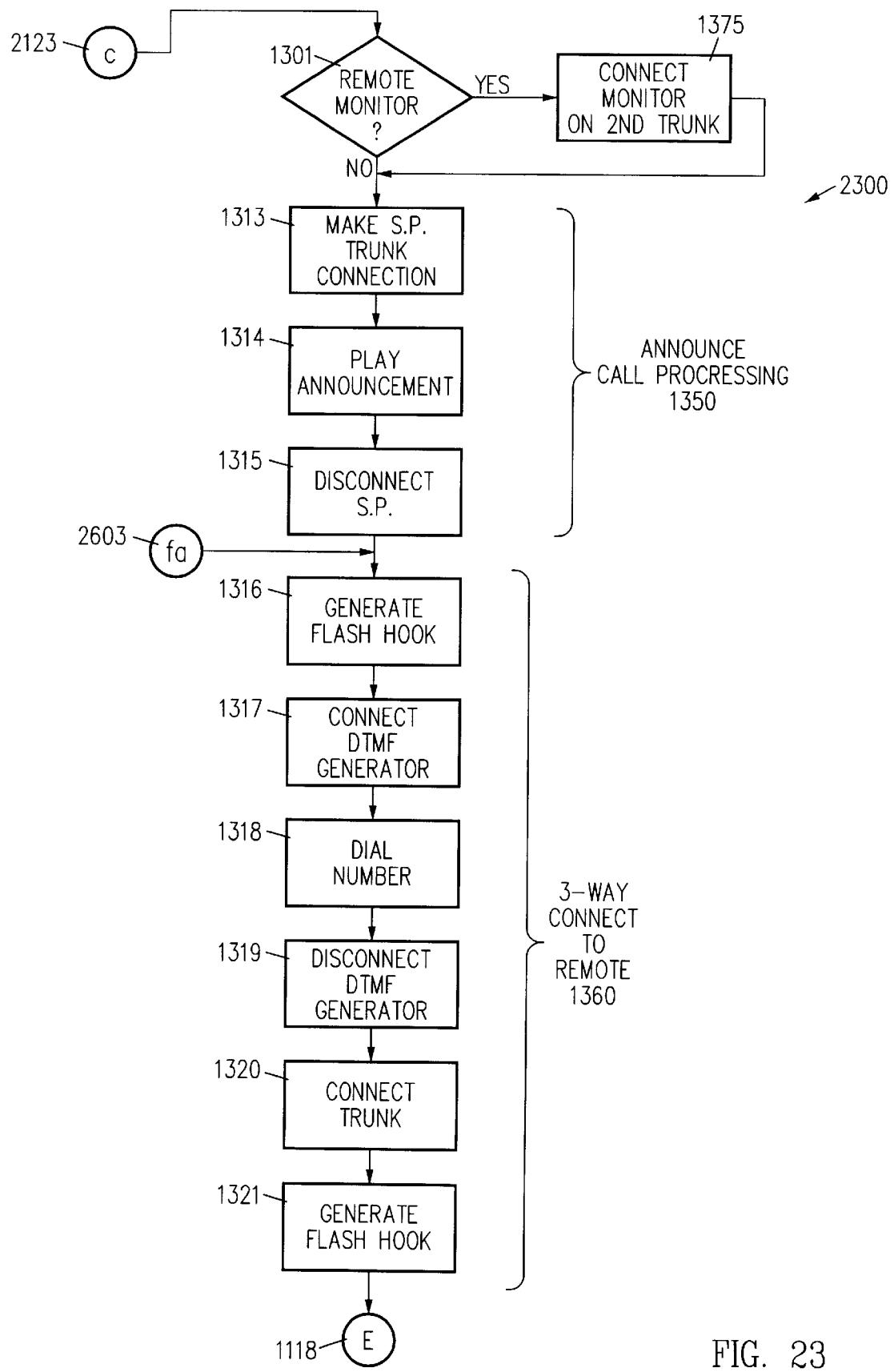
FIG. 23 is a process flow diagram for a second embodiment of a make three-way call connection operation used by the PCAM of this invention to implement a three-way call.

Make three-way connection operation 2300 is illustrated in FIG. 23. Make three-way connection operation 2300 includes operations 1301, 1375, and 1313 to 1321 in the same sequence as described above with respect to FIG. 13. Consequently, the description of the functions performed by operations 1301, 1375, and 1313 to 1321 is not repeated for operation 2300. Rather, the above description of these operations is incorporated herein by reference. Notice that in this embodiment, operations 1301 and 1375 transfer processing to operation 1313.

Figure 24:
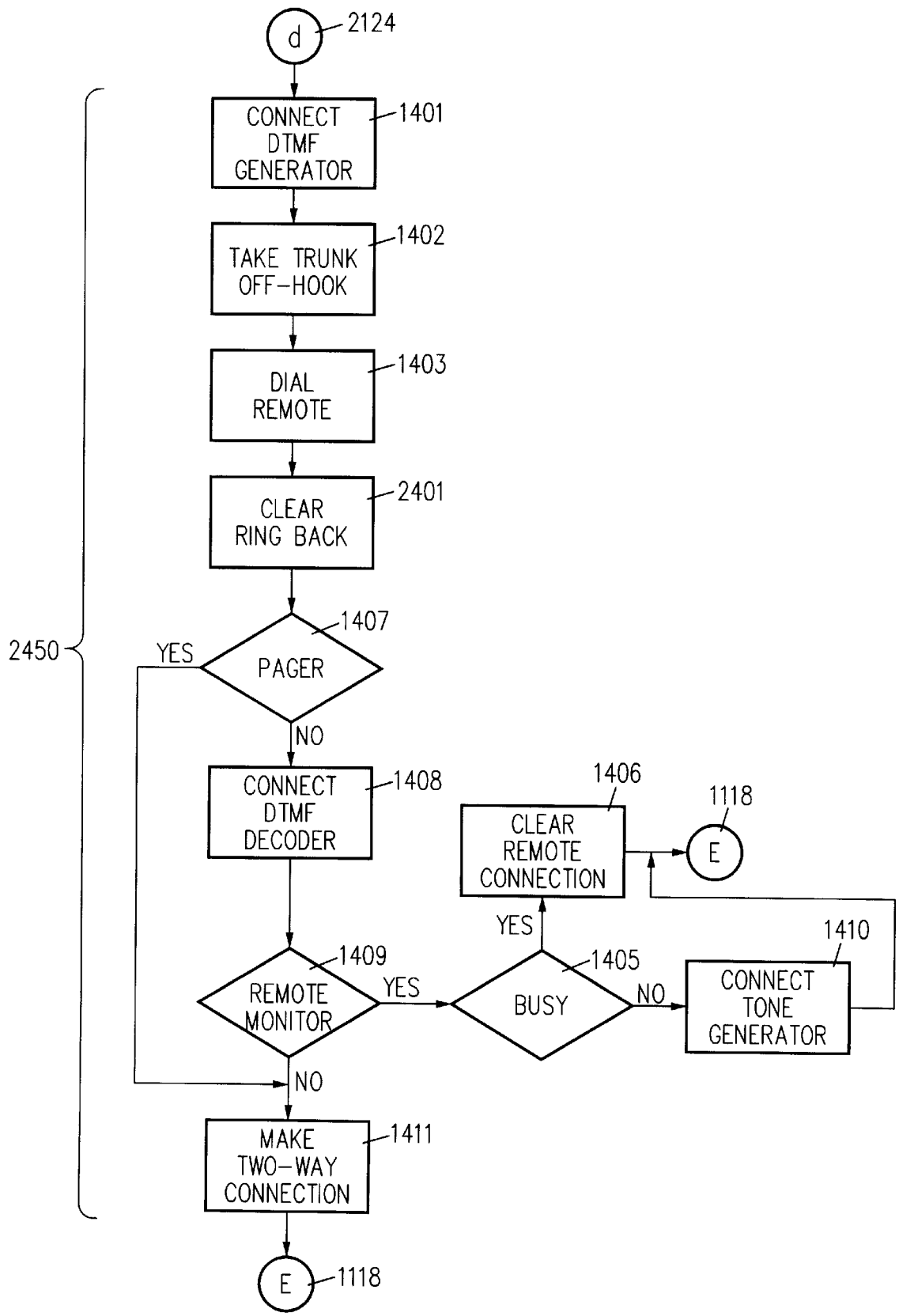
FIG. 24 is a process flow diagram for a make remote connection operation used by the PCAM of this invention to implement a call on a second telephone trunk line.
Figure 25:
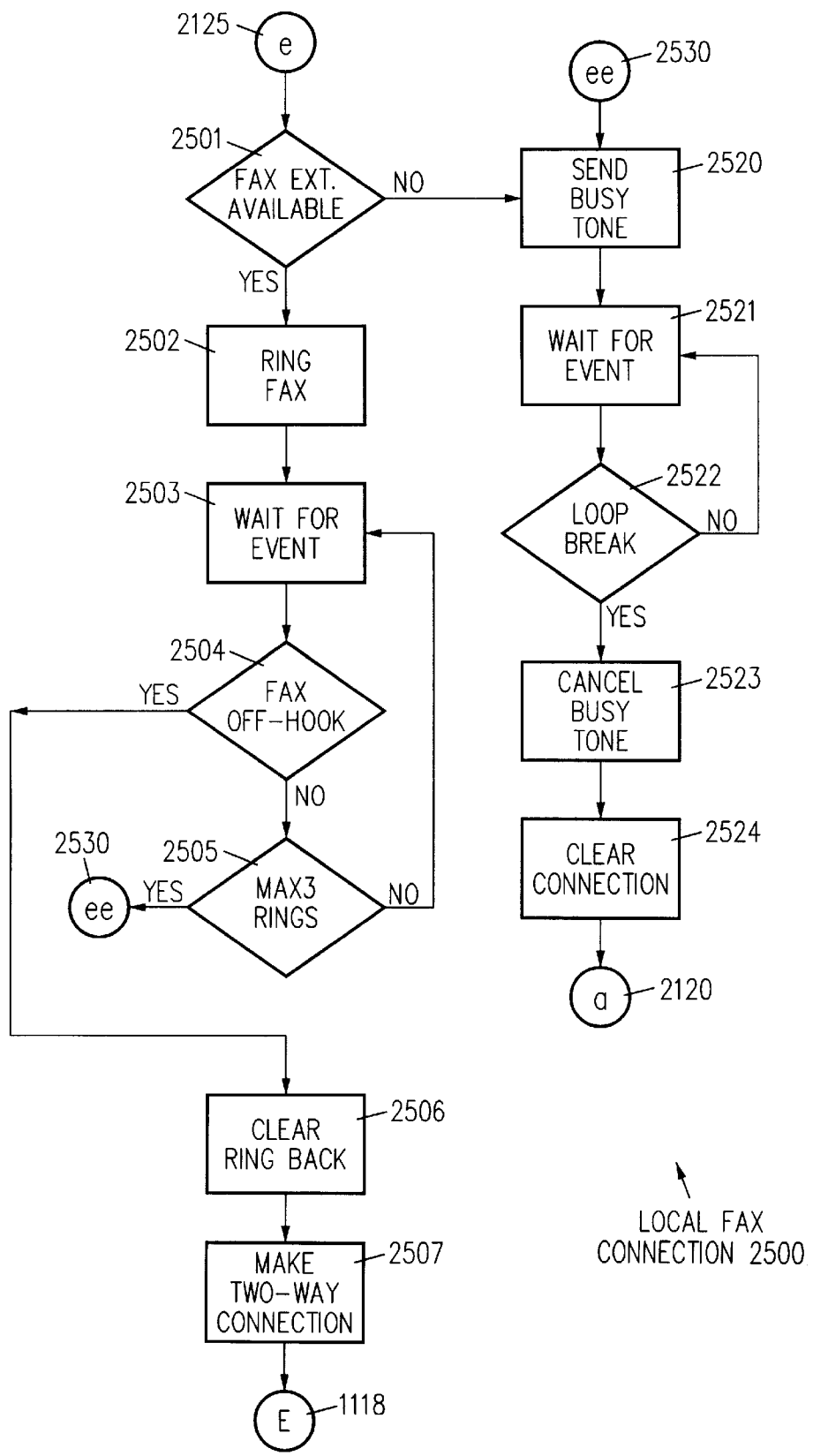
FIG. 25 is a process flow diagram for a connect to local fax operation used by the PCAM of this invention.

Make remote connection operation 2450 is illustrated in FIG. 24. Make remote connection operation 2450 includes operations 1401 to 1403, and 1404 to 1411 that are the same operations as described above with respect to FIG. 14. Consequently, the description of the functions performed by operations 1401 to 1403, and 1404 to 1411 is not repeated for operation 2450. Rather, the above description of these operations is incorporated herein by reference.

In this embodiment, dial remote operation 1403 transfers to clear ring back operation 2401, that functions the same as the clear ring back operations described previously. Clear ring back operation 2401 transfers to pager check operation 1407.

When remote monitor check operation 1409 (FIG. 24) is true, processing transfers to busy check operation 1405. As indicated above, busy check operation 1405 receives a message from a wait for event operation that is not illustrated for convenience in FIG. 24. Notice that in this embodiment, the second trunk line is assumed to be available unless a monitor call is being made on the second trunk line. If this assumption leads to conflicts, the busy check could also be implemented as shown in FIG. 14 for operation 2400.

If busy check operation 1405 is true, processing transfers to clear remote connection operation 1406 and otherwise to connect tone generator operation 1410. In this embodiment, the subsequent handling of the remote monitor call by PCAM 100 is similar to the operation illustrated in FIG. 17.

As indicated above, remote fax check operation 2108 transfers to connect to local fax operation 2500 (FIG. 25.) when the active call handler specifies routing fax transmissions to a local extension. In operation 2500, PCAM controller 310 first checks in operation 2501 whether extension 141-3 that is connected to facsimile machine 133 is busy. If extension 141-3 is busy processing transfers to send busy tone operation 2520 and otherwise to ring fax extension operation 2502.

Busy tone operation 2520, wait for event operation 2521, loop break operation 2522, and cancel busy tone operation 2523 are similar to operations 2020 to 2023, respectively, that were described above, and that description is incorporated herein by reference. However, loop break check operation checks for a loop break in place of an on-hook condition as described for check 2022.

Cancel busy tone operation 2523 transfers processing to clear connections operation 2524. As described previously for other clear connections operations, CPU 975 clears all the connections in switch matrix 350 that were made for the incoming call and clears any signals to detectors or tone generators so that PCAM 100 is ready to take the next incoming call. Clear connection operations 2524 transfers to wait for event operation 2101 (FIG. 21A) through node 2120.

If the local extension is available, fax extension available check operation 2501 transfers to ring fax extension operation 2502. Operation 2502 performs the same operation as described previously for ring local extension operation 1112 for extension 141-3, in this embodiment. Operation 2503 transfers to wait for event operation 2503.

At this time two events are of interest-facsimile machine 133 goes off-hook, or the number of rings to facsimile machine 133 is equal to a maximum extension ring count that is specified in the active call handler. Wait for event operation 2503 counts the number of times that facsimile machine 133 is rung. As explained above, the extension interface circuit detects when the telephone instrument goes off-hook and configures a bit in control registers 911 to indicate the off-hook condition. A process executing on CPU 975 detects the change in configuration of control registers 911 and places an off-hook message on the message queue.

When a message is added to the message queue and processing transfers from operation 2503 to fax off-hook check operation 2504. If the message is an off-hook message for facsimile machine 135 processing transfers to clear ring back operation 2506, and otherwise to MAX3 rings check operation 2505.

MAX3 rings check operation 2505 determines whether the ring count is equal to the maximum extension ring count. If the ring count is equal to the maximum extension ring count, operation 2505 transfers to send busy tone operation 2520 and otherwise to wait for event operation 2503.

Clear ring back operation 2506 removes the ring back signal from trunk line 110-1 and transfers to make two-way connection operation 2507. In make two-way connection operation 2507, CPU 975 configures switch matrix 375 so that a two-way connection is established between extension 141-3 and trunk line 110-1. In view of the above descriptions of making two-way connections, the particular connections made within switch matrix 350 will be apparent to one of skill in the art. Operation 2507 transfers to call answer operation 1500 that is modified in this embodiment as described above.

Figure 26:
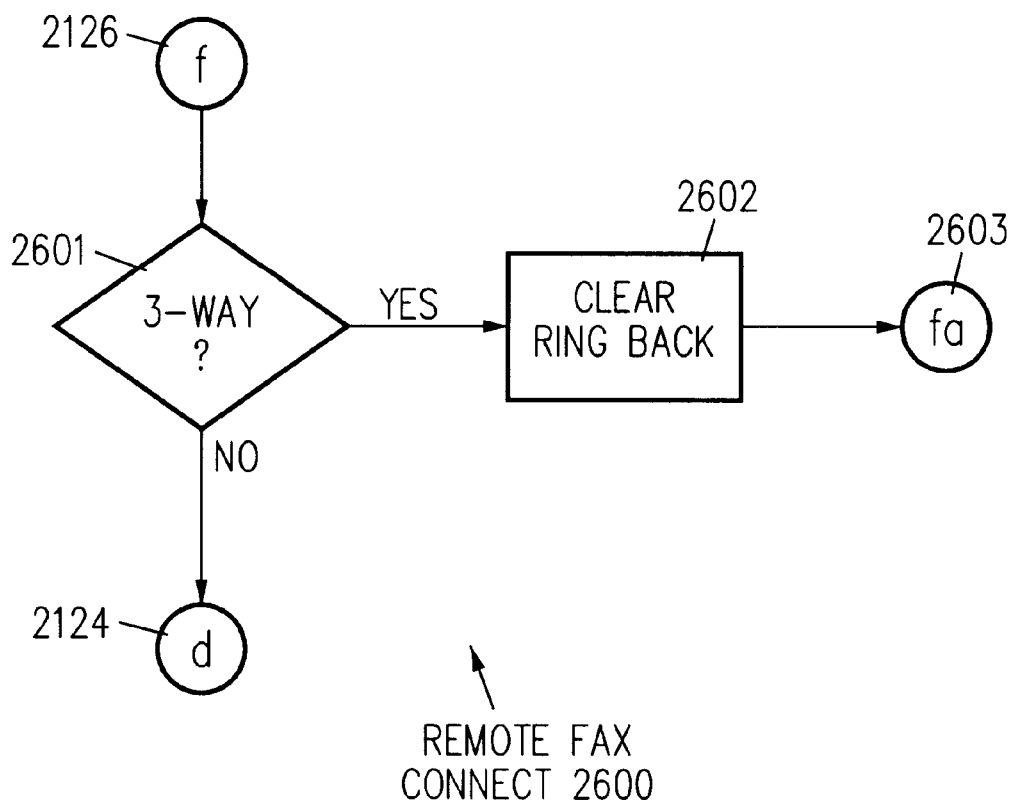
FIG. 26 is a process flow diagram for a connect to remote fax operation used by the PCAM of this invention.

If a remote fax is specified in the active call handler, remote fax check operation 2108 (FIG. 21) transferred to connect to remote fax operation 2600 (FIG. 26). In remote fax operation 2600, three-way call enabled check operation 2601 functions the same as three-way call enabled check operation 1109 (FIG. 11) described above. If three-way calling is enabled, processing transfers from operation 2601 to clear ring back operation 2602 and otherwise to make remote connection operation 2450. As explained above, operation 2450 dials the remote connection and makes a two way connection between the incoming call and the remote extension.

Clear ring back operation 2602 clears the ring back signal to trunk line 110-1 and transfers into make three-way call connection operation 2300 through node 2603. Thus, in this embodiment, the incoming call is connected directly with the remote extension. Alternatively, PCAM controller 310 could retain control of the call and if the remote extension did not answer in maximum extension ring count, clear the ring back signal and generate a busy signal. In this embodiment, the two-way connection would not be made until the remote extension went off-hook.

This application is related to the following commonly assigned and commonly filed U.S. patent applications, each of which is incorporated herein by reference in its entirety:

1. U.S. patent application Ser. No. 08/603,828, entitled "A USER PROGRAMMABLE PERSONAL CALL MANAGER" of Martin S. McKendry, Edward M. Soloko, James A. Wall, and Bernard L. Peuto filed on Feb. 20, 1996, now U.S. Pat. No. 5,768,356;
2. U.S. patent application Ser. No. 08/603,830, entitled "A METHOD FOR HANDLING INCOMING CALLS TO A USER'S PREMISES ON A POTS TELEPHONE LINE" of Martin S. McKendry, Karen L. Styres, Randall F. Reynolds, Jeffrey A. Langston, and Scott A. Van Gundy filed on Feb. 20, 1996, abandoned;
3. U.S. patent application Ser. No. 08/602,545, entitled "A METHOD FOR MONITORING INCOMING CALLS TO A USER'S PREMISES ON A POTS TELEPHONE LINE" of Martin S. McKendry, Karen L. Styres, Edward M. Soloko, and Miller T. Abel, filed on Feb. 20, 1996.

The embodiments described herein are only illustrative of the principles of the invention and are not intended to limit the invention to the specific embodiments described. In view of this disclosure, those skilled in the art will be able to implement the invention in a variety of ways. For example, the above embodiments used a variety of DTMF codes to configure PCAM 100. Alternatively, voice recognition processes could be used instead of a DTMF decoder and DTMF interface to configure PCAM 100.

Similarly, voice recognition processes could be used for the PCAM owner to provide instructions on whether to take a monitor telephone call. Also, as indicated previously, the sequence in ringing local and remote extensions, the playing of menus, and the other operations described above can be altered to provide a particular level of functionality to the user without modification to the hardware.

In other embodiments, PCAM 100 could be included within any one of the telephone instruments normally connected to PCAM 100. For example, PCAM 100 could be included in any one of cordless telephone 135, computer 149, facsimile machine 133, telephone 132 or answering machine 131. The modification to the above description for such a combination will be apparent to those skilled in the art in view of that description.

For example, the telephone instrument that included PCAM 100 could be activated without generating a ring signal to that device. The incoming signal on telephone trunk line 110-1, for example, would be supplied directly to that telephone instrument simply by configuring switch matrix 350 at the appropriate time.

The decision on whether to generate a ring signal would depend on whether it was customary for such a device to ring. Also, the ring signal could be generated without generating the conventional ring signal over a telephone extension line.

In yet another embodiment, PCAM 100 could be included in a base station for a cellular telephone. The base station is connected to trunk line 110-1 and when the cellular telephone is in the base station, calls to the cellular telephone number are routed to the cellular telephone through the base station and consequently PCAM 100 over trunk line 110-1. When the cellular telephone is removed from the base station, calls to the cellular telephone number are sent directly to the cellular telephone. Thus, various alternative embodiments can employ the principles of this invention with modifications to account for the particular telephone instrument in which PCAM 100 is included.

We claim:

1. A method for routing incoming calls on a POTS telephone line to an individual's premises comprising:

detecting an incoming call on said POTS telephone line;

ringing (i) at least one local extension on said individual's premises, and (ii) at least one remote extension, upon detecting said incoming call;

maintaining control of said incoming call to allow further routing when either said at least one local extension, or said at least one remote extension, goes off-hook; and routing said incoming call to another local or remote extension upon detection of a predetermined code on said at least one local extension after said at least one local extension goes off-hook.

2. A method as in claim 1 wherein said predetermined code is a key press or oral statement for voice recognition.

3. A method as in claim 1 wherein said routing said incoming call to another extension comprises transferring said incoming call to a central office voice mail box.

4. A method as in claim 3 wherein said transferring said incoming call to said central office voice mail box comprising using three-way calling on said POTS telephone line.

5. A method as in claim 1 wherein said routing said incoming call to another local or remote extension comprises transferring said incoming call to a telephone answering device located on said individual's premises.

6. A method for routing incoming calls on a POTS telephone line to a individual's premises comprising:

detecting an incoming call on said POTS telephone line;

ringing (i) at least one local extension on said individual's premises, and (ii) at least one remote extension, upon detecting said incoming call;

maintaining control of said incoming call to allow further routing when either said at least one local extension, or said at least one remote extension, goes off-hook; and routing said incoming call to another local or remote extension upon detection of a predetermined code entered on said at least one remote extension after said at least one remote extension goes off-hook.

7. A method as in claim 6 wherein said predetermined code is a key press or oral statement for voice recognition.

8. A method as in claim 6 wherein off-hook remote extension is a wireless telephone.

9. A method as in claim 6 wherein said routing said incoming call to another extension comprises transferring said incoming call to a central office voice mail box.

10. A method as in claim 9 wherein said transferring said incoming call to said central office voice mail box comprises using three-way calling on said POTS telephone line.

11. A method as in claim 6 wherein said routing said incoming call to another extension comprises transferring said incoming call to a telephone answering device located on said individual's premises.

12. A method for routing incoming calls on a POTS telephone line to an individual's premises comprising:

detecting an incoming call on said POTS telephone line;

ringing (i) at least one local extension on said individual's premises, and (ii) at least one remote extension, upon detecting said incoming call, wherein ringing said at least one remote extension comprises automatically dialing a telephone number for said at least one remote extension and establishing a two-way connection between said incoming call and said at least one remote extension upon dialing said telephone number;

maintaining control of said incoming call to allow further routing when either said at least one local extension, or said at least one remote extension, goes off-hook; and clearing said two-way connection to said at least one remote extension upon only said at least one local extension going off-hook.

13. A method as in claim 12 further comprising establishing a two-way connection between said incoming call and said at least one local extension.

14. A method for routing incoming calls on a POTS telephone trunk line to an individual's premises comprising:

detecting an incoming call on said POTS telephone trunk line;

ringing a local extension on said individual's premises before taking said POTS telephone trunk line off-hook;

taking said POTS telephone trunk line off-hook upon said local extension going off-hook;

establishing a two-way connection between said incoming call and said local extension;

maintaining control of said incoming call upon establishing said two-way connection to allow further routing of said incoming call;

routing said incoming call to another extension upon detection of a predetermined code entered on said local extension, wherein said another extension is selected from an extension on said individual's premises and an extension remote to said individual's premises; and maintaining control of said incoming call upon said routing said incoming call to said another extension to allow yet further routing of said incoming call.

15. A method for routing incoming calls on a POTs telephone line to an individual's premises comprising:

detecting an incoming call on said POTS telephone line;

ringing a local extension on said individual's premises upon detecting said incoming call, and before taking said POTS telephone line off-hook;

taking said POTS telephone line off-hook after a first predetermined number of rings MAX1 on said local extension;

continuing ringing said local extension after taking said POTS telephone line off-hook; and routing said incoming call to another extension after a second predetermined number of rings MAX2 on said local extension;

wherein said continuing ringing occurs when said second predetermined number of rings MAX2 is greater than said first predetermined number of rings MAX1.

16. A method as in claim 14 wherein routing said incoming call to another extension further comprises routing said incoming call to voice mail.

17. A method as in claim 16 further comprising maintaining control of said incoming call upon said transfer to voice mail to allow a party to take said incoming call subsequent to said transfer to voice mail.

18. A method as in claim 16 wherein said voice mail is a central office voice mail.

19. A method as in claim 18 wherein said routing said incoming call to said central office voice mail comprises using three-way calling on said POTS telephone line.

20. A method as in claim 14 wherein routing said incoming call to another extension comprises routing said incoming call to a local telephone answering device.

21. A method as in claim 20 further comprising maintaining control of said incoming call upon said transfer to said local telephone answering device to allow a party to take said incoming call subsequent to said transfer to said local telephone answering device.

22. A method as in claim 15 wherein routing said incoming call to another extension comprises playing a menu of call handling options to the calling party of said incoming call to allow said calling party to select said another extension.

23. A method as in claim 22 wherein routing said incoming call comprises routing to a local or a remote extension upon detection of a predetermined code entered by said calling party.

24. A method as in claim 23 wherein said predetermined code is a key press or oral statement for voice recognition.

25. A method as in claim 15 further comprising:

detecting a first type of incoming call and routing said first type of incoming call to at least one first local or remote extension; and detecting a second type of incoming call and routing said second type of incoming call to at least one second local or remote extension.

26. A method as in claim 25 wherein said second type of call is a facsimile call.

27. A method as in claim 25 wherein said second type of call is a modem call.

28. A method as in claim 25 wherein said second type of call is a distinctive ring call.

29. A method as in claim 25 wherein said second type of call is a caller identification call.

30. A method as in claim 25 wherein said second type of call is a blocked caller identification call.

31. A method as in claim 25 wherein said second type of call is a caller identification call having either name or telephone number blocked.

32. A method as in claim 25 wherein said second type of call is a video conference call.

33. A method as in claim 25 wherein said second type of call is a high fidelity audio call.

* * * * *